United States Patent [19]

Shimada et al.

[11] Patent Number: 5,790,797
[45] Date of Patent: Aug. 4, 1998

[54] LOAD DISTRIBUTION SYSTEM FOR MONITORING DEVICE

[75] Inventors: Junichi Shimada; Satoshi Kumano, both of Kawasaki, Japan

[73] Assignee: Fujitsu Limited, Kanagawa, Japan

[21] Appl. No.: 592,187

[22] Filed: Jan. 26, 1996

[30] Foreign Application Priority Data

Feb. 17, 1995 [JP] Japan .................... 7-029206
Oct. 4, 1995 [JP] Japan .................... 7-257300

[51] Int. Cl.⁶ .................... H04L 12/26; H04L 12/46; G06F 13/00
[52] U.S. Cl. .................... 395/200.54; 395/200.3; 395/183.01; 395/183.22; 364/550; 364/138; 364/481; 364/492; 340/825.06; 340/825.08; 340/825.17; 340/506; 455/115; 455/423; 455/557; 345/23; 345/27; 345/112; 345/117; 345/115; 358/504; 358/400
[58] Field of Search .................... 395/200.3, 200.31, 395/200.54, 183.01, 184.01, 185.01, 183.22; 364/514 B, 550, 551.01, 138, 146, 480, 481, 492, DIG. 1, DIG. 2; 340/825.02, 825.06, 825.08, 825.15, 825.16, 825.17, 506, 510, 635, 815.53; 379/37, 42, 90, 93, 106; 345/22–24, 27, 112, 115–117, 127, 139, 150; 455/557, 566, 115, 423; 358/448, 404, 400, 504

[56] References Cited

U.S. PATENT DOCUMENTS

| 5,049,873 | 9/1991 | Robins et al. | 340/825.06 |
| 5,295,244 | 3/1994 | Dev et al. | 395/161 |
| 5,420,977 | 5/1995 | Sztipanovits et al. | 395/160 |
| 5,471,399 | 11/1995 | Tanaka et al. | 364/491 |
| 5,483,631 | 1/1996 | Nagai et al. | 395/155 |
| 5,500,944 | 3/1996 | Yoshida | 395/184.01 |
| 5,504,863 | 4/1996 | Yoshida | 395/184.01 |
| 5,559,955 | 9/1996 | Dev et al. | 395/182.02 |
| 5,572,533 | 11/1996 | Sunada et al. | 371/20.1 |
| 5,586,255 | 12/1996 | Tanaka et al. | 395/200.01 |
| 5,594,426 | 1/1997 | Ushijima et al. | 340/825.02 |
| 5,594,662 | 1/1997 | Yabe | 364/550 |
| 5,706,210 | 1/1998 | Kumano et al. | 395/200.54 |

FOREIGN PATENT DOCUMENTS

| 63-220634 | 9/1988 | Japan. |
| 514368 | 1/1993 | Japan. |

*Primary Examiner*—Emanuel Todd Voeltz
*Assistant Examiner*—Tuan Q. Dam
*Attorney, Agent, or Firm*—Helfgott & Karas, P.C.

[57] ABSTRACT

In order to lighten the processing load on each monitoring device and enable each monitoring device to recognize the operating condition of a network as a whole, each monitoring device monitors operating conditions of transmission devices in a subnetwork allocated thereto and reports the operating conditions to the other monitoring devices periodically or when there is a change in the operating condition. Further, in order to enable of a change of the monitoring zone by the monitoring device due to a trouble or the like, the monitoring device holds supervisory screen image data which corresponds to various monitoring zone, and when a predetermined monitoring zone is designated, the monitoring device displays a supervisory screen image on the basis of the supervisory screen image data which corresponds to the designated monitoring zone and also displays the operating conditions of the transmission devices in the monitoring zone.

31 Claims, 38 Drawing Sheets

FIG. 2
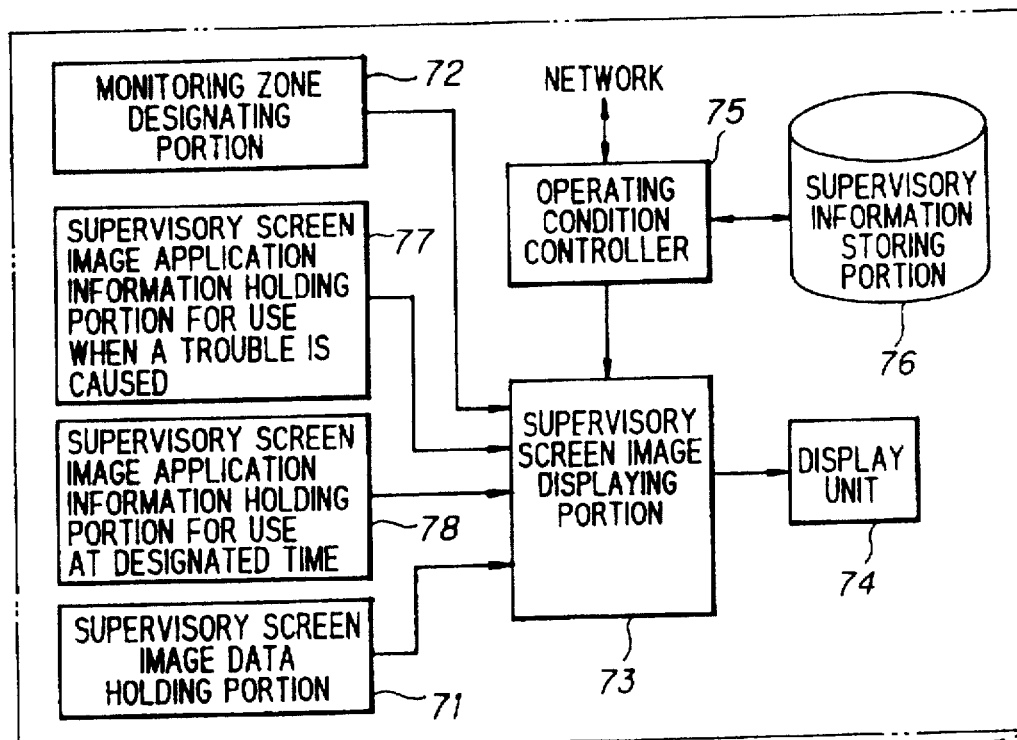
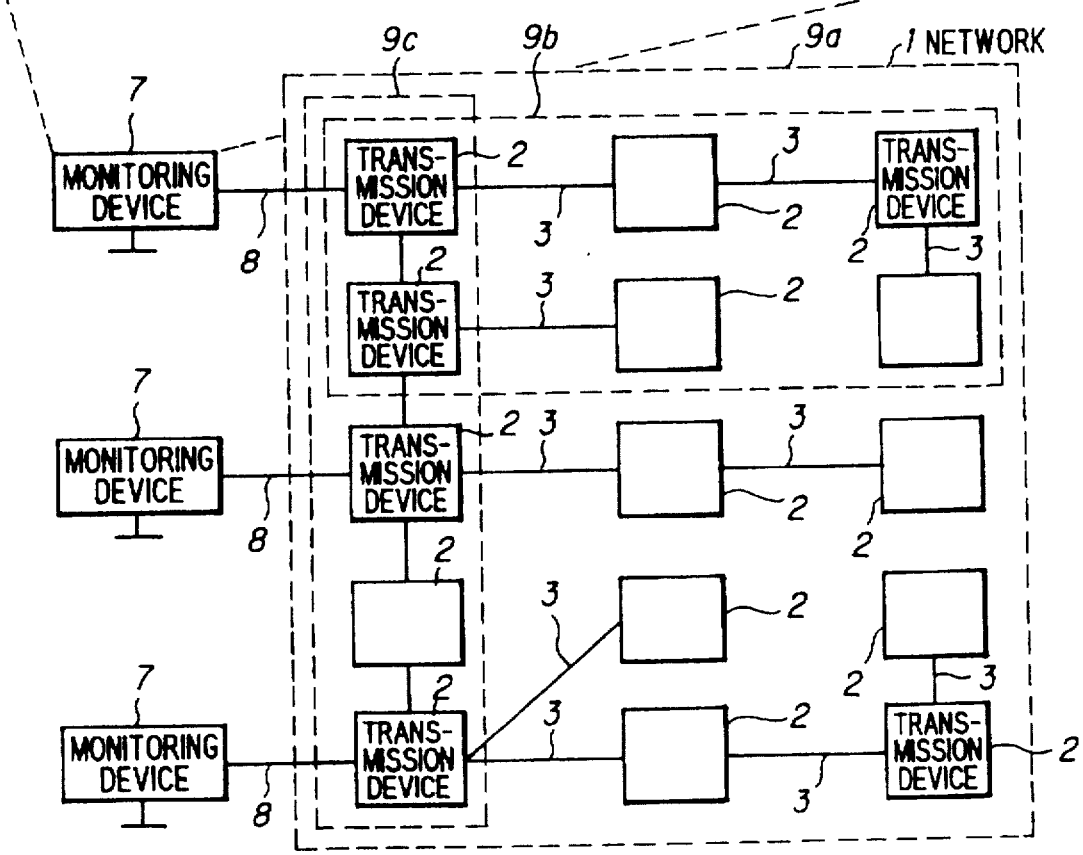

LOAD DISTRIBUTION SYSTEM FOR MONITORING DEVICE

BACKGROUND OF THE INVENTION

Field of the Invention

The present invention relates to a load distribution system for a monitoring device in a network which is composed of a plurality of transmission devices, communication lines and a plurality of monitoring devices, and a monitoring device which is capable of changing the monitoring zone as an object of monitoring (hereinafter referred to simply as "monitoring zone").

The scale of a network has recently been enlarged and most of large-scale networks are monitored at a plurality of stations. In this case, each monitoring device executes the same monitoring processing on all the transmission devices in a network, but some of the monitoring processing is unnecessary and each monitoring device is burdened with a heavy processing load. Accordingly, there is eager demand for a load distribution system which enables each monitoring system to efficiently monitor the operating condition of a network as a whole when the network is monitored at a plurality of stations. A monitoring system which is capable of changing the monitoring zone at need is also demanded.

In monitoring a large-scale network, the following two systems are conventionally utilized:

A plurality of monitoring devices are provided and each monitoring device monitors the transmission devices in the whole network ... first conventional system.

A network is divided into subnetworks which are monitored by respective sub monitoring devices, and a main monitoring device for monitoring the sub monitoring devices monitors the network as a whole ... second conventional system.

FIG. 43 schematically shows the structure of a conventional system. In FIG. 43, the reference numeral 1 represents a network which is composed of a plurality of transmission devices 2 (indicated by black dots) for transmitting data, and communication lines 3 for connecting the transmission devices 2 with each other. A plurality of (n) monitoring devices are provided so as to monitor the operating condition of the network 1. In the system having this structure, each monitoring device 4 monitors the transmission devices 2 in the whole network 1.

FIG. 44 schematically shows the structure of another conventional system. The same reference numerals are provided for the elements which are the same as those in FIG. 43. This system is equivalent to the above-described second conventional system. The network 1 is divided into a plurality of subnetworks 10, and each subnetwork 10 is monitored by a corresponding sub monitoring device 5. The number of transmission devices 2 and communication lines 3 included in each subnetwork 10 is arbitrary. The reference numeral 6 represents a main monitoring device for monitoring the operating condition of each sub monitoring device 5. In the system having this structure, each sub monitoring device 5 monitors the operating condition of all the transmission devices 2 in the subnetwork 10 allocated thereto. The main monitoring device 6, in turn, monitors all the sub monitoring devices 5, thereby monitoring the operating condition of the network 1 as a whole.

In the first conventional system, since each monitoring device 4 monitors the operating condition of all the transmission devices 2 in the network 1 as the objects of monitoring, it must bear a heavy load and there is much traffic within the network 1. In addition, each monitoring device 4 executes the same monitoring processing on all the transmission devices 2, which is wasteful. According to the first conventional system, the more the transmission devices 2 in the network 1, the more the monitoring processing load on each monitoring device 4 and the traffic in the network 1.

In the second conventional system, it is only the main monitoring device 6 that can monitor the network 1 as a whole. For this reason, in order to monitor the whole network 1 at a plurality of stations, it is necessary to provide a plurality of main monitoring devices as well as the sub monitoring devices.

In the above-described conventional systems, the monitoring zone to be monitored by each monitoring device is fixed. In order to change the monitoring zone, it is necessary to renew the supervisory screen image data in the monitoring device each time or change the supervisory screen image data each time, so that swift change of the monitoring zone is impossible. As a result, when some monitoring device is inoperative due to a trouble and it is necessary that another monitoring device monitors the operating condition of the transmission device which has been monitored by the inoperative monitoring device, in other words, it is necessary to change the monitoring zone, swift change of the monitoring zone is impossible, thereby greatly lowering the operation efficiency.

SUMMARY OF THE INVENTION

Accordingly, it is a first object of the present invention to eliminate the above-described problems in the related art and to provide a load distribution system for a monitoring device which is capable of lightening the processing load of each monitoring device and which enables each monitoring device to recognize the operating condition of a network as a whole.

It is a second object of the present invention to provide a monitoring device which is capable of easily changing the monitoring zone as an object of the monitoring device.

It is a third object of the present invention to provide a monitoring device which is capable of monitoring the operating condition of a transmission device in a network by changing the monitoring zone as an object of monitoring by the operation of an operator, or automatically when a trouble is caused or at a designated time.

To achieve the first end, in a first aspect of the present invention, there is provided a load distribution system for a monitoring device for monitoring the operating condition of a network having a plurality of transmission devices for transmitting data, the load distribution system comprising: a plurality of subnetworks into which the network is divided; monitoring devices provided in one-to-one correspondence with the subnetworks; communication lines for connecting each monitoring device with the transmission devices in the subnetwork which corresponds to the monitoring device; and a communication means for communicating the operating condition of the respective subnetworks between the monitoring devices, wherein each monitoring device monitors the operating conditions of the transmission devices in the subnetwork allocated thereto and periodically reports the operating condition of the allocated subnetwork to the other monitoring devices through the communication means.

To achieve the second and third ends, in a second aspect of the present invention, there are provided monitoring devices in a network monitoring system including a plurality of transmission devices for transmitting data so that each monitoring device monitors the operating conditions of the transmission devices in a monitoring zone allocated thereto, each monitoring device comprising: a supervisory screen image data holding means for holding supervisory screen image data which correspond to various monitoring zones; a means for designating a predetermined monitoring zone as an object of monitoring; an operating condition controller for controlling the operating conditions of the transmission devices in the predetermined monitoring zone; and a displaying means for displaying a supervisory screen image on the basis of the supervisory screen image data which corresponds to the designated monitoring zone, and displaying, in the supervisory screen image, the operating conditions of the transmission devices in the monitoring zone which are controlled by the operating condition controller.

To achieve the second and third ends, in a third aspect of the present invention, there are provided monitoring devices in a network monitoring system including a plurality of transmission devices for transmitting data so that each monitoring device monitors the operating conditions of the transmission devices in a monitoring zone allocated thereto, each monitoring device comprising: a supervisory screen image data holding means for holding the supervisory screen image data in correspondence with various monitoring zones; a supervisory screen image application information holding means for holding supervisory screen image application information which designates a monitoring zone whose supervisory screen image is to be displayed when a trouble is caused in a transmission device; an operating condition controller for controlling the operating conditions of the transmission devices on the basis of supervisory information transmitted from the transmission devices and detecting a trouble caused in a transmission device; and a displaying means for displaying a supervisory screen image in correspondence with the monitoring zone designated by the supervisory screen image application information when the trouble is detected and displaying, in the supervisory screen image, the operating conditions of the transmission devices in the monitoring zone which are controlled by the operating condition controller.

Furthermore, to achieve the second and third ends, in a fourth aspect of the present invention, there are provided monitoring devices in a network monitoring system including a plurality of transmission devices for transmitting data so that each monitoring device monitors the operating conditions of the transmission devices in a monitoring zone allocated thereto, each monitoring device comprising: a supervisory screen image data holding means for holding the supervisory screen image data in correspondence with various monitoring zones; a supervisory screen image application information holding means for holding supervisory screen image application information which designates a supervisory screen image covering a predetermined monitoring zone as the object of monitoring at a designated time; an operating condition controller for controlling the operating conditions of the transmission devices on the basis of supervisory information transmitted from the transmission devices; and a displaying means for displaying the designated supervisory screen image covering the monitoring zone as the object of monitoring at the designated time and displaying, in the supervisory screen image, the operating conditions of the transmission devices in the monitoring zone which are controlled by the operating condition controller.

Other features and advantages of the present invention will be apparent from the following description taken in conjunction with the accompanying drawings.

BRIEF DESCRIPTION OF THE DRAWINGS

FIG. 2 is a second schematic explanatory view of the present invention;

DESCRIPTION OF THE PREFERRED EMBODIMENTS (A) Schematic explanation of the invention (a) First schematic explanation of the invention

In FIG. 1, the reference numeral 1 represents a network provided with a plurality of transmission devices for transmitting data and communication lines, 10a to 10n subnetworks into which the network 1 is divided, 7a to 7n monitoring devices provided in correspondence with the respective subnetworks 10a to 10n, 8a to 8n communication lines (monitor lines) connecting the monitoring devices with transmission devices in the allocated subnetworks 10a to 10n, and 20a to 20n communication means (public lines) for communicating the operating condition of the respective subnetworks 10a to 10n between the corresponding monitoring devices 7a to 7n. In each subnetwork, the reference numerals 2a to 2n represent transmission devices and 3a to 3b communication lines.

Figure 1:
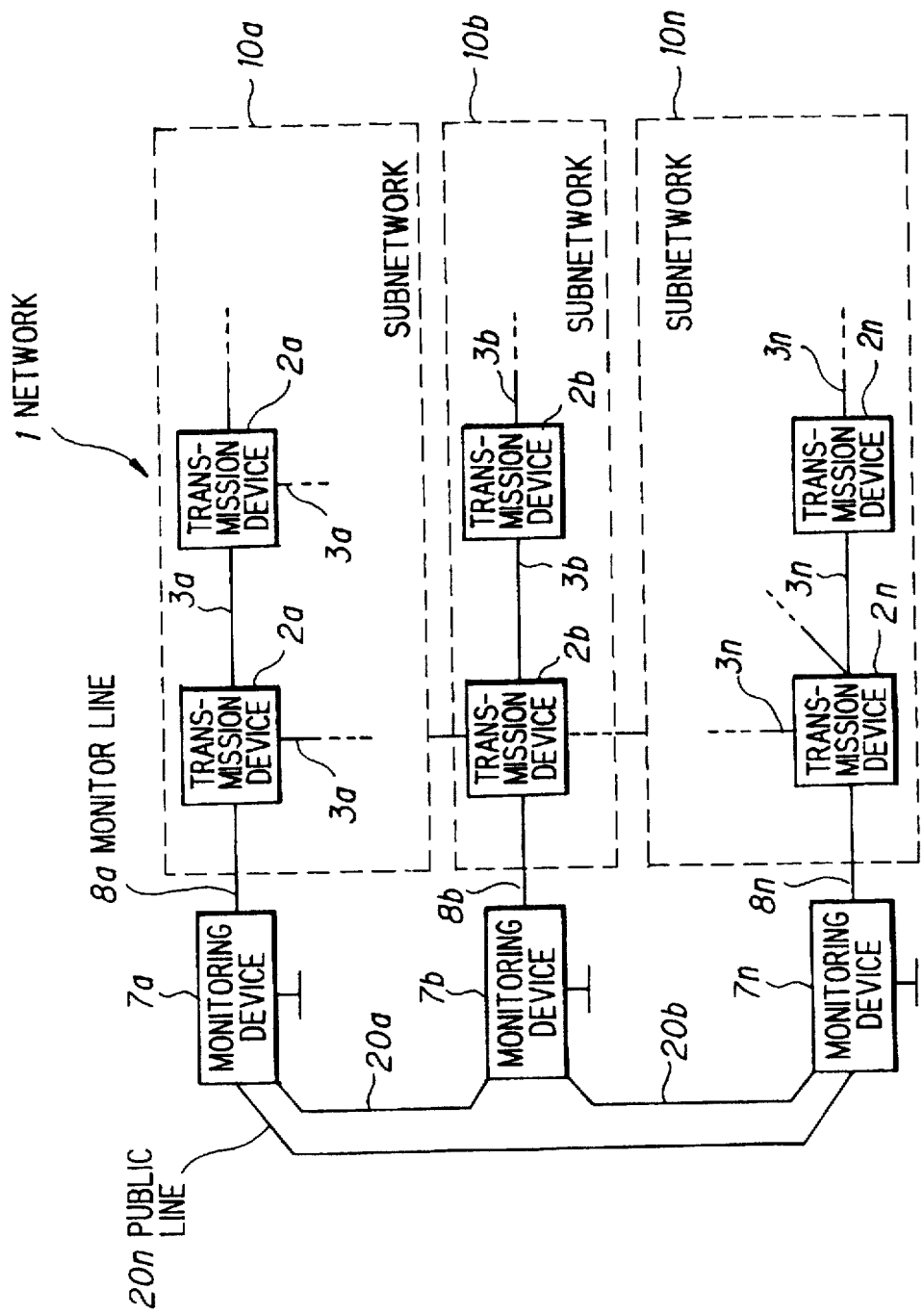
FIG. 1 is a first schematic explanatory view of the present invention.

Each of the monitoring devices 7a to 7n monitors the operating conditions of the transmission devices 2a to 2n in the allocated subnetwork 10a to 10n and periodically reports the operating condition of the allocated subnetwork to the other monitoring devices. In this case, each of the monitoring devices 7a to 7n reports the operating condition of the allocated subnetwork to the other monitoring devices through the public lines 20a to 20n or the communication lines 3a to 3n and 8a to 8n in the network 1.

Each of the monitoring devices 7a to 7n monitors the operating conditions of the transmission devices 2a to 2n in the allocated subnetwork 10a to 10n, and reports the operating condition of the allocated subnetwork to the other monitoring devices if there is any change in the operating condition of a transmission device 2a to 2n which is an object of monitoring. In this case, each of the monitoring devices 7a to 7n reports the operating condition of the allocated subnetwork to the other monitoring devices through the public lines 20a to 20n or the communication lines 3a to 3n and 8a to 8n in the network 1.

Each of the monitoring devices 7a to 7n periodically inquires of the other monitoring devices about the operating conditions of the transmission devices 2a to 2n in the subnetworks which are monitored by the respective monitoring devices and collects the information about the operating condition of the network. In this case, each of the monitoring devices 7a to 7n transmits the inquiry through the public lines 20a to 20n or the communication lines 3a to 3n and 8a to 8n in the network 1 and receives the information about the operating conditions of the subnetworks through these lines.

Each of the monitoring devices 7a to 7n monitors the operating conditions of the transmission devices 2a to 2n in the allocated subnetwork 10a to 10n, and if there is any change in the operating condition of a transmission device 2a to 2n which is an object of monitoring, the corresponding monitoring device inquires of the other monitoring devices about the operating conditions of the transmission devices in the subnetworks which are monitored by the respective monitoring devices and collects the information about the operating condition of the network. In this case, each of the monitoring devices 7a to 7n transmits the inquiry through the public lines 20a to 20n or the communication lines 3a to 3n and 8a to 8n in the network 1 and receives the information about the operating conditions of the subnetworks through these lines.

In this manner, it is possible to lighten the processing load of each monitoring device and each monitoring device is capable of recognizing the operating condition of the network as a whole.

When any one (e.g., monitoring device 7b) of the monitoring devices 7a to 7n stops, an adjacent monitoring device 7a monitors the operating conditions of the transmission devices 2b in the subnetwork 10b which have been monitored by the monitoring device 7b as well as the operating conditions of the allocated transmission devices 2a, and periodically reports the collected information about the operating conditions of the subnetworks 10a, 10b to the other monitoring device 7n. In this case, the monitoring device 7a reports the operating conditions of the subnetworks 10a, 10b through the public line 20n or the communication lines 3a to 3n and 8a to 8n in the network 1.

When any one (e.g., monitoring device 7b) of the monitoring devices 7a to 7n stops, an adjacent monitoring device 7a monitors the operating conditions of the transmission devices 2b in the subnetwork 10b which have been monitored by the monitoring device 7b as well as the operating conditions of the allocated transmission devices 2a. If there is any change in the operating condition of a transmission device which is an object of monitoring, the monitoring device 7a inquires of the other monitoring device 7n about the operating condition of the subnetwork 10n which is monitored by the monitoring device 7n and collects the information about the operating condition of the network as a whole. In this case, the monitoring device 7a transmits the inquiry through the public line 20n or the communication lines 3a to 3n and 8a to 8n in the network 1 and receives the information about the operating condition of the subnetwork 10n through these lines.

According to these systems, it is possible to lighten the processing load of each monitoring device and each monitoring device is capable of recognizing the operating condition of the network as a whole. In addition, when a trouble is caused in any monitoring device, since an adjacent monitoring device replaces the role of the faulty monitoring device, each of the normal monitoring devices are capable of recognizing the operating condition of the network as a whole.

(b) Second schematic explanation of the invention

FIG. 2 is a second schematic explanatory view of the present invention.

In FIG. 2, the reference numeral 1 represents a network provided with a plurality of transmission devices for transmitting data and communication lines, 2 a transmission device, 3 a communication line, 7 a monitoring device, 8 a communication line (monitor line) connecting the monitoring devices 7 with transmission devices 2 in the network 1, and 9a to 9c monitoring zones as the objects of monitoring. In the monitoring device 7, the reference numeral 71 denotes a supervisory screen image data holding portion for holding the supervisory screen image data in correspondence with various monitoring zones 9a to 9c, 72 a monitoring zone designating portion for designating a predetermined monitoring zone as an object of monitoring, 73 a supervisory screen image displaying portion for displaying a supervisory screen image on the basis of the designated monitoring zone, 74 a display unit, 75 an operating condition controller for controlling the operating conditions of the transmission devices in the monitoring zone, 76 a supervisory information storing portion for storing the supervisory information which is reported by the transmission devices in the network, 77 a supervisory screen image application information holding portion for holding supervisory screen image application information which designates the monitoring zone to be displayed in the form of a supervisory screen image when a trouble is caused in a transmission device; and 78 a supervisory screen image application information holding portion for holding supervisory screen image application information so as to display the supervisory screen image covering a predetermined monitoring zone at a designated time.

In a first structure, a plurality of monitoring devices 7 are provided in the network 1 which is provided with a plurality of transmission devices 2 for transmitting data, and each monitoring device monitors the operating conditions of the transmission devices in the corresponding monitoring zone. The supervisory screen image data holding portion 71 of each monitoring device 7 holds the supervisory screen image data which correspond to various monitoring zones, and when a predetermined monitoring zone is designated by the monitoring zone designating portion 72 by the operation of an operator, the supervisory screen image displaying portion 73 displays the supervisory screen image on the display unit 74 on the basis of the supervisory screen image data which corresponds to the designated monitoring zone. The operating condition controller 75 controls the operating conditions of the transmission devices in the monitoring zone and the supervisory screen image displaying portion 73 displays, in the supervisory screen image, the operating conditions of the transmission devices in the monitoring zone which are controlled by the operating condition controller 75.

In this state, (1) the operating condition controller 75 discards the supervisory information reported by the transmission devices outside of the monitoring zone and controls the operating conditions of only the transmission devices in the monitoring zone, or (2) the operating condition controller 75 controls the operating conditions of the transmission devices in the monitoring zone and also stores, in the supervisory information storing portion 76, the supervisory information which is reported from all the transmission devices in the network so as to hold the operating conditions of all the transmission devices, or (3) the operating condition controller 75 controls the operating conditions of all the transmission devices including the transmission devices outside of the monitoring zone, and the supervisory screen image displaying portion 73 displays, in the supervisory screen image, the operating conditions of the transmission devices in the monitoring zone which are controlled by the operating condition controller 75, and also displays, in a predetermined area of the supervisory screen image, the operating conditions (e.g., the name of the transmission device having a trouble) of the transmission devices outside of the monitoring zone in the form of a summarized display, or (4) the operating condition controller 75 controls the operating conditions of the transmission devices in the monitoring zone, the supervisory screen image displaying portion 73 displays, in the supervisory screen image, the operating conditions of the transmission devices in the monitoring zone which are controlled by the operating condition controller 75, the operating condition controller 75 instructs the supervisory screen image displaying portion 73 to display the supervisory screen image which covers the whole network as the monitoring zone when the operating condition controller 75 detects a trouble in a transmission device outside of the monitoring zone, and the supervisory screen image displaying portion 73 displays the supervisory screen image which covers the whole network as the monitoring zone on the basis of the supervisory screen image data which corresponds to the designated monitoring zone and also displays the operating condition of each transmission device in the supervisory screen image.

According to this structure, it is possible to display a supervisory screen image of the transmission devices in the monitoring zone of a monitoring device by easily changing the monitoring zone automatically or by the operation of an operator.

In a second structure, a plurality of monitoring devices 7 are provided in the network 1 which is provided with a plurality of transmission devices 2 for transmitting data, and each monitoring device monitors the operating conditions of the transmission devices in the monitoring zone allocated thereto. The supervisory screen image data holding portion 71 of each monitoring device 7 holds the supervisory screen image data which correspond to various monitoring zones, and the supervisory screen image application information holding portion 77 holds supervisory screen image application information which designates the monitoring zone to be displayed in the form of a supervisory screen image when a trouble is caused in a transmission device. The supervisory screen image displaying portion 73 ordinarily displays, on the display unit 74, the supervisory screen image which is designated by an operator, but when a trouble is detected, the supervisory screen image displaying portion 73 displays the supervisory screen image covering the monitoring zone which is designated by the supervisory screen image application information. The operating condition controller 75 controls the operating conditions of the transmission devices in the monitoring zone, and the supervisory screen image displaying portion 73 displays, in the supervisory screen image, the operating conditions of the transmission devices in the monitoring zone which are controlled by the operating condition controller 75. In this case, the measures (1) to (4) may be taken in the same way as in the first structure.

According to the second structure, when a trouble is caused in a transmission device, it is possible to automatically change the monitoring zone over to another monitoring zone which corresponds to the trouble, and to display the supervisory screen image covering the new monitoring zone.

In a third structure, a plurality of monitoring devices 7 are provided in the network 1 which is provided with a plurality of transmission devices 2 for transmitting data, and each monitoring device monitors the operating conditions of the transmission devices in the corresponding monitoring zone. The supervisory screen image data holding portion 71 of each monitoring device 7 holds the supervisory screen image data which correspond to various monitoring zones, and the supervisory screen image application information holding portion 78 holds supervisory screen image application information so as to display the supervisory screen image covering a predetermined monitoring zone at a designated time. The supervisory screen image displaying portion 73 ordinarily displays, on the display unit 74, the supervisory screen image which is designated by an operator, but at a designated time the supervisory screen image displaying portion 73 displays the supervisory screen image covering the monitoring zone which corresponds to the designated time on the display unit 74. The operating condition controller 75 controls the operating conditions of the transmission devices in the monitoring zone, and the supervisory screen image displaying portion 73 displays, in the supervisory screen image, the operating conditions of the transmission devices in the monitoring zone which are controlled by the operating condition controller 75. In this case, the measures (1) to (4) may be taken in the same way as in the first structure.

According to the third structure, when it comes a predetermined time, it is possible to automatically change the monitoring zone over to another monitoring zone which corresponds to the designated time, and to display the supervisory screen image covering the new monitoring zone.

Figure 3:
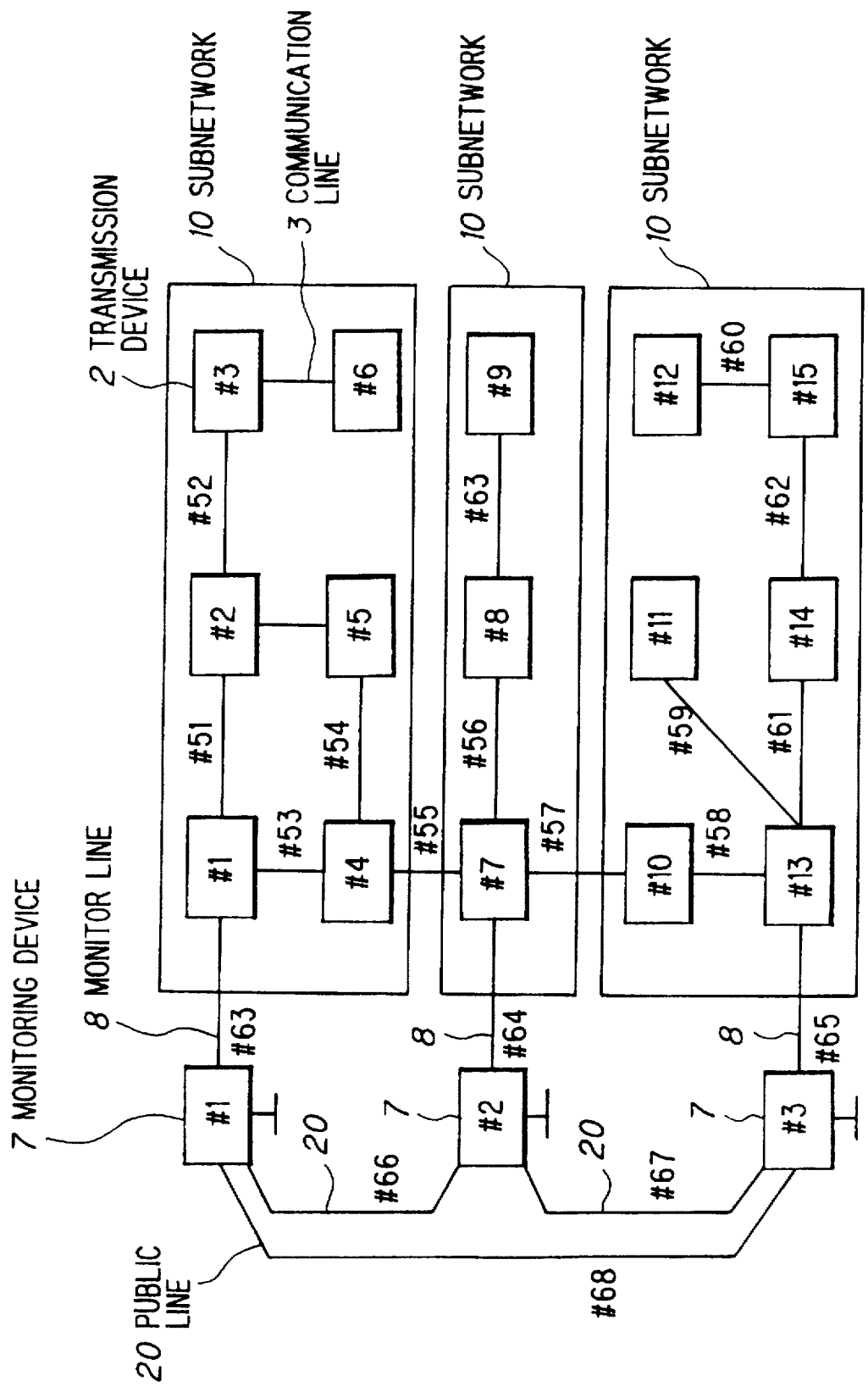
FIG. 3 shows the entire structure of the system according to the present invention.

(B) First embodiment of the invention (a) Entire structure and schematic explanation of the operation (1) Entire structure FIG. 3 shows the entire structure of a load distribution system for a monitoring device according to the present invention. A network is composed of a plurality of transmission devices 2 for transmitting data, a plurality of monitoring devices 7 for monitoring the operating condition of the plurality of transmission devices 2 and communication lines 3 for connecting transmission devices 2 with the monitoring devices 7. The communication line 3 connects the transmission devices 2 with each other so as to communicate information, and it is, for example, a high-speed digital line. In FIG. 3, three monitoring devices 7 are shown, but the number of monitoring devices 7 is arbitrary so long as it is not less than two.

The network is divided into a plurality of subnetworks 10 and one monitoring device 7 is disposed for each subnetwork 10. The monitoring device 7 monitors the operating conditions of all the transmission devices 2 in the allocated subnetwork 10, and monitors the network as a whole on the basis of the information from the other monitoring devices 7. The reference numeral 8 represents a monitor line provided between the monitoring device 7 and a transmission device 2 in the allocated subnetwork 10 so as to communicate supervisory information, and it is a kind of communication line (physical cable).

The numbers of transmission devices 2 and communication lines 3 in each subnetwork 10 are arbitrary, and the numbers of subnetwork 10 and transmission devices 7 are also arbitrary. The reference numeral 20 denotes a public line for connecting the monitoring devices 7 with each other so as to communicate supervisory information. The communication line identification numbers #51 to #62 for identifying the communication line 3, the monitor line identification numbers #63 to #66 for identifying the monitor line 8, and the public line identification numbers #66 to #68 for identifying the public lines 20 are used later in the explanation of the embodiment.

(2) Schematic explanation of a first example of the monitoring operation

Each monitoring device 7 monitors the operating conditions of all the transmission devices 2 in the allocated subnetwork 10, and periodically reports the operating conditions of the allocated subnetwork 10 to the other monitoring devices 7 through the communication lines 3, 8 or the public lines 20 in the network.

(3) Schematic explanation of a second example of the monitoring operation

Each monitoring device 7 monitors the operating conditions of all the transmission devices 2 in the allocated subnetwork 10, and reports the operating conditions of the allocated subnetwork 10 to the other monitoring devices 7 through the communication lines 3, 8 or the public lines 20 in the network, if there is any change in the operating condition of a transmission device 2 which is an object of monitoring.

(4) Schematic explanation of a third example of the monitoring operation

Each monitoring device 7 periodically inquires of the other monitoring devices 7 about the operating conditions of the transmission devices 2 in the subnetworks 10 which are monitored by the respective monitoring devices through the communication lines 3, 8 or the public lines 20 in the network, thereby collecting the information about the operating condition of the network as a whole and recognizing it.

(5) Schematic explanation of a fourth example of the monitoring operation

Each monitoring device 7 monitors the operating conditions of the transmission devices 2 in the allocated subnetwork 10, and if there is any change in the operating condition of a transmission device 2 which is an object of monitoring, the corresponding monitoring device 7 inquires of the other monitoring devices 7 about the operating conditions of the subnetworks 10 which are monitored by the respective monitoring devices 7 through the communication lines 3, 8 or the public lines 20 in the network, thereby collecting the information about the operating condition of the network as a whole and recognizing it.

(6) Schematic explanation of a fifth example of the monitoring operation

When any one of the monitoring devices 7 stops, an adjacent monitoring device monitors the operating conditions of the transmission devices 2 in the subnetwork 10 which have been monitored by the monitoring device which has stopped as well as the operating conditions of the transmission devices in the subnetwork allocated to the adjacent monitoring device, and periodically reports the operating conditions of the two subnetworks 10 to the other monitoring devices 7. In this case, the adjacent monitoring device 7 reports the operating conditions of the two subnetworks 10 through the communication lines 3, 8 or the public lines 20 in the network.

(7) Schematic explanation of a sixth example of the monitoring operation

When any one of the monitoring devices 7 stops, an adjacent monitoring device monitors the operating conditions of the transmission devices 2 in the subnetwork 10 which have been monitored by the monitoring device which has stopped as well as the operating conditions of the transmission devices 2 in the subnetwork allocated to the adjacent monitoring device. If there is any change in the operating condition of a transmission device 2 which is an object of monitoring, the adjacent monitoring device 7 inquires of the other monitoring devices 7 about the operating conditions of the subnetworks 10 which are monitored by the respective monitoring devices 7 and collects the information about the operating condition of the network as a whole so as to recognize it.

(b) Connecting structure for the transmission devices

Figure 4:
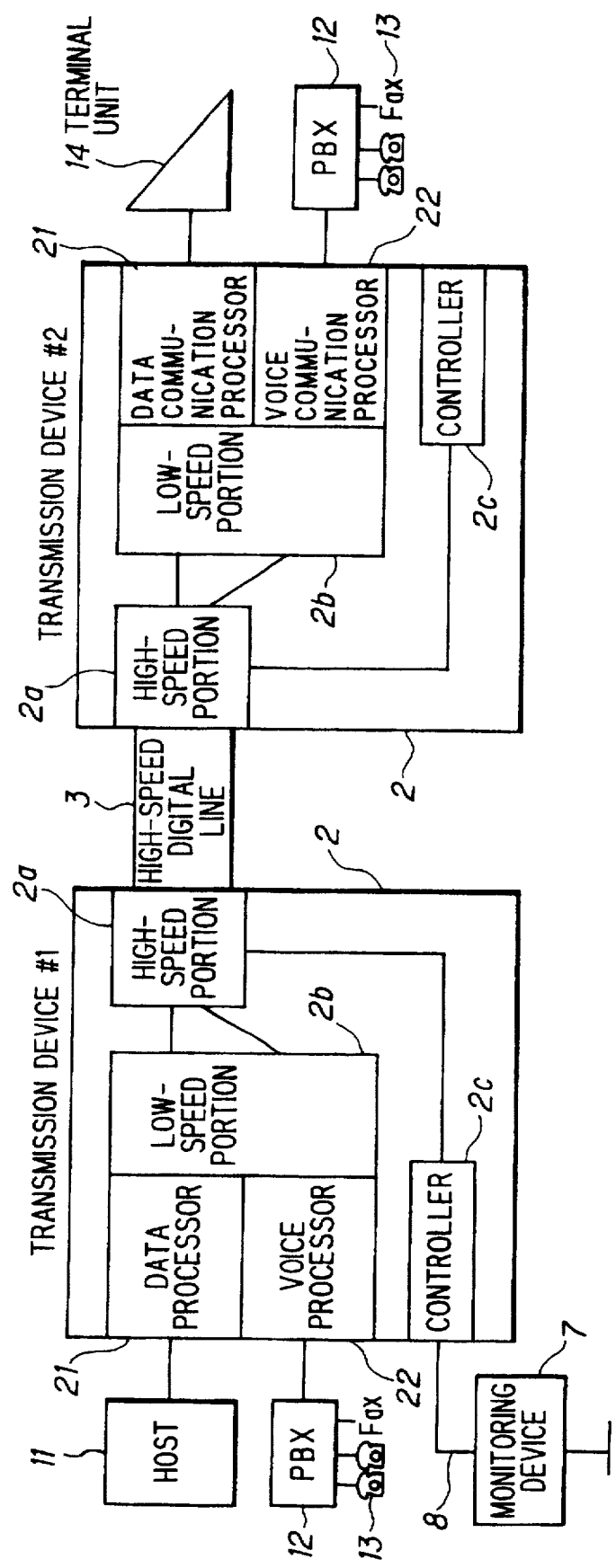
FIG. 4 shows the connecting structure for transmission devices.

FIG. 4 shows the connecting structure for the transmission devices 2. The same reference numerals are provided for the elements which are the same as those in FIG. 3. The transmission devices 2 are connected with each other by a high-speed digital line (the bandwidth is, for example, 64 kbps to 6.3 Mbps) as the communication line 3. The transmission devices 2 is composed of a high-speed portion 2a which is disposed at a portion connected to the high-speed digital line 3 so as to process high-speed data, a low-speed portion 2b which converts high-speed data into low-speed data and processes the low-speed data, and a controller 2c which is connected to the high-speed portion 2a so as to synthetically control the transmission device 2.

The low-speed portion 2b is composed of a data communication processor 21 and a voice communication processor 22. The data communication processor 21 is connected to an external host 11, and the voice communication processor 22 is connected to an external PBX (private branch exchange) 12. Terminals 13 such as a telephone and a facsimile are connected to the PBX 12. The monitoring device 7 is connected to the controller 2c of the transmission device 2 of #1 through the monitor line 8, and a data processing terminal unit 14 and the like are connected to the data communication processor 21 of the transmission device 2 of #2.

In the system having this structure, a command CMD, a response RSP and a report RPT are communicated in the following manner. The command CMD means a message which is transmitted from the monitoring device 7 to the transmission device 2 so as to confirm the operating condition, the response RSP means a message which is transmitted from the transmission device 2 to the monitoring device 7 so as to response the command CMD for confirming the operating condition, and the report RPT means various kinds of message (e.g., message reporting a change in the operating condition) which is reported from the transmission device 2 to all the monitoring devices 7 and all the transmission devices 2 in the network. The report RPT is transmitted by multiple and one-way communication and no response is necessary.

(b-1) Operation of the monitoring device (1) The monitoring device 7 creates a command CMD directed to the transmission device 2 and transmits it to the transmission device 2 in the allocated subnetwork 10, and waits for a response RSP.

(2) When the response RSP is transmitted from the transmission device 2, the monitoring device 7 judges that the processing of the command CMD has been finished.

(3) When the monitoring device 7 receives a report RPT from the transmission device 2 in the allocated subnetwork 10 in a normal state, the monitoring device 7 analyzes the content of the report RPT to know from which transmission device 2 the report RPT is transmitted, and updates the operating condition control data on the transmission device 2 which is controlled by the monitoring device 7.

(b-2) Operation of the transmission device (1) When the transmission device receives a processing command CMD from the monitoring device:

(i) When the transmission device 2 receives a command CMD from the monitoring device 7 to which the transmission device 2 is connected, the transmission device 2 judges whether or not the command CMD is directed to the transmission device 2.

(ii) If the command CMD is directed to the transmission device 2, the transmission device 2 executes predetermined processing, and transmits a response RSP to the monitoring device 7 when the processing is finished.

(iii) Simultaneously with the operation (ii), the transmission device 2 transmits a report RPT that the processing has been finished, to all the communication lines 3 to which the transmission device 2 is connected.

(2) When the transmission device receives a command CMD directed to another transmission device from the monitoring device:

(i) When the transmission device 2 receives a command CMD from the monitoring device 7 to which the transmission device 2 is connected, the transmission device 2 judges whether or not the command CMD is directed to the transmission device 2.

(ii) If the command CMD is not directed to the transmission device 2, the transmission device 2 transmits the command CMD to all the communication lines 3 to which the transmission device 2 is connected.

(3) When the transmission device receives a command CMD directed thereto from an adjacent transmission device:

(i) When the transmission device 2 receives a command CMD from an adjacent transmission device, the transmission device 2 judges whether or not the command CMD is directed to the transmission device 2.

(ii) If the command CMD is directed to the transmission device 2, the transmission device 2 executes predetermined processing, and when the processing is finished, the transmission device 2 transmits a response RSP to all the communication lines 3 to which the transmission device 2 is connected.

(iii) Simultaneously with the operation (ii), the transmission device 2 transmits a report RPT that the processing has been finished, to all the communication lines 3 to which the transmission device 2 is connected.

(4) When the transmission device receives a command CMD directed to another transmission device from an adjacent transmission device:

(i) When the transmission device 2 receives a command CMD from an adjacent transmission device, the transmission device 2 judges whether or not the command CMD is directed to the transmission device 2.

(ii) If the command CMD is not directed to the transmission device 2, the transmission device 2 transmits the command CMD to all the communication lines 3 to which the transmission device 2 is connected.

(c) Monitoring device

Figure 5:
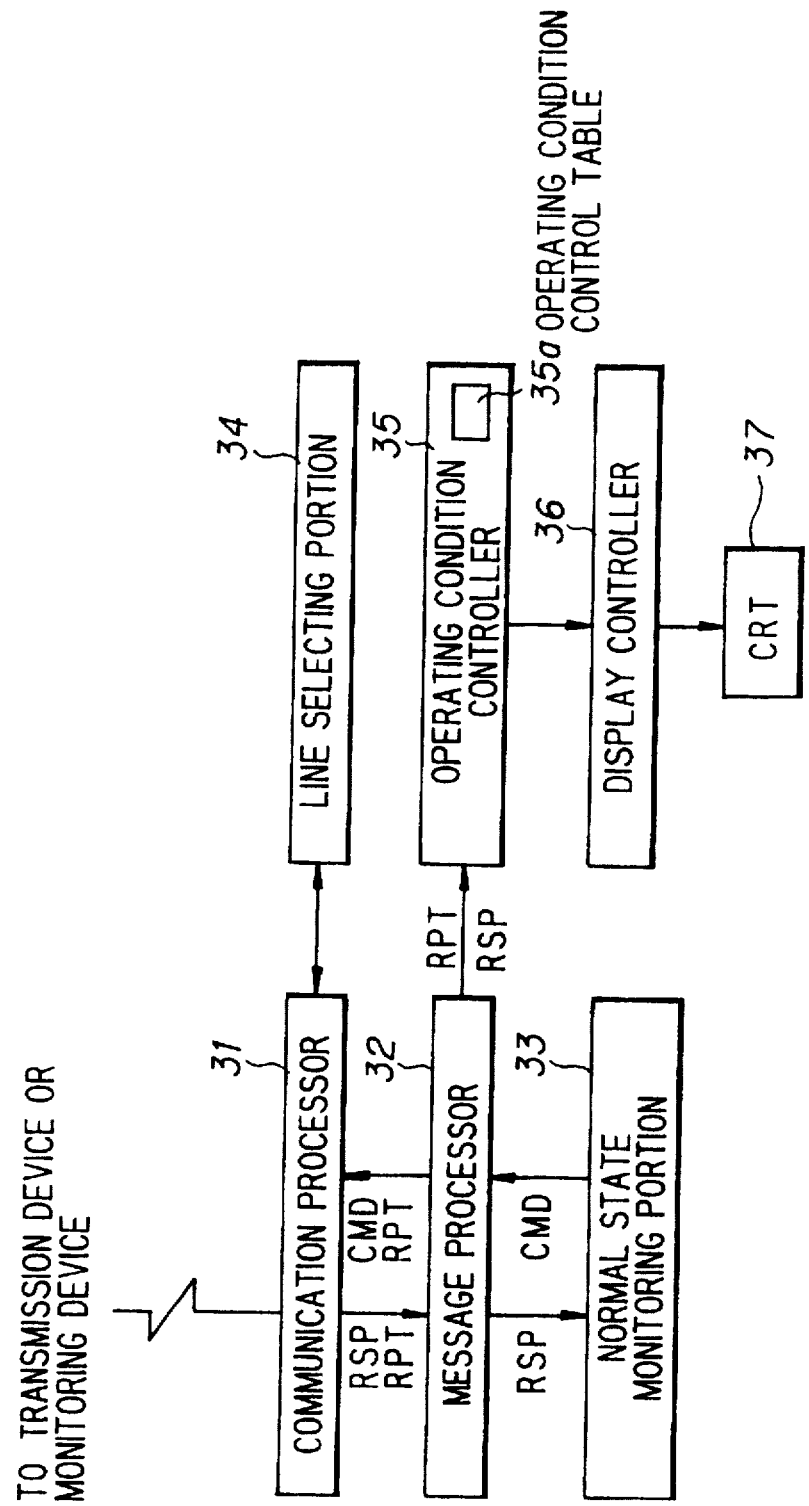
FIG. 5 shows the structure of a monitoring device.

FIG. 5 shows the structure of a monitoring device 7. In FIG. 5, the reference numeral 31 represents a communication processor for transmitting and receiving a message between the monitoring device 7 and a transmission device 2 or another monitoring device 7 through the monitor line 8 or the public line 20, and 32 a message processor which is connected to the communication processor 31 so as to analyze the message transmitted from the communication processor 31 and output the result of the analysis. The message which is transmitted from the communication processor 31 to the message processor 32 is a response RSP or a report RPT, and the message which is transmitted from the message processor 32 to the communication processor 31 is a command CMD or a report RPT.

The reference numeral 33 denotes a normal state monitoring portion which is connected to the message processor 32 and which periodically issues a message CMD of confirmation of an operating condition to the transmission device 2 which is an object of monitoring. The normal state monitoring portion 33 transmits the message CMD of confirmation of an operating condition to the message processor 32, and the message processor 32 transmits a response RSP to the normal state monitoring portion 33. The reference numeral 34 denotes a line selecting portion which is connected to the communication processor 31 and which selects a communication line from the monitor lines 8 and the public lines 20.

The reference numeral 36 represents a display controller (HMI processing portion) for displaying the operating condition of each transmission device 2 in the network on a display unit, and 37 a CRT as the display unit. The reference numeral 35 denotes an operating condition controller. The operating condition controller controls the operating condition of each transmission device 2 in the network on the basis of the response message RSP which is transmitted from the message processor 32 so as to confirm the operating condition and the message RPT which is transmitted from the transmission device 2 so as to report a change in the operating condition, and reports the result of the control of the operating condition to the display controller 36.

Figure 6:
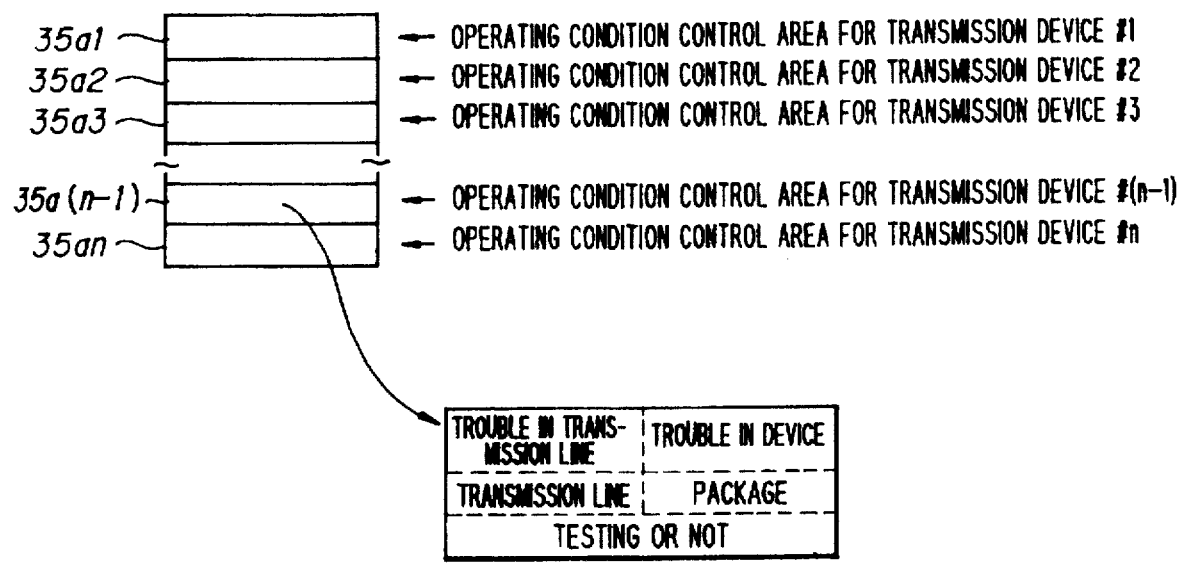
FIG. 6 shows the structure of an operating condition control table.

The reference numeral 35a represents an operating condition control table provided in the operating condition controller 35. The operating condition control table 35a controls the operating conditions of all the transmission devices 2 in the network, as shown in FIG. 6, and operating condition control areas 35a1 to 35an for the transmission devices #1 to #n are provided in the operating condition control table 35a so as to reflect the response RSP or the report RPT which is transmitted from the message processor 32. In other words, the operating condition such as the presence or absence of a trouble (trouble in a transmission line or a device), the presence or absence of a backup (whether or not a transmission line or a device package is backed up), and whether or not it is in the middle of a test such as a self diagnosis is stored and controlled in each operating condition control area on the basis of the response RSP or the report RPT which is transmitted from each transmission device. The operating condition controller 35 updates the network supervisory screen image on the CRT 37 simultaneously with the update of the table 35a.

Figure 7:
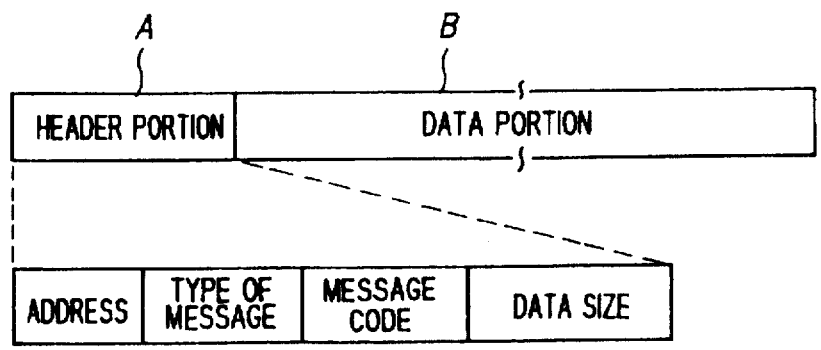
FIG. 7 is an explanatory view of a message format.

The operation of the monitoring device having the above-described structure will now be explained. The format of a message will first be explained. FIG. 7 shows an example of the format of a message. The message is composed of a header portion A and a data portion B. The following information is stored in the header portion A.

(1) Transmission device address: the address of the transmission device to which a command CMD is directed, the address of the transmission device from which a response RSP is transmitted, the address of the transmission device from which a report RPT is transmitted (2) Type of message: a code denoting a command CMD, a response RSP, or a report RPT (3) Message code: a code denoting the content of processing in a command CMD, a response RSP, or a report RPT (4) Size of data portion: a data size when the data portion B is attached to the header portion A Various data (information of operating condition, system data for a transmission device, control information, etc.) are stored in the data portion B.

The operation of the monitoring device 7 shown in FIG. 5 will now be explained.

The normal state monitoring portion 33 periodically and independently issues a message CMD of confirmation of an operating condition to a transmission device 2 controlled by the monitoring device 7. Actually, the normal state monitoring portion 33 creates a message CMD of confirmation of an operating condition with the address of the transmission device 2 attached thereto and requests the message processor 32 to transmit the message CMD. The message processor 32 which has been requested to transmit the message CMD transmits it to the transmission device 2 which is connected to and monitored by the monitoring device 7 by using the line designated by the line selecting portion 34.

When the response RSP is transmitted from the transmission device 2 which has received the message CMD of confirmation of an operating condition, the communication processor 31 receives the response RSP and transmits it to the message processor 32. The message processor 32 which has received the response RSP reports the content of the message to the operating condition controller 35. The operating condition controller 35 analyzes the content of the response message RSP and updates the operating condition of the transmission device 2 which is stored in the operating condition control table 35a and requests the display controller 36 to display the updated operating condition. The display controller 36 displays the contents of the table 35a on the CRT 37.

On the other hand, when the report RPT that there is a change in the operating condition is transmitted from any transmission device 2 in the network, the communication processor 31 receives the message and transmits it to the message processor 32. The message processor 32 which has received the message RPT reporting that there is a change in the operating condition reports the content of the message RPT to the operating condition controller 35. The operating condition controller 35 analyzes the content of the message RPT and updates the operating condition of the transmission device 2 which is stored in the operating condition control table 35a and requests the display controller 36 to display the updated operating condition. The display controller 36 displays the contents of the table 35a on the CRT 37.

(d) Structure of the main part of the transmission device

Figure 8:
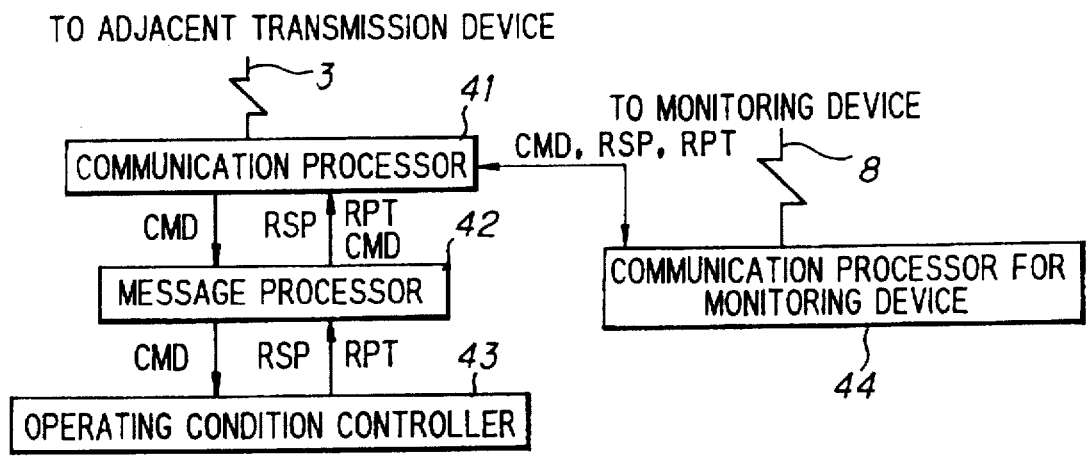
FIG. 8 shows the structure of the main part of a transmission device.

FIG. 8 shows the structure of the main part of the transmission device 2, i.e., the structure of the controller 2c shown in FIG. 4. In FIG. 8, the reference numeral 41 denotes a communication processor for transmitting and receiving a message between adjacent transmission devices which are connected with each other through the communication line 3, and 42 a message processor for analyzing the message which is transmitted from the communication processor 41 and outputting the result of the analysis. A command CMD is transmitted from the communication processor 41 to the message processor 42, and a response RSP and a report RPT are transmitted from the message processor 42 to the communication processor 41. The reference numeral 43 represents an operating condition controller which transmits the operating condition of the transmission device 2 to which it belongs to the message processor 42 in the form of the response RSP for confirming the operating condition of the transmission device 2 when the operating condition controller 43 receives the message CMD of confirmation of an operating condition from the monitoring device 7, and also transmits a report RPT that there is a change in the operating condition to the message processor 42 when the operating condition controller 43 detects the change in the operating condition in the transmission device 2 to which it belongs.

The reference numeral 44 represents a communication processor for the monitoring device which transmits the command CMD transmitted from the monitoring device 7 to the communication processor 41 and transmits the response message RSP directed to the monitoring device 7 from the communication processor 41, to the monitoring device 7. The message processor 42 also requests the communication processor 41 to transmit the report RPT that there is a change in the operating condition which is transmitted from the operating condition controller 43 or the command CMD which the message processor 42 is requested to transmit by the communication processor 44 for the monitoring device. The operation of the transmission device 2 having the above-described structure will be explained in the following.

(d-1) When the transmission device transmits the operating condition in response to a request from the monitoring device When the communication processor 41 receives the message CMD of confirmation of an operating condition from the monitoring device 7, the communication processor 41 transmits the message CMD to the message processor 42. At this time, there are two types of messages CMD which are transmitted from the communication processor 41. One is a command CMD transmitted from the monitoring device 7 which is directly connected to the transmission device 2 to which the message processor 42 belongs. The other is a command CMD transmitted from an adjacent monitoring device 7 which is not directly connected to the transmission device 2 to which the message processor 42 belongs. In the former case, the message CMD of confirmation of an operating condition is transmitted to the communication processor 41 via the communication processor 44 for the monitoring device, while in the latter case, the message CMD is transmitted from an adjacent transmission device 2 through the communication line 3.

When the message processor 42 receives the message CMD of confirmation of an operating condition from the communication processor 41, the message processor 42 judges whether or not the message CMD is directed to the transmission device to which it belongs, and if the answer is in the affirmative, the message processor 42 transmits the message CMD to the operating condition controller 43, while if the answer is in the negative, the message processor 42 discards the message CMD. The operating condition controller 43 which has received the message CMD creates a response message RSP so as to report the operating condition of the transmission device to which it belongs to the monitoring device 7 and inputs the message RSP to the message processor 42. The message processor 42 requests the communication processor 41 to transmit the message RSP when the transmission device is not directly connected to the monitoring device 7, and the communication processor 41 transmits the message RSP to the monitoring device 7 via an adjacent transmission device 2. On the other hand, when the transmission device is directly connected to the monitoring device 7, the message processor 42 requests the communication processor 44 for the monitoring device to transmit the message RSP, and the communication processor 44 for the monitoring device transmits the message RSP to the monitoring device 7 by way of the communication processor 41.

(d-2) When the transmission device independently transmits the operating condition to the monitoring device When the operating condition controller 43 detects a change in the operating condition of the transmission device to which it belongs, the operating condition controller 43 creates a message RPT reporting a change in the operating condition so as to report the change to the monitoring device 7 and inputs the message RPT to the message processor 42. When the transmission device is directly connected to the monitoring device 7, the message processor 42 transmits the message RPT reporting a change in the operating condition to the monitoring device 7 which is directly connected to the transmission device via the communication processor 41 and communication processor 44 for the monitoring device, and requests the communication processor 41 to transmit the message RPT. The communication processor 41 transmits the message RPT to an adjacent transmission device 2.

On the other hand when the transmission device is not directly connected to the monitoring device 7, the message processor 42 requests the communication processor 41 to transmit the message RPT.

(d-3) When the transmission device relays a message from another transmission device When the communication processor 41 receives a message from another transmission device 2, the communication processor 41 transmits the message to the message processor 42. If the transmission device to which the message processor 42 belongs is connected to the monitoring device 7, the message processor 42 transmits the message to the message processor 44 for the monitoring device via the communication processor 41. On the other hand, if the transmission device is not connected directly to the monitoring device 7, the message processor 42 requests the communication processor 41 to transmit the message to an adjacent transmission device 2 to which the transmission device is connected through the communication line 3. The communication processor 41 transmits the message to the designated adjacent transmission device 2.

(e) Explanation of various operations of the first embodiment

The actual monitoring operation will now be explained. In the following explanation of the monitoring operation, it is assumed that the monitoring device 7 and the controller 2c in the transmission device 2 are organically combined with the internal elements shown in FIG. 5 and the internal elements shown in FIG. 8, respectively, so as to conduct the respective operations.

(e-1) Explanation of a first example of the monitoring operation

Figure 9:
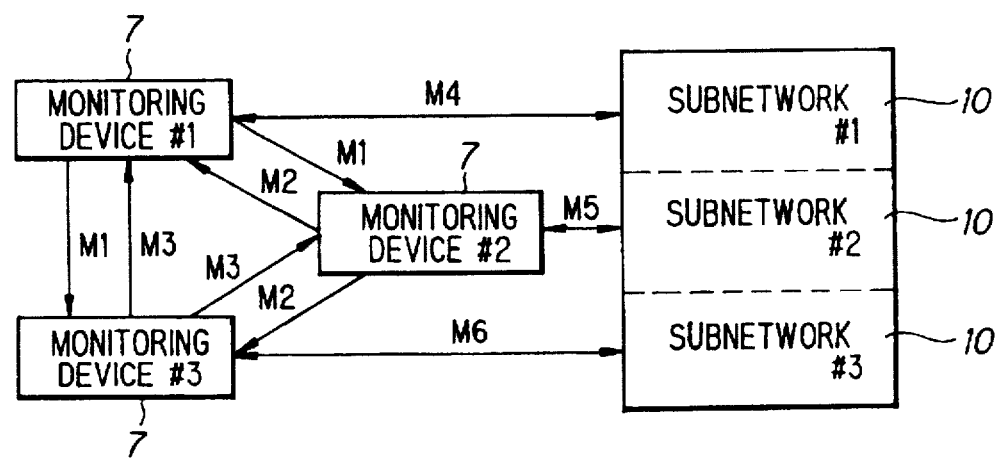
FIG. 9 is an explanatory view of a first example of the operation of a first embodiment of the present invention.

FIG. 9 is an explanatory view of a first example of the monitoring operation of the first embodiment of the present invention. In the following explanation, it is assumed that (1) there are three monitoring devices 7, i.e., a monitoring device #1, a monitoring device #2 and a monitoring device #3, (2) there are three subnetworks 10, i.e., a subnetwork #1, a subnetwork #2 and a subnetwork #3, (3) the subnetwork #1 is directly monitored by the monitoring device #1, the subnetwork #2 is directly monitored by the monitoring device #2, and the subnetwork #3 is directly monitored by the monitoring device #3, and (4) the information or message transmitted between each monitoring device 7 and subnetwork 10 is represented by (M+an Arabic figure) for the purpose of identification.

In the embodiment shown in FIG. 9, the symbol M1 represents information as to the operating condition of a transmission device in the subnetwork #1, M2 information as to the operating condition of a transmission device in the subnetwork #2, and M3 information as to the operating condition of a transmission device in the subnetwork #3. The symbol M4 represents a message (a message CMD of confirmation of an operation condition/a response message RSP/a message RPT reporting a change in the operating condition) transmitted and received between the monitoring device #1 and a transmission device in the subnetwork #1, the symbol M5 represents a message CMD/RSP/RPT transmitted and received between the monitoring device #2 and a transmission device in the subnetwork #2, and the symbol M6 represents a message CMD/RSP/RPT transmitted and received between the monitoring device #3 and a transmission device in the subnetwork #3.

The monitoring device #1 reads the corresponding data (the information M1 as to the operating condition of the subnetwork #1) from the operating condition control table 35a and periodically transmits the information M1 to the monitoring devices #2 and #3. The monitoring devices #2 and #3 which have received the information M1 are capable of recognizing the operating conditions of the transmission devices 2 in the subnetwork #1. Therefore, each monitoring device 7 is capable of recognizing the operating conditions of the transmission devices in the network as a whole as well as the operating condition of the transmission devices 2 allocated thereto.

The monitoring device #1 not only periodically reports the operating condition of the allocated transmission devices to the other monitoring devices 7, but also reads the corresponding data (the information M1 as to the operating condition of the subnetwork #1) from the operating condition control table 35a at the point of time when there is a change in the operating condition in an allocated transmission device 2 and transmits the information M1 to the monitoring devices #2 and #3. The monitoring devices #2 and #3 which have received the information M1 are capable of recognizing the operating conditions of the transmission devices 2 in the subnetwork #1. Therefore, each monitoring device 7 is capable of recognizing the operating conditions of the transmission devices in the network as a whole as well as the operating condition of the transmission devices 2 allocated thereto. Although the monitoring device #1 is cited as an example in the above explanation, the same is applied to the monitoring devices #2 and #3.

The monitoring device 7 collects the information as the operating condition of each transmission device in the allocated subnetwork 10 in the following manner. In a first collecting method, the monitoring device 7 periodically transmits the message CMD of confirmation of an operating condition to all the transmission devices 2 disposed in the allocated subnetwork 10 and receives the response message RSP from the transmission devices 2, thereby collecting the information as to the operating condition of the allocated transmission devices 2. In a second collecting method, each transmission device 2 disposed in the subnetwork 10 transmits a message RPT reporting a change in the operating condition to the monitoring device 7 through the communication line 3 in the network when any change is caused in its own device, so that the monitoring device collects the information as to the operating condition of each of the allocated transmission devices.

In this manner, by utilizing the two communication methods (periodical communication and communication transmitted when there is a change in the operating condition), each monitoring device 7, which monitors only the transmission devices 2 in the allocated subnetwork 10, is capable of recognizing the operating condition of all the transmission devices 1 in the network.

(e-2) Explanation of a second example of the monitoring operation

Figure 10:
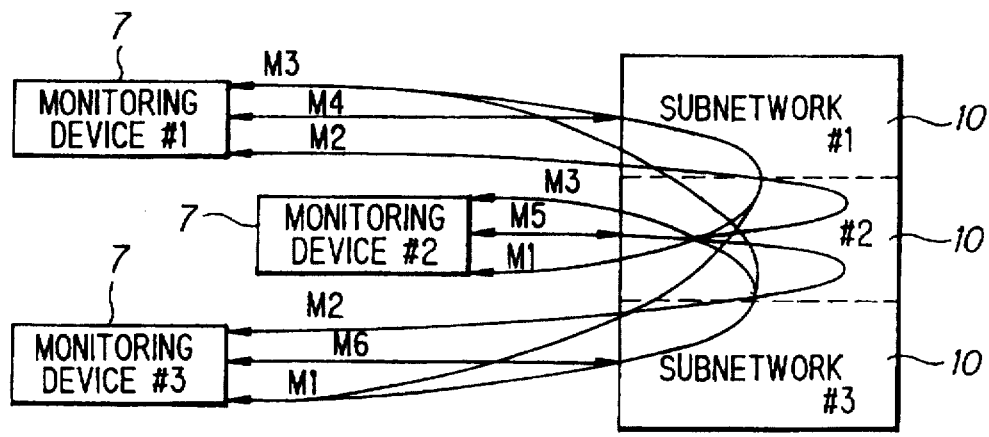
FIG. 10 is an explanatory view of a second example of the operation of the first embodiment of the present invention.

FIG. 10 is an explanatory view of a second example of the monitoring operation in the present invention. The same reference numerals are provided for the elements which are the same as those shown in FIG. 9. In FIG. 10, the symbol M1 represents information as to the operating condition of a transmission device in the subnetwork #1, M2 information as to the operating condition of a transmission device in the subnetwork #2, and M3 information as to the operating condition of a transmission device in the subnetwork #3. The symbol M4 represents a message (a message CMD of confirmation of an operation condition/a response message RSP/a message RPT reporting a change in the operating condition) transmitted and received between the monitoring device #1 and a transmission device in the subnetwork #1, the symbol M5 represents a message CMD/RSP/RPT transmitted and received between the monitoring device #2 and a transmission device in the subnetwork #2, and the symbol M6 represents a message CMD/RSP/RPT transmitted and received between the monitoring device #3 and a transmission device in the subnetwork #3.

The monitoring device #1 reads the corresponding data (the information M1 as to the operating condition of the subnetwork #1) from the operating condition control table 35a and periodically transmits the information M1 to the monitoring devices #2 and #3 through the communication lines 3 in the network.

Actually, in the structure shown in FIG. 3, the monitoring device #1 transmits the information M1 as to the operating condition to the transmission device #1 through the monitor line #63. The transmission device #1 transmits the information M1 to the transmission device #4 through the communication line #53, and the transmission device #4 transmits it to the transmission device #7 through the communication line #55. The transmission device #7 transmits the information M1 to the monitoring device #2 through the monitor line #64, and also transmits it to the transmission device #10 through the communication line #57. The transmission device #10 transmits the information M1 to the transmission device #13 through the communication line #58, and the transmission device #13 transmits it to the monitoring device #3 through the monitor line #65.

The monitoring device #3 which has received the information M1 is capable of recognizing the operating conditions of the transmission devices 2 in the subnetwork #1 allocated to the monitoring device #1. In other words, the monitoring device #3 is capable of recognizing the operating conditions of the transmission devices 2 in the network as a whole as well as the operating conditions of the transmission devices 2 in the subnetwork #3 allocated thereto. In this manner, since the monitoring devices 7 periodically transmit the operating conditions to each other through the communication lines 3 and 8, each monitoring device 7 is capable of recognizing the operating conditions of the transmission devices 2 in the network as a whole.

The monitoring device #1 reads the corresponding data (the information M1 as to the operating condition) from the operating condition control table 35a at the point of time when there is a change in the operating condition of a transmission device 2 in the allocated subnetwork #1 and transmits the information M1 to the monitoring devices #2 and #3 through the communication lines 3 and 8.

The monitoring devices #2 and #3 which have received the information M1 are capable of recognizing the operating conditions of the transmission devices 2 in the subnetwork #1. In other words, the monitoring devices #2 and #3 are capable of recognizing the operating conditions of the transmission devices 2 in the network as a whole as well as the operating conditions of the transmission devices 2 in the subnetworks 32 and #3 allocated thereto. In this manner, since the monitoring devices 7 transmit the operating condition to each other through the communication lines 3 and 8, each monitoring device 7 is capable of recognizing the operating conditions of the transmission devices 2 in the network as a whole at the point of time when any change is caused in a transmission device in a subnetwork.

Although the monitoring device #1 is cited as an example in the above explanation, the same is applied to the monitoring devices #2 and #3.

(e-3) Explanation of a third example of the monitoring operation

Figure 11:
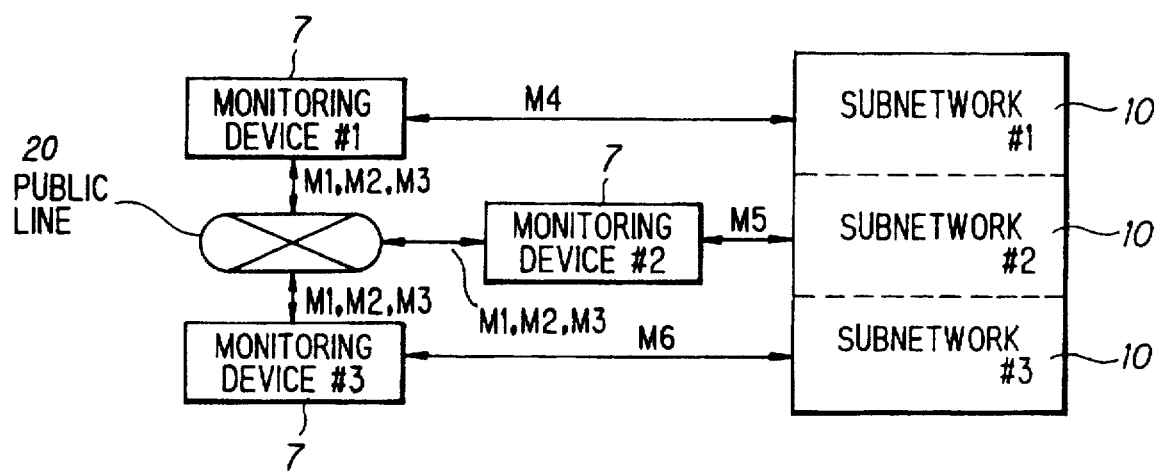
FIG. 11 is an explanatory view of a third example of the operation of the first embodiment of the present invention.

FIG. 11 is an explanatory view of a third example of the monitoring operation in the present invention. The same reference numerals are provided for the elements which are the same as those shown in FIGS. 3 and 9. In FIG. 11, the symbol M1 represents information as to the operating condition of a transmission device in the subnetwork #1, M2 information as to the operating condition of a transmission device in the subnetwork #2, and M3 information as to the operating condition of a transmission device in the subnetwork #3. The symbol M4 represents a message (a message CMD of confirmation of an operation condition/a response message RSP/a message RPT reporting a change in the operating condition) transmitted and received between the monitoring device #1 and a transmission device in the subnetwork #1, the symbol M5 represents a message CMD/RSP/RPT transmitted and received between the monitoring device #2 and a transmission device in the subnetwork #2, and the symbol M6 represents a message CMD/RSP/RPT transmitted and received between the monitoring device #3 and a transmission device in the subnetwork #3.

The monitoring device #1 reads the corresponding data (the information M1 as to the operating condition of the subnetwork #1) from the operating condition control table 35a and periodically transmits the information M1 to the monitoring devices #2 and #3 through the public lines 20. Actually, in the structure shown in FIG. 3, the monitoring device #1 transmits the information M1 as to the operating condition to the monitoring device #2 through the public line #66, and to the monitoring device #3 through the public line #68.

The monitoring device #1 reads the corresponding data (the information M1 as to the operating condition) from the operating condition control table 35a at the point of time when there is a change in the operating condition of a transmission device 2 in the subnetwork #1 allocated thereto and transmits the information M1 to the monitoring devices #2 and #3 through the public lines 20.

The monitoring devices #2 and #3 which have received the information M1 are capable of recognizing the operating conditions of the transmission devices 2 in the subnetwork #1 allocated to the monitoring device #1. In other words, the monitoring devices are capable of recognizing the operating conditions of the transmission devices in the network as a whole as well as the operating condition of the allocated transmission devices 2. In this manner, since the monitoring devices 7 transmit the operating condition of an allocated transmission device 2 to each other through the public lines 20 periodically or when there is a change in the operating condition, each monitoring device 7 is capable of recognizing the operating conditions of the transmission devices 2 in the network as a whole.

Although the monitoring device #1 is cited as an example in the above explanation, the same is applied to the monitoring devices #2 and #3.

(e-4) Explanation of a fourth example of the monitoring operation

Figure 12:
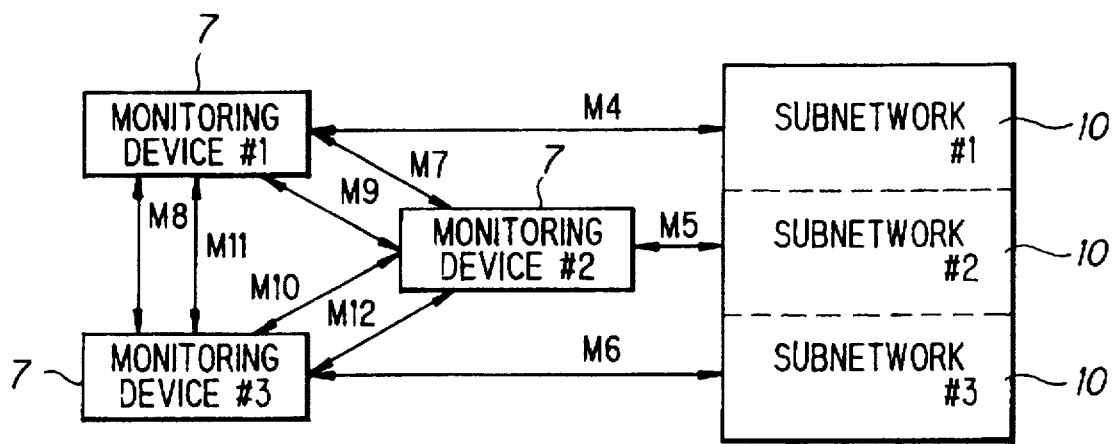
FIG. 12 is an explanatory view of a fourth example of the operation of the first embodiment of the present invention.

FIG. 12 is an explanatory view of a fourth monitoring operation in the present invention. The same reference numerals are provided for the elements which are the same as those shown in FIG. 9. In FIG. 12, the symbol M4 represents a message (a message CMD of confirmation of an operation condition/a response message RSP/a message RPT reporting a change in the operating condition) transmitted and received between the monitoring device #1 and a transmission device in the subnetwork #1, the symbol M5 represents a message CMD/RSP/RPT transmitted and received between the monitoring device #2 and a transmission device in the subnetwork #2, and the symbol M6 represents a message CMD/RSP/RPT transmitted and received between the monitoring device #3 and a transmission device in the subnetwork #3.

The symbol M7 represents a message of confirmation of an operating condition of the subnetwork #2 or a response message transmitted between the monitoring device #1 and the monitoring device #2, the symbol M8 represents a message of confirmation of an operating condition of the subnetwork #3 or a response message transmitted between the monitoring device #1 and the monitoring device #3, the symbol M9 represents a message of confirmation of an operating condition of the subnetwork #1 or a response message transmitted between the monitoring device #2 and the monitoring device #1, the symbol M10 represents a message of confirmation of an operating condition of the subnetwork #3 or a response message transmitted between the monitoring device #2 and the monitoring device #3, the symbol M11 represents a message of confirmation of an operating condition of the subnetwork #1 or a response message transmitted between the monitoring device #3 and the monitoring device #1, and the symbol M12 represents a message of confirmation of an operating condition of the subnetwork #2 or a response message transmitted between the monitoring device #3 and the monitoring device #2.

The monitoring device #1 periodically inquires of the monitoring device #2 and the monitoring device #3 about the operating conditions of the transmission devices 2 in the subnetwork #2 allocated to the monitoring device #2 and the operating conditions of the transmission devices 2 in the subnetwork #3 allocated to the monitoring device #3, respectively. The monitoring device #2 which has received the inquiry reads the corresponding data (the information M2 as to the operating condition of the subnetwork #2) from the operating condition control table 35a and transmits a response to the monitoring device #1, and the monitoring device #3 reads the corresponding data (the information M3 as to the operating condition of the subnetwork #3) from the operating condition control table 35a and transmits a response to the monitoring device #1.

The monitoring device #1, which has received these responses and which monitors only the transmission devices 2 in the subnetwork #1 allocated to the monitoring device #1, is capable of recognizing the operating conditions of the transmission devices 2 in the subnetworks #2 and #3. Therefore, the monitoring device #1 is capable of recognizing the operating conditions of the transmission devices 2 in the network as a whole as well as the operating condition of the allocated transmission devices 2 allocated to the monitoring device #1.

The monitoring device #1 not only periodically inquires of the other monitoring devices 7 about the operating condition of the other monitoring devices 7, but also inquires of the other monitoring device #2 about the operating conditions of the transmission devices 2 in the subnetwork #2 allocated thereto and of the other monitoring device #3 about the operating conditions of the transmission devices 2 in the subnetwork #3 allocated thereto at the point of time when there is a change in the operating condition of a transmission device 2 in the subnetwork #1 allocated to the monitoring device #1. The monitoring device #2 which has received the inquiry reads the corresponding data (the information M2 as to the operating condition of the subnetwork #2) from the operating condition control table 35a and transmits a response to the monitoring device #1, and the monitoring device #3 reads the corresponding data (the information M3 as to the operating condition of the subnetwork #3) from the operating condition control table 35a and transmits a response to the monitoring device #1.

The monitoring device #1, which has received these responses, is capable of recognizing the operating conditions of the transmission devices 2 in the subnetworks #2 and #3 at the point of time when there is a change in a transmission device 2 in the subnetwork #1 allocated to the monitoring device #1. Therefore, the monitoring device #1 is capable of recognizing the operating conditions of the transmission devices 2 in the network as a whole as well as the operating conditions of the transmission devices 2 in the allocated subnetwork #1.

Although the monitoring device #1 is cited as an example in the above explanation, the same is applied to the monitoring devices #2 and #3.

(e-5) Explanation of a fifth example of the monitoring operation

Figure 13:
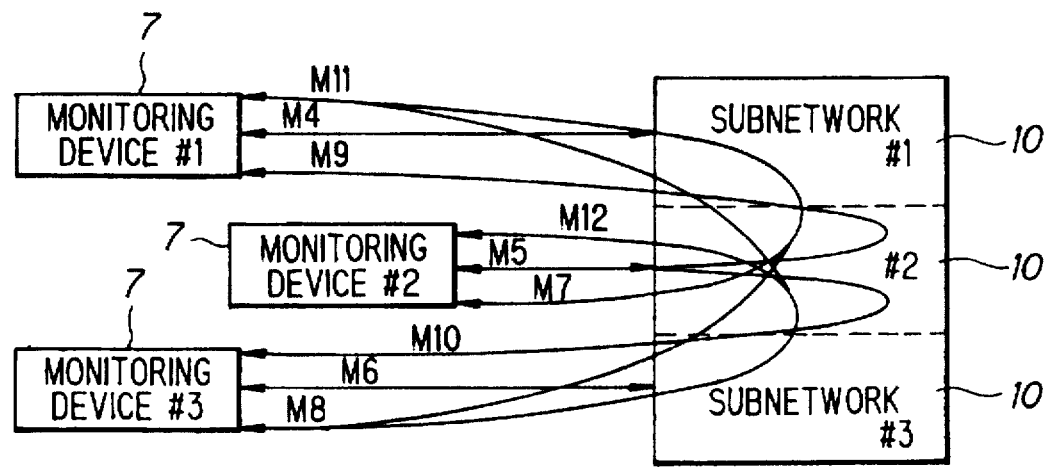
FIG. 13 is an explanatory view of a fifth example of the operation of the first embodiment of the present invention.

FIG. 13 is an explanatory view of a fifth example of the monitoring operation in the present invention. The same reference numerals are provided for the elements which are the same as those shown in FIG. 9. In FIG. 13, the symbol M4 represents a message (a message CMD of confirmation of an operation condition/a response message RSP/a message RPT reporting a change in the operating condition) transmitted and received between the monitoring device #1 and a transmission device in the subnetwork #1, the symbol M5 represents a message CMD/RSP/RPT transmitted and received between the monitoring device #2 and a transmission device in the subnetwork #2, and the symbol M6 represents a message CMD/RSP/RPT transmitted and received between the monitoring device #3 and a transmission device in the subnetwork #3. The symbol M7 represents a message of confirmation of an operating condition of the subnetwork #2 or a response message transmitted between the monitoring device #1 and the monitoring device #2, the symbol M8 represents a message of confirmation of an operating condition of the subnetwork #3 or a response message transmitted between the monitoring device #1 and the monitoring device #3, the symbol M9 represents a message of confirmation of an operating condition of the subnetwork #1 or a response message transmitted between the monitoring device #2 and the monitoring device #1, the symbol M10 represents a message of confirmation of an operating condition of the subnetwork #3 or a response message transmitted between the monitoring device #2 and the monitoring device #3, the symbol M11 represents a message of confirmation of an operating condition of the subnetwork #1 or a response message transmitted between the monitoring device #3 and the monitoring device #1, and the symbol M12 represents a message of confirmation of an operating condition of the subnetwork #2 or a response message transmitted between the monitoring device #3 and the monitoring device #2.

The monitoring device #1 periodically inquires of the monitoring device #2 and the monitoring device #3 about the operating conditions of the transmission devices 2 in the subnetwork #2 allocated to the monitoring device #2 and the operating conditions of the transmission devices 2 in the subnetwork #3 allocated to the monitoring device #3, respectively, through the communication lines 3.

Actually, in the structure shown in FIG. 3, the monitoring device #1 transmits the inquiry to the transmission device #1 through the monitor line #63. The transmission device #1 transmits the inquiry to the transmission device #4 through the communication line #53, and the transmission device #4 transmits it to the transmission device #7 through the communication line #55. The transmission device #7 transmits the inquiry to the monitoring device #2 through the monitor line #64, and also transmits it to the transmission device #10 through the communication line #57. The transmission device #10 transmits the inquiry to the transmission device #13 through the communication line #58, and the transmission device #13 transmits it to the monitoring device #3 through the monitor line #65.

The monitoring devices #2 and #3 which have received the inquiry read the corresponding data (the information M2 and M3 as to the operating conditions of the subnetworks #2 and #3) from the operating condition control tables 35a and transmit responses to the monitoring device #1. The responses are transmitted to the monitoring device #1 on the reverse route to the route on which the inquiry has been transmitted.

The monitoring device #1 which has received these responses is capable of recognizing the operating conditions of the transmission devices 2 in the subnetworks #2 and #3 allocated to the other monitoring devices 7. In other words, the monitoring device #1 is capable of recognizing the operating conditions of the transmission devices 2 in the network as a whole as well as the operating condition of the transmission devices e allocated thereto. In this manner, since the monitoring devices 7 periodically transmit the operating conditions of the transmission devices 2 to each other through the communication lines 3 in the network, each monitoring device 7 is capable of recognizing the operating conditions of the transmission devices 2 in the network as a whole.

When any change is caused in the operating condition of a transmission device 2 in the subnetwork #1, the monitoring device #1 inquires of the monitoring device #2 and the monitoring device #3 about the operating conditions of the transmission devices 2 in the subnetwork #2 allocated to the monitoring device #2 and the operating conditions of the transmission devices 2 in the subnetwork #3 allocated to the monitoring device #3, respectively, through the communication lines 3 in the network. The inquiry route is the same as the periodical inquiry route.

The monitoring devices #2 and #3 which have received the inquiry read the corresponding data (the information M2 and M3 as to the operating condition of the subnetworks #2 and #3) from the operating condition control tables 35a and transmit responses to the monitoring device #1. The responses are transmitted to the monitoring device #1 on the reverse route to the route on which the inquiry has been transmitted.

The monitoring device #1, which has received these responses, is capable of recognizing the operating conditions of the transmission devices 2 in the subnetworks #2 and #3 at the point of time when there is a change in a transmission device 2 in the subnetwork #1 allocated to the monitoring device #1. In other words, the monitoring device #1 is capable of recognizing the operating conditions of the transmission devices 2 in the network as a whole as well as the operating condition of the transmission devices allocated thereto. In this manner, since the monitoring devices 7 transmit the operating conditions of the transmission devices 2 to each other through the communication lines 3 in the network, it is possible to recognize the operating conditions of the transmission devices 2 in the network as a whole at the point of time when any change is caused in a transmission device 2 in any subnetwork.

Although the monitoring device #1 is cited as an example in the above explanation, the same is applied to the monitoring devices #2 and #3.

(e-6) Explanation of a sixth example of the monitoring operation

Figure 14:
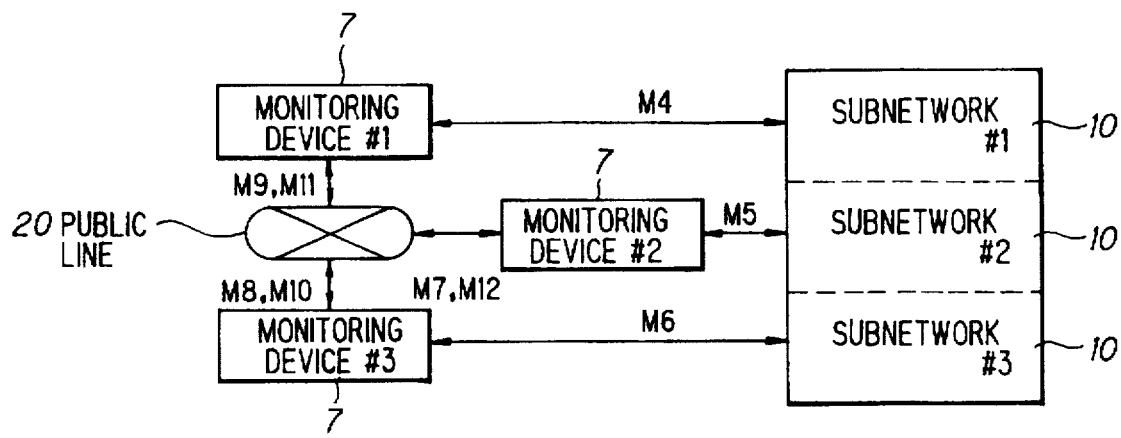
FIG. 14 is an explanatory view of a sixth example of the operation of the first embodiment of the present invention.

FIG. 14 is an explanatory view of a sixth example of the monitoring operation in the present invention. The same reference numerals are provided for the elements which are the same as those shown in FIG. 11. In FIG. 14, the symbol M4 represents a message (a message CMD of confirmation of an operation condition/a response message RSP/a message RPT reporting a change in the operating condition) transmitted and received between the monitoring device #1 and a transmission device in the subnetwork #1, the symbol M5 represents a message CMD/RSP/RPT transmitted and received between the monitoring device #2 and a transmission device in the subnetwork #2, and the symbol M6 represents a message CMD/RSP/RPT transmitted and received between the monitoring device #3 and a transmission device in the subnetwork #3. The symbol M7 represents a message of confirmation of an operating condition of the subnetwork #2 or a response message transmitted between the monitoring device #1 and the monitoring device #2, the symbol M8 represents a message of confirmation of an operating condition of the subnetwork #3 or a response message transmitted between the monitoring device #1 and the monitoring device #3, the symbol M9 represents a message of confirmation of an operating condition of the subnetwork #1 or a response message transmitted between the monitoring device #2 and the monitoring device #1, the symbol M10 represents a message of confirmation of an operating condition of the subnetwork #3 or a response message transmitted between the monitoring device #2 and the monitoring device #3, the symbol M11 represents a message of confirmation of an operating condition of the subnetwork #1 or a response message transmitted between the monitoring device #3 and the monitoring device #1, and the symbol M12 represents a message of confirmation of an operating condition of the subnetwork #2 or a response message transmitted between the monitoring device #3 and the monitoring device #2.

The monitoring device #1 periodically inquires of the monitoring device #2 and the monitoring device #3 about the operating conditions of the transmission devices 2 in the subnetwork #2 allocated to the monitoring device #2 and the operating conditions of the transmission devices 2 in the subnetwork #3 allocated to the monitoring device #3, respectively, through the public lines 20. Actually, in the structure shown in FIG. 3, the monitoring device #1 transmits the inquiry information M1 as to the operating condition to the monitoring device #2 through the public line #66, and to the monitoring device #3 through the public line #68.

The monitoring device #2 which has received the inquiry reads the corresponding data (the information M2 as to the operating condition of the subnetwork #2) from the operating condition control table 35a and transmits a response to the monitoring device #1 through the public line #66, and the monitoring device #3 reads the corresponding data (the information M3 as to the operating condition of the subnetwork #3) from the operating condition control table 35a and transmits a response to the monitoring device #1 through the public line #68.

The monitoring device #1, which has received these responses, is capable of recognizing the operating conditions of the transmission devices 2 in the subnetworks #2 and #3. In other words, the monitoring device #1 is capable of recognizing the operating conditions of the transmission devices 2 in the network as a whole as well as the operating conditions of the transmission devices 2 in the subnetwork #1 allocated thereto. In this manner, since the monitoring devices 7 periodically transmit the operating conditions of the transmission devices 2 to each other through the public lines 20, each monitoring device 7 is capable of recognizing the operating conditions of the transmission devices 2 in the network as a whole.

When any change is caused in the operating condition of a transmission device 2 in the subnetwork #1, the monitoring device #1 inquires of the monitoring device #2 and the monitoring device #3 about the operating conditions of the transmission devices 2 in the subnetwork #2 allocated to the monitoring device #2 and the operating conditions of the transmission devices 2 in the subnetwork #3 allocated to the monitoring device #3, respectively, through the public lines 20. The monitoring devices #2 and #3 which have received the inquiry read the corresponding data (the information M2 and M3 as to the operating condition of the subnetworks #2 and #3) from the operating condition control tables 35a and transmit responses to the monitoring device #1 through the public lines #66 and #68, respectively.

The monitoring device #1, which has received these responses, is capable of recognizing the operating conditions of the transmission devices 2 in the subnetworks #2 and #3 at the point of time when there is a change in a transmission device 2 in the subnetwork #1 allocated to the monitoring device #1, and is capable of recognizing the operating conditions of the transmission devices 2 in the network as a whole. In this manner, since the monitoring devices 7 transmit the operating conditions of the transmission devices 2 to each other through the public lines 20, it is possible to recognize the operating conditions of the transmission devices 2 in the network as a whole at the point of time when any change is caused in a transmission device 2 in any subnetwork.

Although the monitoring device #1 is cited as an example in the above explanation, the same is applied to the monitoring devices #2 and #3.

(e-7) Explanation of a seventh example of the monitoring operation

Figure 15:
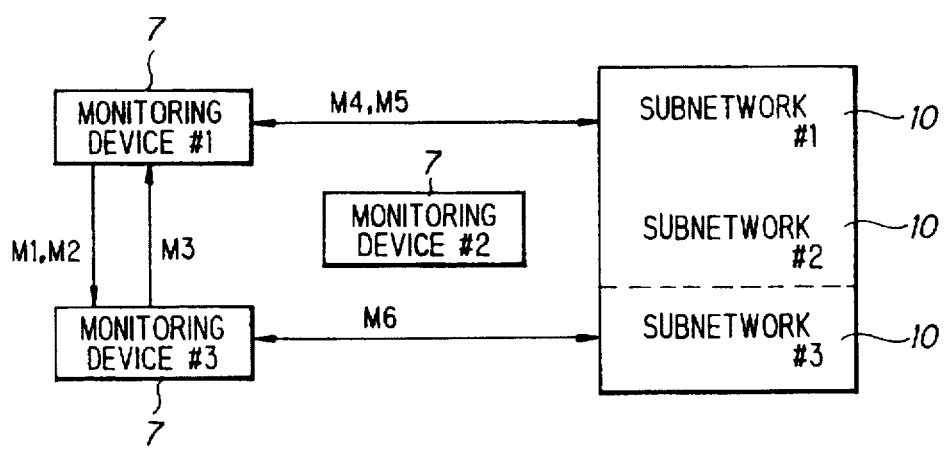
FIG. 15 is an explanatory view of a seventh example of the operation of the first embodiment of the present invention.

FIG. 15 is an explanatory view of a seventh example of the monitoring operation in the present invention. The same reference numerals are provided for the elements which are the same as those shown in FIG. 9. In FIG. 15, the symbol M1 represents information as to the operating condition of a transmission device 2 in the subnetwork #1, M2 information as to the operating condition of a transmission device 2 in the subnetwork #2, and M3 information as to the operating condition of a transmission device 2 in the subnetwork #3. The symbol M4 represents a message (a message CMD of confirmation of an operation condition/a response message RSP/a message RPT reporting a change in the operating condition) transmitted and received between the monitoring device #1 and a transmission device 2 in the subnetwork #1, the symbol M5 represents a message CMD/RSP/RPT transmitted and received between the monitoring device #1 and a transmission device 2 in the subnetwork #2, and the symbol M6 represents a message CMD/RSP/RPT transmitted and received between the monitoring device #3 and a transmission device 2 in the subnetwork #3.

When the monitoring device #2 stops operation due to a trouble or the like, since the operating conditions of the other monitoring devices are transmitted to the monitoring device #1 through the communication lines 3 or the public lines 20, the monitoring device #1 recognizes that the monitoring device #2 has stopped operation. When the monitoring device #1 recognizes that the monitoring device #2 has stopped operation, the monitoring device #1 informs the other monitoring device 7 (in this case, the monitoring device #3) during operation that the subnetwork #2 allocated to the monitoring device #2 is to be monitored by the monitoring device #1, thereby preventing the other monitoring device 7 from contention for backup.

The monitoring device #1 adds the subnetwork #2 to the subnetwork #1 as the object of monitoring. That is, the monitoring device #1 monitors both the subnetworks #1 and #2. Although the load on the monitoring device #1 becomes temporarily heavy, it is possible to prevent a situation in which the subnetwork #2 is not monitored by any monitoring device and it is possible to monitor the operating condition of the network as a whole.

The monitoring device #1 reads the corresponding data (the information M1 and M2 as to the operating conditions of the subnetworks #1 and #2, respectively) from the operating condition control table 35a and periodically transmits the information M1, M2 to the monitoring device #3. The monitoring device #3, which has received the information M1, M2, is capable of recognizing the operating conditions of the transmission devices 2 in the subnetworks #1 and #2 allocated to the monitoring device #1, so that it is possible to recognize the operating conditions of the transmission devices 2 in the network as a whole as well as the operating conditions of the transmission devices 2 in the allocated subnetwork #3.

When any change is caused in a transmission device 2 in the subnetwork #1 or #2 allocated to the monitoring device #1, the monitoring device #1 inquires of the other monitoring device #3 about the operating condition of the subnetwork #3 allocated to the monitoring device #3 at this point of time. The monitoring device #3 which has received the inquiry reads the corresponding data (the information M3 as to the operating condition of the subnetwork #3) from the operating condition control table 35a, and transmits the response to the monitoring device #1.

The monitoring device #1 which has received the response is capable of recognizing the operating conditions of the transmission devices 2 in the subnetwork #3 allocated to the monitoring device #3 as well as the operating conditions of the transmission devices 2 in the allocated subnetworks #1 and #1. In this manner, the monitoring device #1 is capable of recognizing the operating conditions of the transmission devices 2 in the network as a whole at the point of time when there is a change in a transmission device 2 in the subnetwork #1 or #2.

Although the case in which the monitoring device #2 stops operation is cited as an example in the above explanation, the same is applied to the case in which the monitoring device #1 or #3 stops operation.

(e-8) Explanation of an eighth example of the monitoring operation

Figure 16:
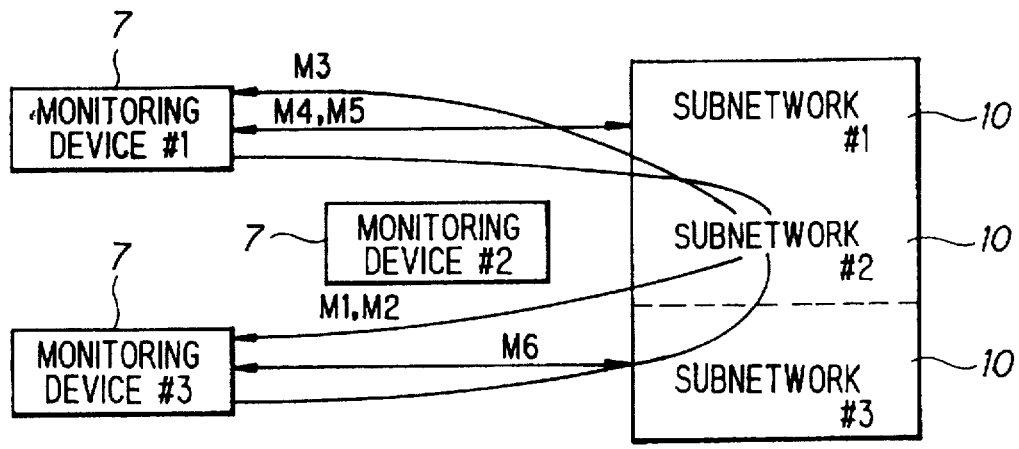
FIG. 16 is an explanatory view of an eighth example of the operation of the first embodiment of the present invention.

FIG. 16 is an explanatory view of an eighth example of the monitoring operation in the present invention. The same reference numerals are provided for the elements which are the same as those shown in FIG. 15. In FIG. 16, the symbol M1 represents information as to the operating condition of a transmission device 2 in the subnetwork #1, M2 information as to the operating condition of a transmission device 2 in the subnetwork #2, and M3 information as to the operating condition of a transmission device 2 in the subnetwork #3. The symbol M4 represents a message (a message CMD of confirmation of an operation condition/a response message RSP/a message RPT reporting a change in the operating condition) transmitted and received between the monitoring device #1 and a transmission device 2 in the subnetwork #1, the symbol M5 represents a message CMD/RSP/RPT transmitted and received between the monitoring device #1 and a transmission device 2 in the subnetwork #2, and the symbol M6 represents a message CMD/RSP/RPT transmitted and received between the monitoring device #3 and a transmission device 2 in the subnetwork #3.

When the monitoring device #2 stops operation due to a trouble or the like, the monitoring device #1 adds the subnetwork #2 to the subnetwork #1 as the object of monitoring. That is, the monitoring device #1 monitors both the subnetwork #1 and the subnetwork #2. The monitoring device #1 reads the corresponding data (the information M1 and M2 as to the operating condition of the subnetworks #1 and #2, respectively) from the operating condition control table 35a and periodically transmits the information M1, M2 to the monitoring device #3 through the communication lines 3 in the network.

Actually, in the structure shown in FIG. 3, the monitoring device #1 transmits the information M1, M2 to the transmission device #1 through the monitor line #63. The transmission device #1 transmits the information M1, M2 to the transmission device #4 through the communication line #53, and the transmission device #4 transmits it to the transmission device #7 through the communication line #55. The transmission device #7 transmits the information M1, M2 to the transmission device #10 through the communication line #57. The transmission device #10 transmits the information M1, M2 to the transmission device #13 through the communication line #58, and the transmission device #13 transmits it to the monitoring device #3 through the monitor line #65.

The monitoring device #3, which has received the information M1, M2, is capable of recognizing the operating conditions of the transmission devices 2 in the subnetworks #1 and #2 allocated to the other monitoring device #1. Therefore, the monitoring device #3 is capable of recognizing the operating conditions of the transmission devices 2 in the network as a whole as well as the operating condition of the allocated transmission devices 2. In this manner, since the monitoring devices 7 periodically transmit the operating conditions of the transmission devices 2 to each other through the communication lines 3 in the network, each monitoring device 7 is capable of recognizing the operating conditions of the transmission devices 2 in the network as a whole even if any monitoring device stops operation.

When any change is caused in the operating condition of a transmission device 2 in the subnetwork #1 or #2 allocated to the monitoring device #1, the monitoring device #1 inquires of the other monitoring device #3 about the operating conditions of the transmission devices 2 in the subnetwork #3 allocated to the monitoring device #3 through the communication line 3 in the network. The inquiry route is the same as the periodical inquiry route.

The monitoring device #3 which has received the inquiry reads the corresponding data (the information M3 as to the operating condition of the subnetwork #3) from the operating condition control tables 35a and transmits a response to the monitoring device #1. The response is transmitted to the monitoring device #1 on the reverse route to the route on which the inquiry has been transmitted.

The monitoring device #1, which has received these responses, is capable of recognizing the operating conditions of the transmission devices 2 in the subnetwork #3. Therefore, the monitoring device #1 is capable of recognizing the operating conditions of the transmission devices 2 in the network as a whole at the point of time when there is a change in a transmission device 2 in the allocated subnetwork #1 or #2.

In this manner, since the monitoring devices 7 transmit the operating conditions of the transmission devices 2 to each other through the communication lines 3 in the network, it is possible to recognize the operating conditions of the transmission devices 2 in the network as a whole at the point of time when any change is caused in a transmission device 2 in any subnetwork even if any monitoring device stops operation due to a trouble.

Although the case in which the monitoring device #2 stops operation is cited as an example in the above explanation, the same is applied to the case in which the monitoring device #1 or #3 stops operation.

(e-9) Explanation of a ninth example of the monitoring operation

Figure 17:
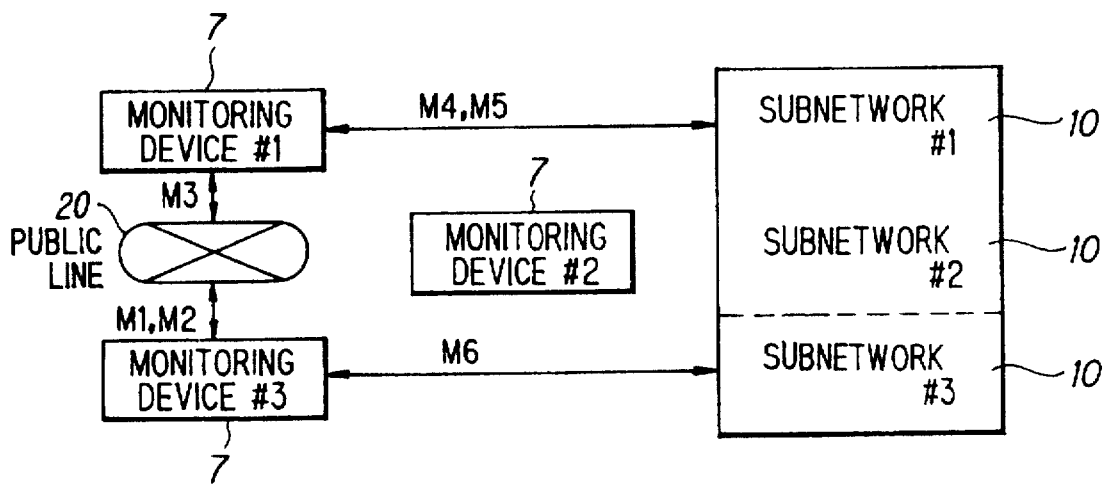
FIG. 17 is an explanatory view of a ninth example of the operation of the first embodiment of the present invention.

FIG. 17 is an explanatory view of a ninth example of the monitoring operation in the present invention. The same reference numerals are provided for the elements which are the same as those shown in FIG. 15. In FIG. 17, the symbol M1 represents information as to the operating condition of a transmission device 2 in the subnetwork #1, M2 information as to the operating condition of a transmission device 2 in the subnetwork #2, and M3 information as to the operating condition of a transmission device 2 in the subnetwork #3. The symbol M4 represents a message (a message CMD of confirmation of an operation condition/a response message RSP/a message RPT reporting a change in the operating condition) transmitted and received between the monitoring device #1 and a transmission device 2 in the subnetwork #1, the symbol M5 represents a message CMD/RSP/RPT transmitted and received between the monitoring device #1 and a transmission device 2 in the subnetwork #2, and the symbol M6 represents a message CMD/RSP/RPT transmitted and received between the monitoring device #3 and a transmission device 2 in the subnetwork #3.

When the monitoring device #2 stops operation due to a trouble or the like, the monitoring device #1 adds the subnetwork #2 to the subnetwork #1 as the object of monitoring. That is, the monitoring device #1 monitors both the subnetwork #1 and the subnetwork #2. The monitoring device #1 reads the corresponding data (the information M1 and M2 as to the operating condition of the subnetworks #1 and #2, respectively) from the operating condition control table 35a and periodically transmits the information M1, M2 to the monitoring device #3 through the public lines 3.

Actually, in the structure shown in FIG. 3, the monitoring device #1 transmits the information M1, M2 as to the operating condition to the monitoring device #3 through the public line #68. The monitoring device #3, which has received the information, is capable of recognizing the operating conditions of the transmission devices 2 in the subnetworks #1 and #2 allocated to the monitoring device #1. Therefore, the monitoring device #3 is capable of recognizing the operating conditions of the transmission devices 2 in the network as a whole including the subnetworks #1 and #2 as well as the operating condition of the allocated transmission devices 2. In this manner, each monitoring device 7 is capable of periodically recognizing the operating conditions of the transmission devices 2 through the public line 20.

When any change is caused in the operating condition of a transmission device 2 in the subnetwork #1 or #2 allocated to the monitoring device #1, the monitoring device #1 inquires of the other monitoring device #3 about the operating conditions of the transmission devices 2 in the subnetwork #3 allocated to the monitoring device #3 through the public lines 20.

Actually, in the structure shown in FIG. 3, the monitoring device #1 transmits the inquiry to the monitoring device #3 through the public line #68. The monitoring device #3 which has received the inquiry reads the corresponding data (the information M3 as to the operating condition of the subnetwork #3) from the operating condition control table 35a and transmits the response to the monitoring device #1. The monitoring device #1, which has received the response, is capable of recognizing the operating conditions of the transmission devices 2 in the subnetwork #3. Therefore, the monitoring device #1 is capable of recognizing the operating conditions of the transmission devices 2 in the network as a whole at the point of time when there is a change in a transmission device 2 in the allocated subnetwork #1 or #2. In this manner, since the monitoring devices 7 transmit the operating conditions of the transmission devices 2 to each other through the public lines 20, it is possible to recognize the operating conditions of the transmission devices 2 in the network as a whole at the point of time when any change is caused in a transmission device 2 in any subnetwork.

Although the case in which the monitoring device #2 stops operation is cited as an example in the above explanation, the same is applied to the case in which the monitoring device #1 or #3 stops operation. In the above explanation, there are three monitoring devices, but the number of monitoring devices is not limited to three and the present invention is applicable to a network including any number of monitoring devices. In addition, the number of subnetworks which are connected to the respective monitoring devices, the connecting state of the communication lines and connecting state of the monitor lines in the subnetworks, and the connecting state of the public lines are not limited to the structure shown in FIG. 3, and they are arbitrary.

(C) Second embodiment of the invention

(a) Monitoring system

Figure 18:
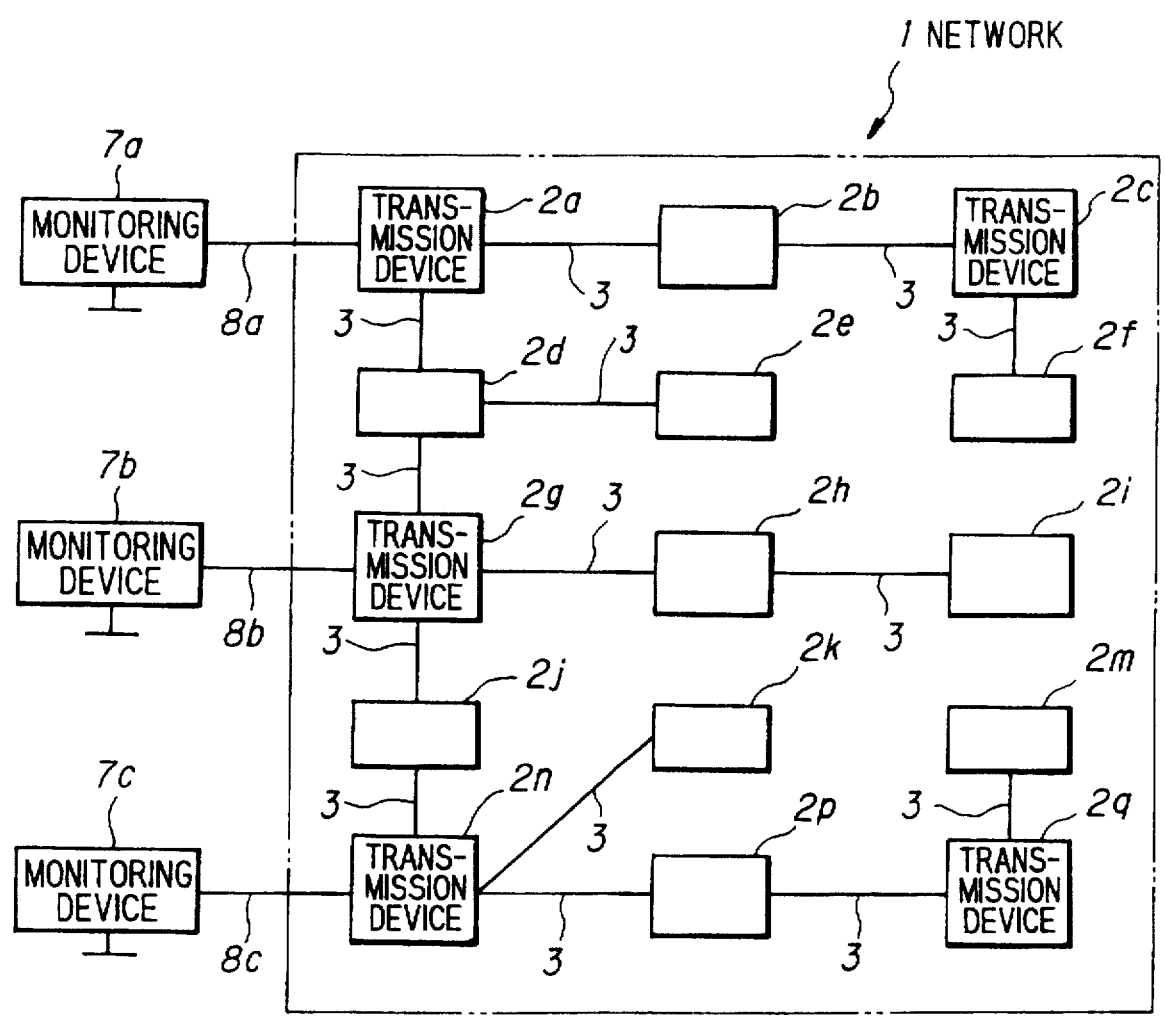
FIG. 18 shows the structure of a monitoring system of the second embodiment of the present invention.
Figure 19:
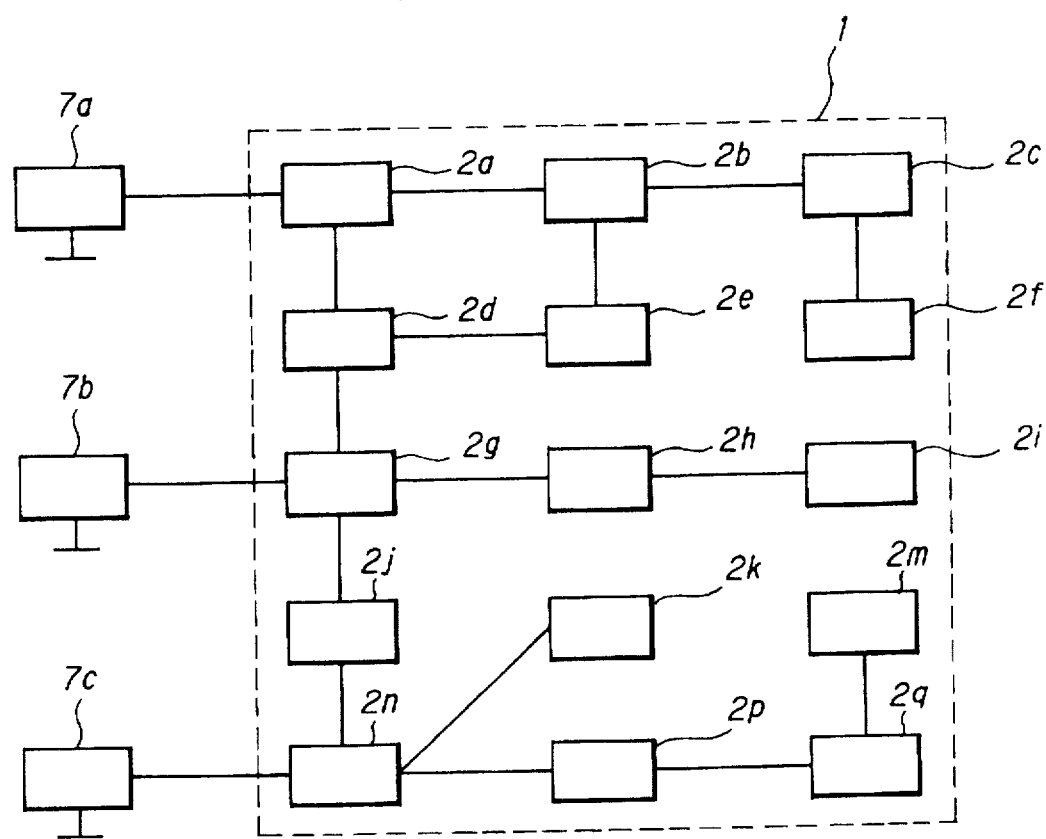
FIG. 19 is an explanatory view of a monitoring zone (first pattern)

FIG. 18 shows the structure of a monitoring system according to the present invention. In FIG. 18, the reference numeral 1 represents a network provided with a plurality of transmission devices for transmitting data and communication lines, 2a to 2q transmission devices, 3 a communication line, 7a to 7c monitoring devices, and 8a to 8c communication lines (monitor lines) connecting the monitoring devices 7a to 7c with the transmission devices 2a, 2g and 2n, respectively, in the network 1. The plurality of monitoring devices 7a to 7c monitor the operating conditions of the transmission devices 2a to 2q in the allocated monitoring zones, and the monitoring zone allocated to each monitoring device may be changed, as occasion demands.

FIGS. 19 to 24 are explanatory views of the patterns of a monitoring zone in the network which is allocated to the monitoring device 7a in advance. It is assumed that the other monitoring devices 7b and 7c also have a predetermined plurality of patterns. In a first pattern shown in FIG. 19, the monitoring device 7a monitors all the transmission devices 2a to 2q in the network 1. In a second pattern shown in FIG. 20, the monitoring device 7a monitors the transmission devices 2a, 2d, 2g, 2j and 2n. In a third pattern shown in FIG. 21, the monitoring device 7a monitors the transmission devices 2a, 2b, 2c, 2d, 2e and 2f. In a fourth pattern shown in FIG. 22, the monitoring device 7a monitors the transmission devices 2g, 2h, 2i, 2j, 2k and 2m. In a fifth pattern shown in FIG. 23, the monitoring device 7a monitors the transmission devices 2n, 2p and 2q. In a sixth pattern shown in FIG. 24, the monitoring device 7a monitors the transmission devices 2b, 2g and 2m.

Figure 25:
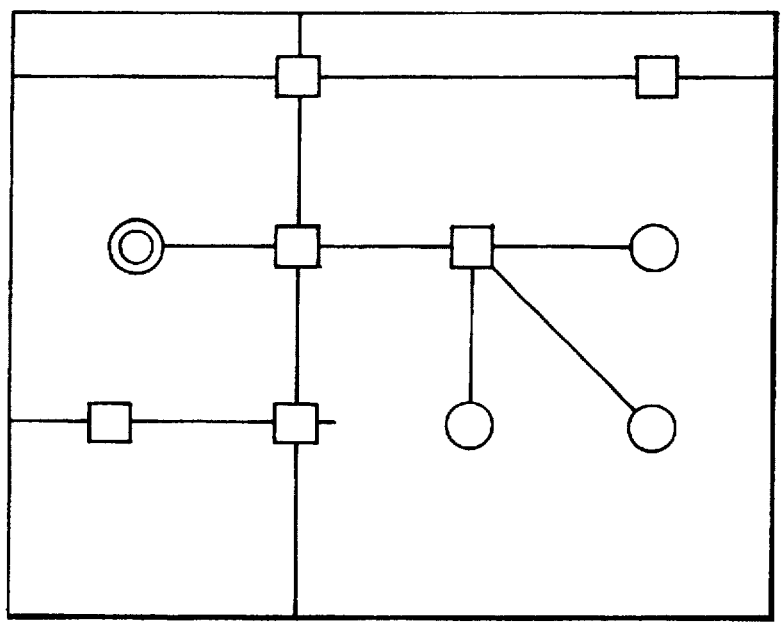
FIG. 25 is an explanatory view of a supervisory screen image.

Each of the monitoring devices 7a to 7c displays the supervisory screen image which corresponds to the monitoring zone on a display unit and also displays the operating condition of each transmission device in the corresponding monitoring zone in the supervisory screen image. FIG. 25 shows an example of the supervisory screen image. The double circle ⊙ represents a monitoring device, a square □ represents a station device, a single circle ○ represents a transmission device, and a line represents a transmission line. Comment is added in characters at an appropriate position. If the operating condition is normal, each portion is displayed in a green color, while if any trouble is caused, that portion is displayed in a red color. During a test, each portion is displayed in a violet color.

(b) Monitoring device

(b-1) Entire structure

Figure 26:
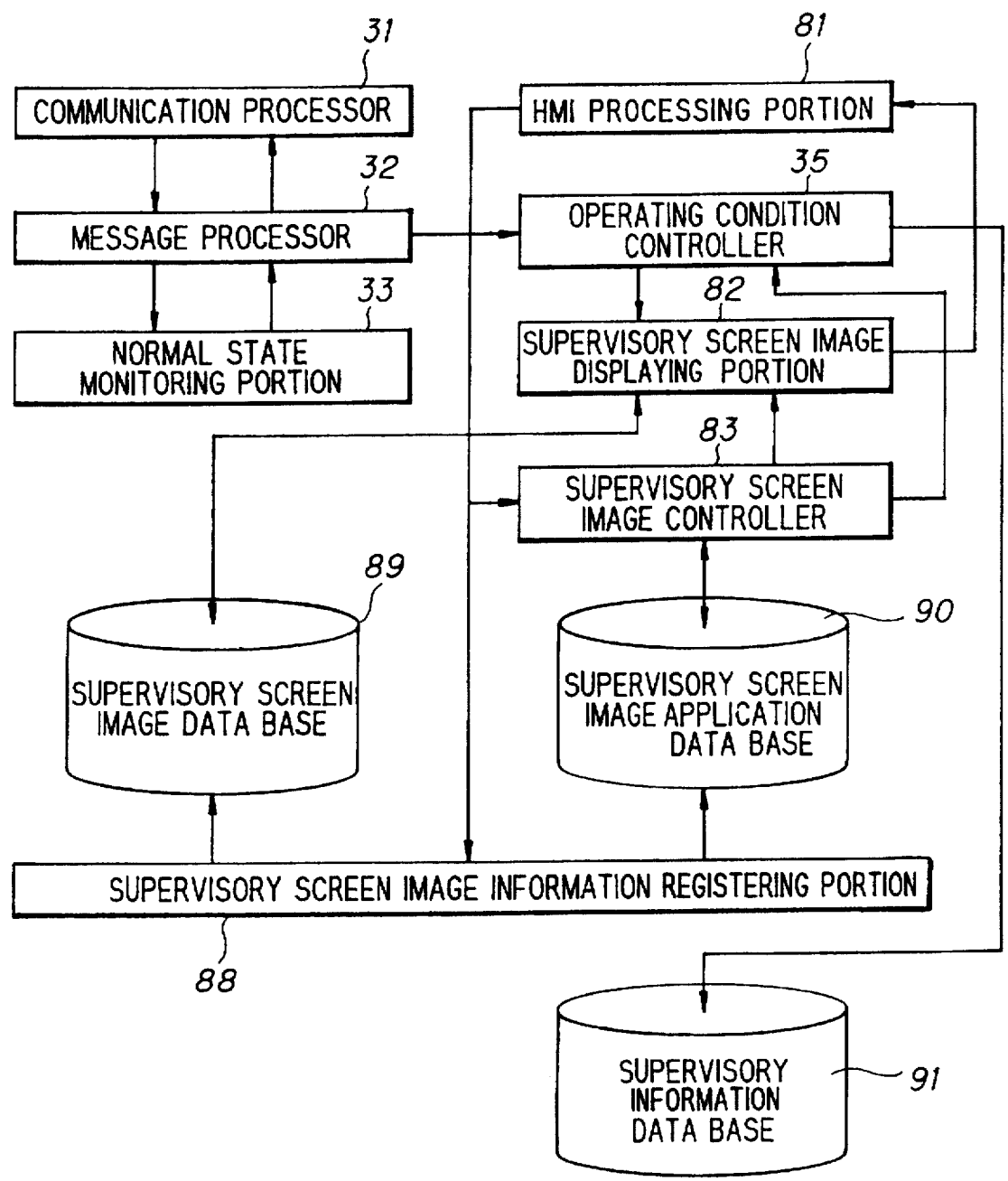
FIG. 26 shows the structure of a monitoring device according to the present invention.

FIG. 26 shows the structure of a monitoring device according to the present invention. The same numerals are provided for the elements which are the same as those shown in FIG. 5. In FIG. 26, the reference numeral 31 represents a communication processor, 32 a message processor, 33 a normal state monitoring portion, 35 an operating condition controller, 81 an HMI (Human Machine Interface) processing portion, 82 a supervisory screen image displaying portion, 83 a supervisory screen image controller, 88 a supervisory screen image information registering portion, 89 a supervisory screen image data base for storing supervisory screen image data, 90 a supervisory screen image application data base for storing supervisory screen image application data, and 91 a supervisory information data base for storing supervisory information.

The communication processor 31 transmits and receives a message between the monitoring device 7 and a transmission device 2 through the monitor line 8, and the message processor 32 analyzes the message transmitted from the communication processor 31 and transmits the message to the operating condition controller 35. The message processor 32 also requests the communication processor 31 to transmit the message CMD of confirmation of an operating condition which is transmitted from the normal state monitoring portion 33, and transmits, to the operating condition controller 35, the response message RSP for confirming an operating condition and the message RPT reporting a change in the operating condition which are transmitted from a transmission device. The normal state monitoring portion 33 periodically issues the message CMD of confirmation of an operating condition to each transmission device as an object of monitoring. The operating condition controller 35 has a function of (1) controlling the operating condition of each transmission device in the network on the basis of the response message RSP for confirming an operating condition and the message RPT reporting a change in the operating condition which are transmitted from the message processor 32, (2) transmitting the control information to the supervisory screen image displaying portion 82 and the supervisory screen image controller 83, (3) transmitting the received supervisory information to the supervisory information data base 91, (4) processing the supervisory information (the response message RSP for confirming an operating condition and the message RPT reporting a change in the operating condition) as to a transmission device under the instruction from the supervisory screen image controller 83, and (5) transmitting the operating conditions of the transmission devices other than the transmission devices as the object of monitoring, to the supervisory screen image displaying portion 82.

(b-2) HMI processing portion

Figure 27:
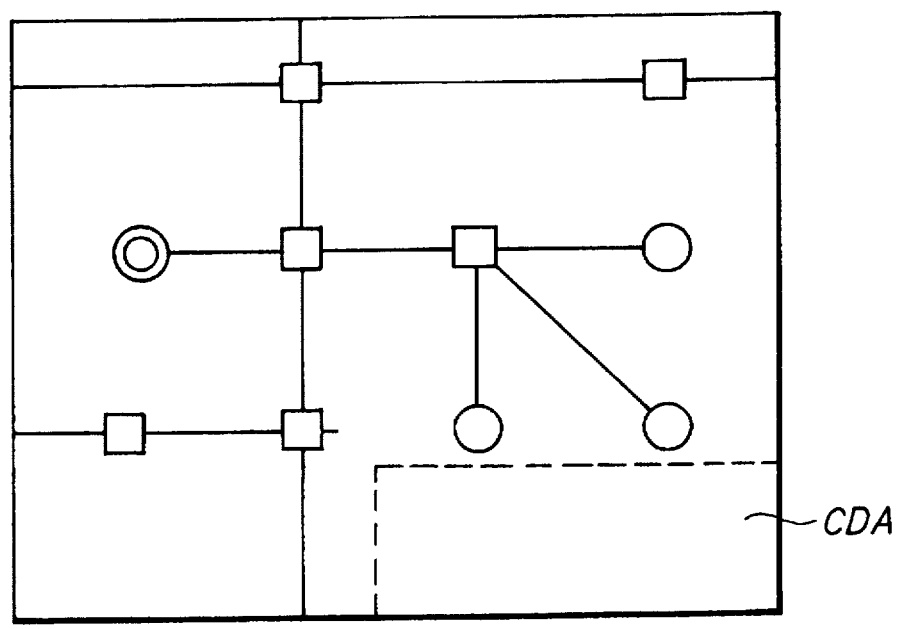
FIG. 27 is an explanatory view of a summarized display.

The HMI processing portion 81 displays the operating condition of each transmission device in the network on the CRT under the instruction from the supervisory screen image displaying portion 82, and also displays the operating conditions of the transmission devices outside of the monitoring zone in the form of a summarized display. The summarized display is a list of faulty devices or the operating conditions of these devices which are displayed in a part of area CDA of the supervisory screen image, as shown in FIG. 27.

(b-3) Supervisory image displaying portion

The supervisory screen displaying portion 82 requests the HMI processing portion 81 to display the operating condition of each transmission device in the network on the basis of the supervisory screen image data which is selected from the supervisory screen image data base 89 under the instruction from the supervisory screen image controller 83 and the supervisory information transmitted from the operating condition controller 35.

(b-4) Supervisory image controller

The supervisory screen image controller 83 determines which supervisory screen image data is selected from the supervisory screen image data which are registered in the supervisory screen image data base 89 (1) under the manual instruction from an operator or (2) under the automatic instruction based on the supervisory screen image application information for a trouble which is registered in advance or the supervisory screen image application information which is reserved for a designated time, and reports the numbers of the transmission devices which are to be monitored to the operating condition controller 35 on the basis of the selected supervisory screen image data.

(b-5) Supervisory image information registering portion

The supervisory screen image registering portion 88 has a function of creating supervisory screen image data in correspondence with the types of network monitoring (monitoring zone) and registering them in the supervisory screen image data base 89, and a function of registering supervisory screen image application information (the supervisory screen image application information for a trouble and the supervisory screen image application information which is reserved for a designated time) for automatically selecting/switching the supervisory screen image data in the supervisory screen image application data base 90 while using the information as to a trouble in a transmission device or a designated time as a trigger.

(b-6) Supervisory image data base

Figure 28:
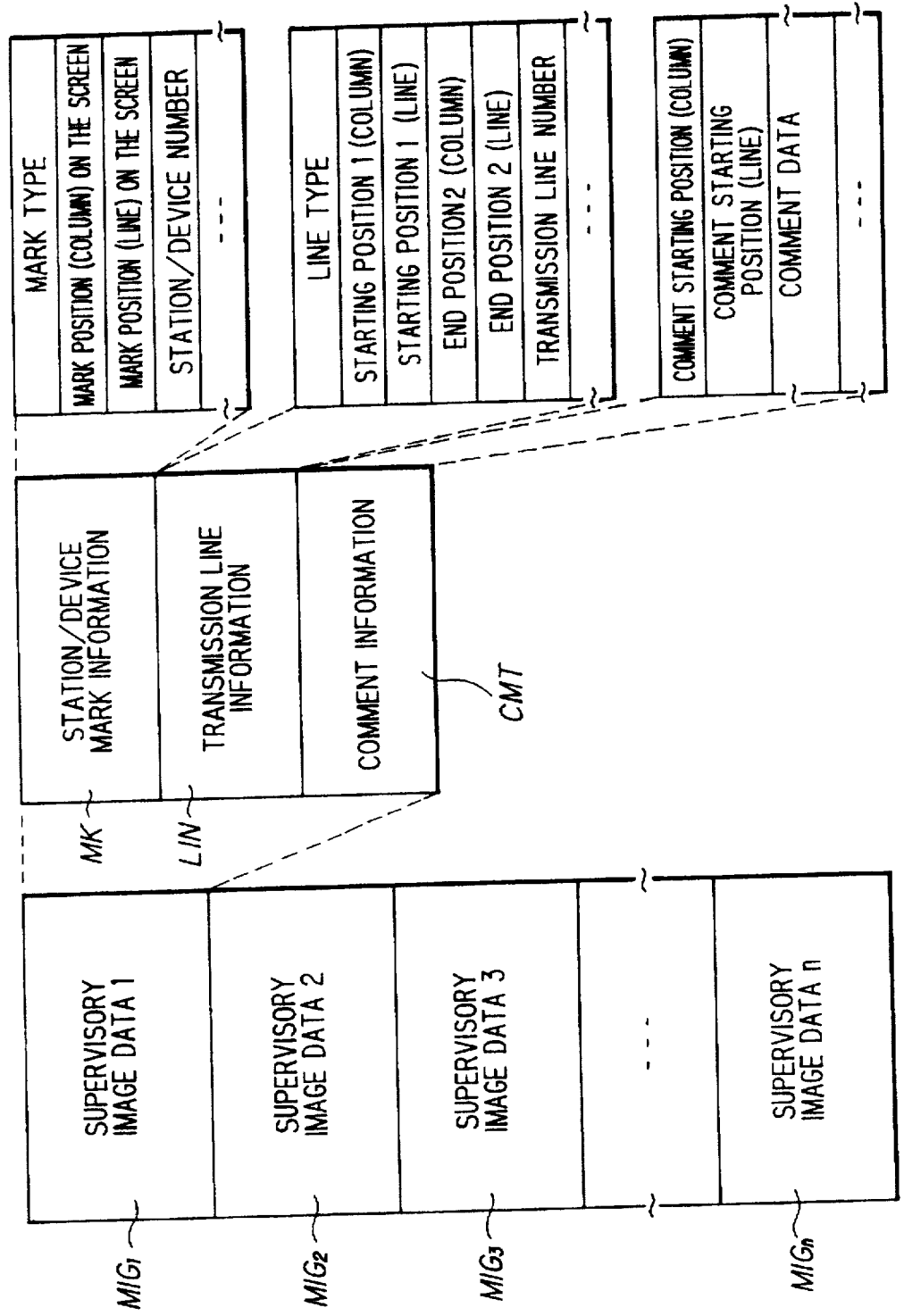
FIG. 28 is an explanatory view of supervisory screen image data.

The supervisory screen image data base 89 stores and holds various supervisory screen image data in correspondence with the types of network (monitoring zone) as the object of monitoring. For example, if it is assumed that there are six patterns of monitoring zones shown in FIGS. 19 to 24 for the monitoring device 7a, the supervisory screen image data which correspond to the six types of monitoring zones are registered in the supervisory screen image data base 89 via the supervisory screen image registering portion 88. FIG. 28 is an explanatory view of the supervisory screen image data. In FIG. 28, the symbols MIG1 to MIGn represent the supervisory screen image data which correspond to the respective monitoring zones (FIGS. 19 to 24), each of which consists of mark information MK about the mark of a station/device to be displayed in the supervisory screen image, transmission line information LIN about the line to be displayed in the supervisory screen image, and comment information CMT about the comment to be displayed in the supervisory screen image. The mark information MK includes mark type data, mark position data (line, column) and station/device number data. The transmission line information LIN includes line type data, line starting position data, line ending position data, and transmission line number. The comment information CMT includes comment starting position data and comment data. It is possible to display the supervisory screen image on the display unit, as shown in FIG. 25, by using such screen data.

(b-7) Supervisory image application data base

Figure 29:
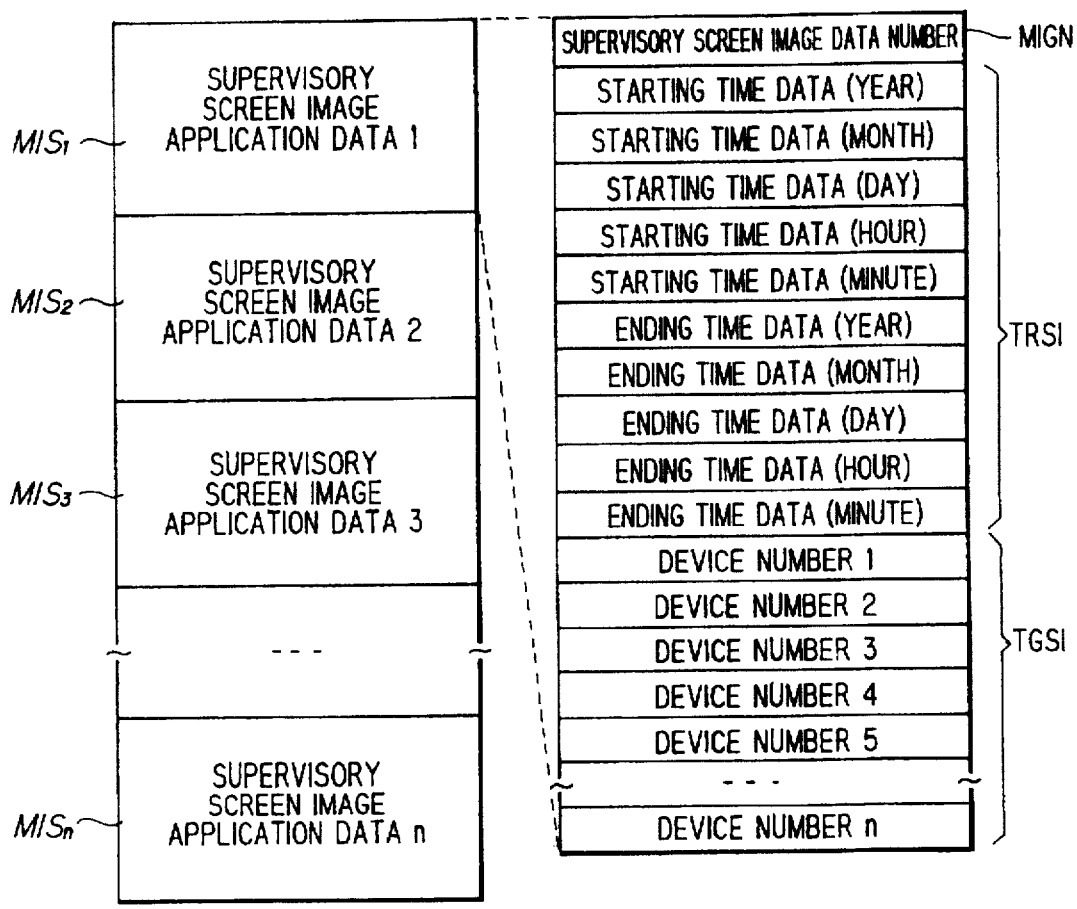
FIG. 29 is an explanatory view of supervisory screen image application information.

The supervisory screen image application data base 90 stores the supervisory screen image application information for automatically changing the supervisory screen image (monitoring zone) when a trouble is caused in a transmission device, and the supervisory screen image application information for automatically changing the supervisory screen image (monitoring zone) at a designated time. FIG. 29 is an explanatory view of the supervisory screen image application information registered in the supervisory screen image application data base 90. The supervisory screen image application information includes supervisory screen image application data MIS1 to MISn for the respective supervisory images (monitoring zones). Each of the supervisory screen image application data MIS1 to MISn includes (1) a supervisory screen image data number MIGN, (2) supervisory screen image display time information TRSI for switching the supervisory screen image over to the supervisory screen image (monitoring zone) which is designated by the supervisory screen image data number MIGN when a designated time comes, and (3) supervisory screen image application information TGSI for a trouble for switching the supervisory screen image over to the supervisory screen image (monitoring zone) which is designated by the supervisory screen image data number MIGN when a trouble is caused. The supervisory screen image display time information TRSI includes display starting time data (year, month, day, hour, minute) and display ending time data (year, month, day, hour, minute) for a designated time zone. The supervisory screen image application information TGSI includes a plurality of device numbers for devices in which a trouble is caused.

If the supervisory screen image display time information TRSI for a reserved display is registered, the supervisory screen image is automatically switched over to the supervisory screen image (monitoring zone) which is designated by the supervisory screen image data number MIGN when a designated time comes. If the supervisory screen image application information TGSI for a trouble is registered, the supervisory screen image is automatically switched over to the supervisory screen image (monitoring zone) which is designated by the supervisory screen image data number MIGN when a trouble is caused in a registered transmission device.

(b-8) Supervisory information data base

Figure 30:
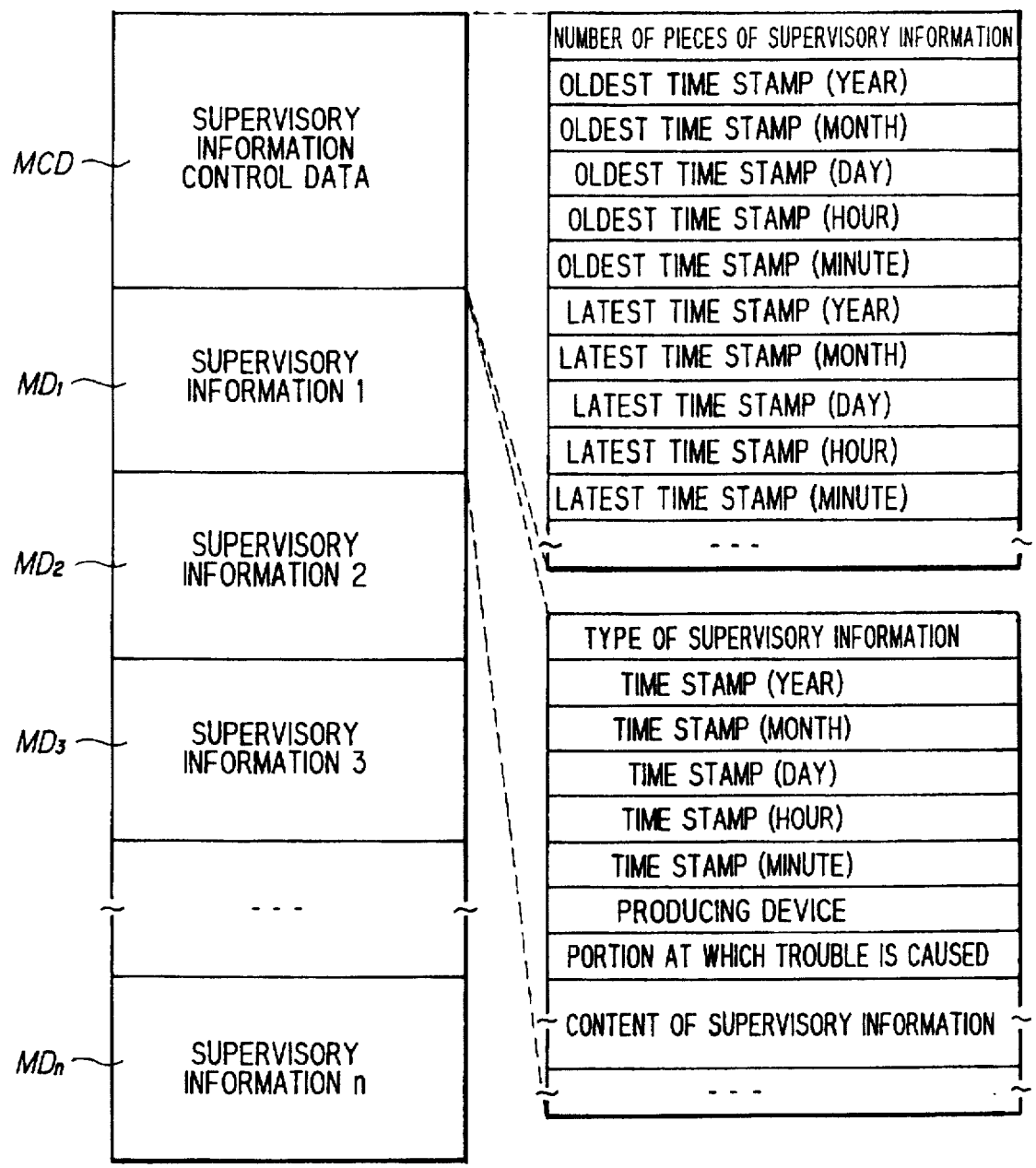
FIG. 30 is an explanatory view of supervisory information data.

The supervisory information data base 91 stores the supervisory information about a transmission device which is transmitted from the operating condition controller 35. FIG. 30 is an explanatory view of the supervisory information. The supervisory information includes supervisory information control data MCD and supervisory information items MD1 to MDn. The supervisory information control data MCD include the data on the number of items of supervisory information stored in the supervisory information data base 91, the date of storage of the oldest supervisory information and the date of storage of the latest supervisory information. Each item of supervisory information MD1 to MDn includes the type of supervisory information, the date of storage of supervisory information, a supervisory information generating device, information about the portion at which a trouble is caused, the content of supervisory information (e.g., content of the trouble), etc.

(c) Supervisory image selection control by the operation of an operator

Figure 31:
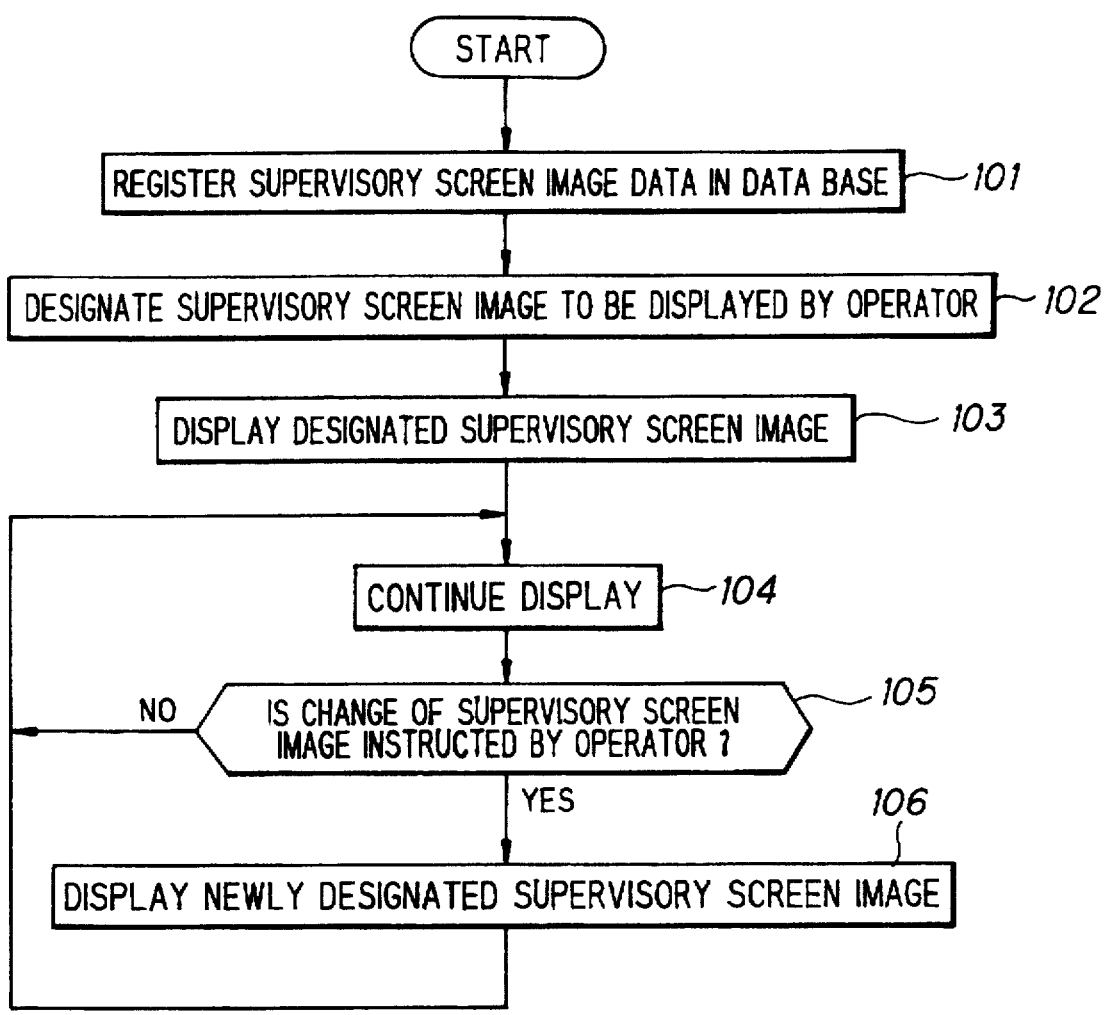
FIG. 31 is a flow chart of a first example of the supervisory screen image selection control by the operation of an operator.

(c-1) First example of the supervisory screen image selection control by the operation of an operator FIG. 31 is a flow chart of a first example of the supervisory screen image selection control by the operation of an operator.

The supervisory screen image data which correspond to various monitoring zones are registered in the supervisory screen image data base 89 via the supervisory screen image registering portion 88 (step 101). The supervisory screen image to be displayed, i.e., the monitoring zone of the monitoring device is then designated by using an operating portion of the HMI processing portion 81 such as the keyboard and the mouse (step 102). The supervisory screen image controller 83 inputs the supervisory screen image data number designated by the operator to the supervisory screen image displaying portion 82, and the supervisory screen image displaying portion 82 reads the supervisory screen image data which corresponds to the supervisory screen image data number from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 103).

The supervisory screen image is continued to be displayed thereafter (step 104) and, in this state, it is judged whether or not a change of the supervisory screen image is instructed by the operation of the operator (step 105), and if the answer is in the negative, the supervisory screen image is continued to be displayed. On the other hand, if the operator instructs the supervisory screen image to be changed over to another supervisory screen image, the designated supervisory screen image is displayed on the display unit by the same processing as in the step 103 (step 106), and the processing at the step 104 and thereafter is continued.

(c-2) Second example of the supervisory screen image selection control by the operation of an operator In the supervisory screen image selection control shown in FIG. 31, only the control of the display of a supervisory screen image is explained, but actually the operating conditions of transmission devices are displayed in the supervisory screen image.

Figure 32:
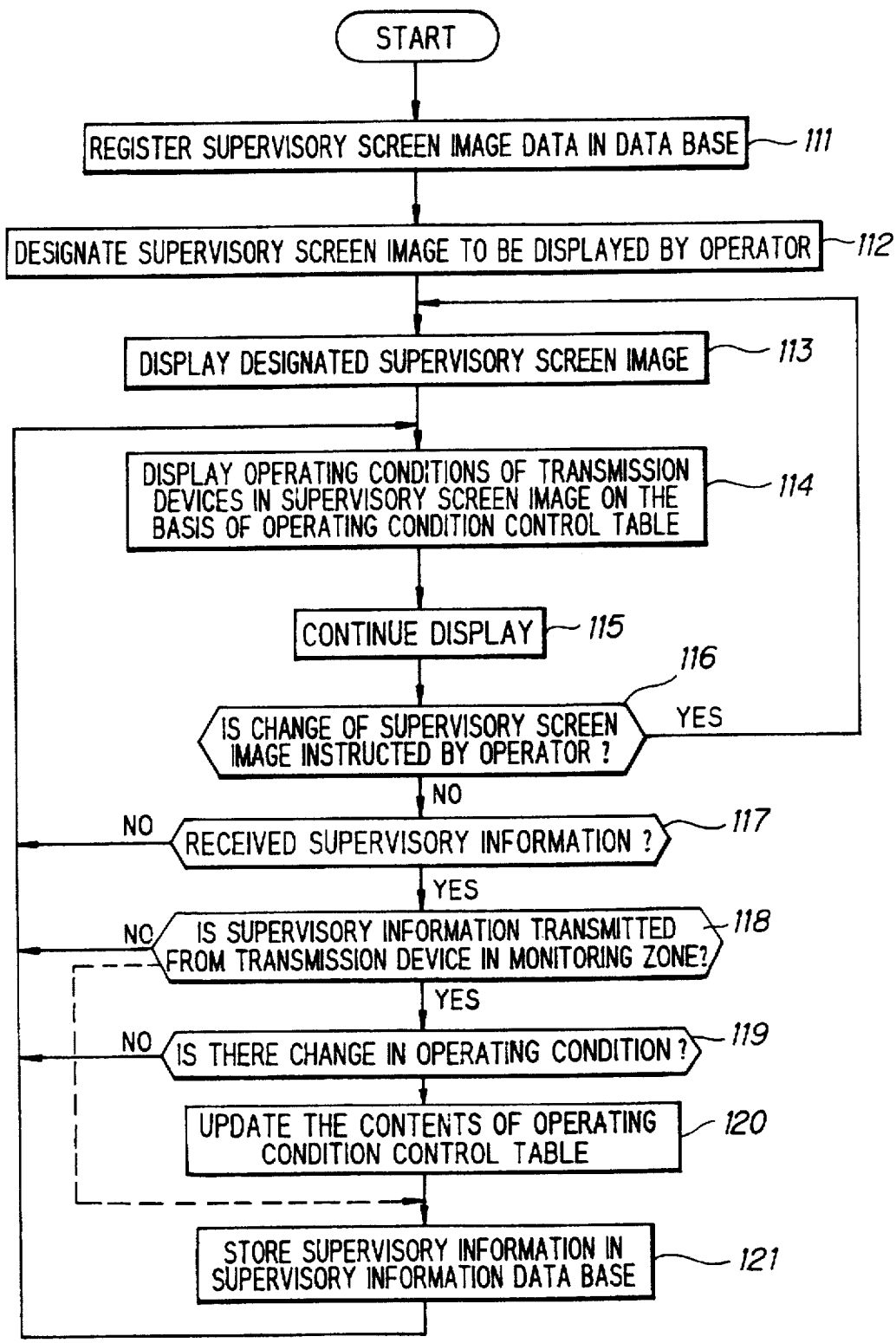
FIG. 32 is a flow chart of a second example of the supervisory screen image selection control by the operation of an operator.

FIG. 32 is a flow chart of a second example of the supervisory screen image selection control for displaying the operating conditions as well as a supervisory screen image by the operation of an operator.

Figure 20:
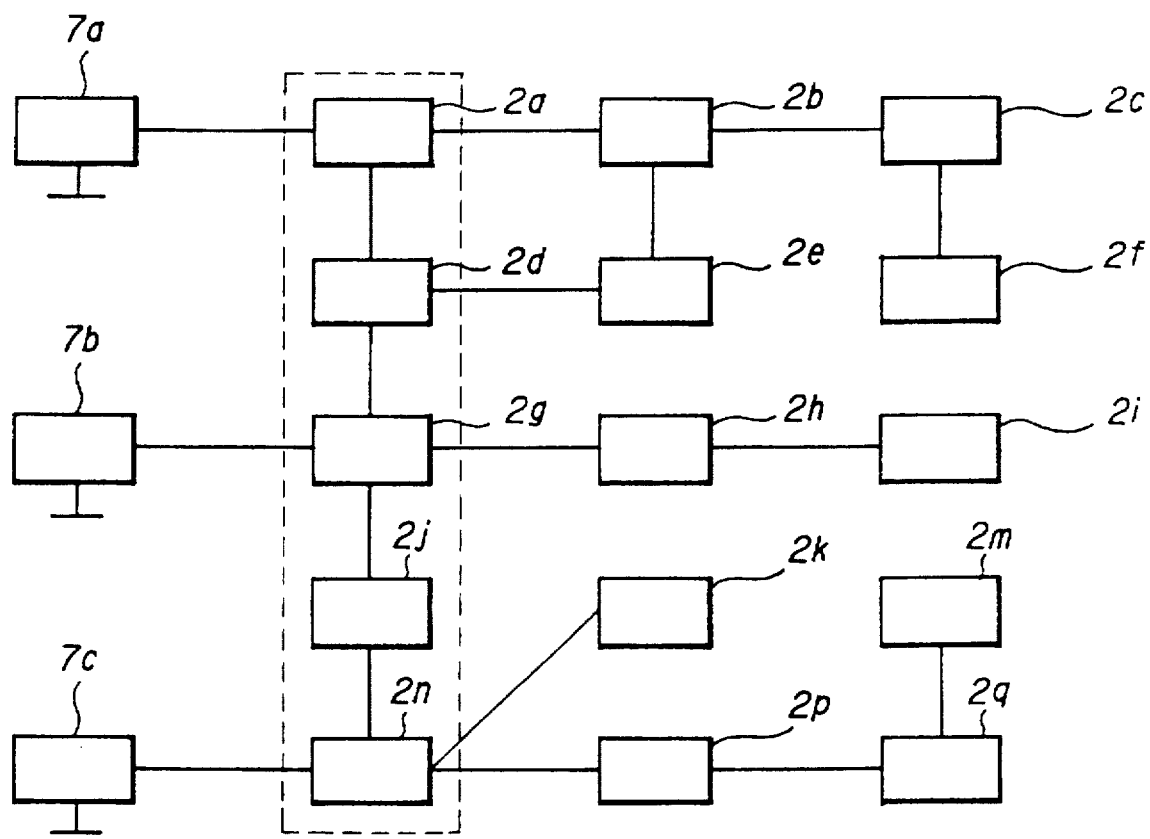
FIG. 20 is an explanatory view of a monitoring zone (second pattern)
Figure 21:
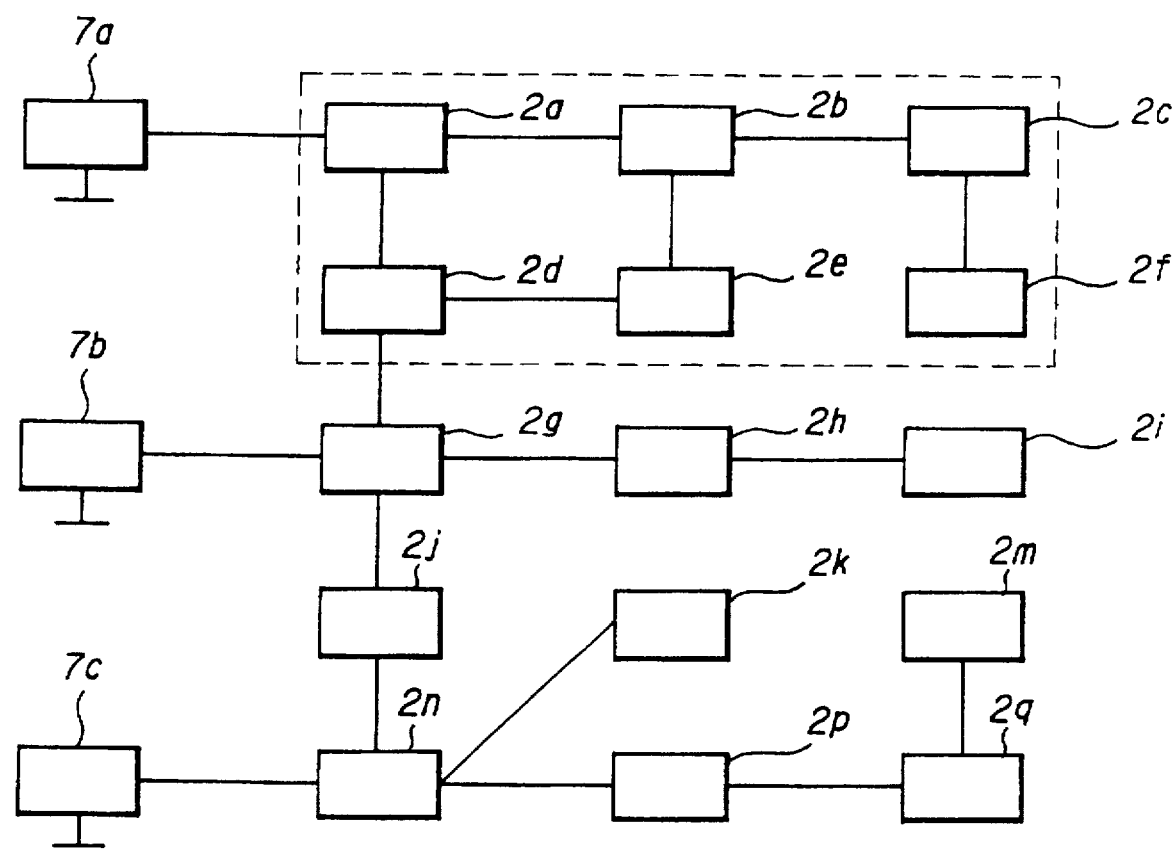
FIG. 21 is an explanatory view of a monitoring zone (third pattern)
Figure 22:
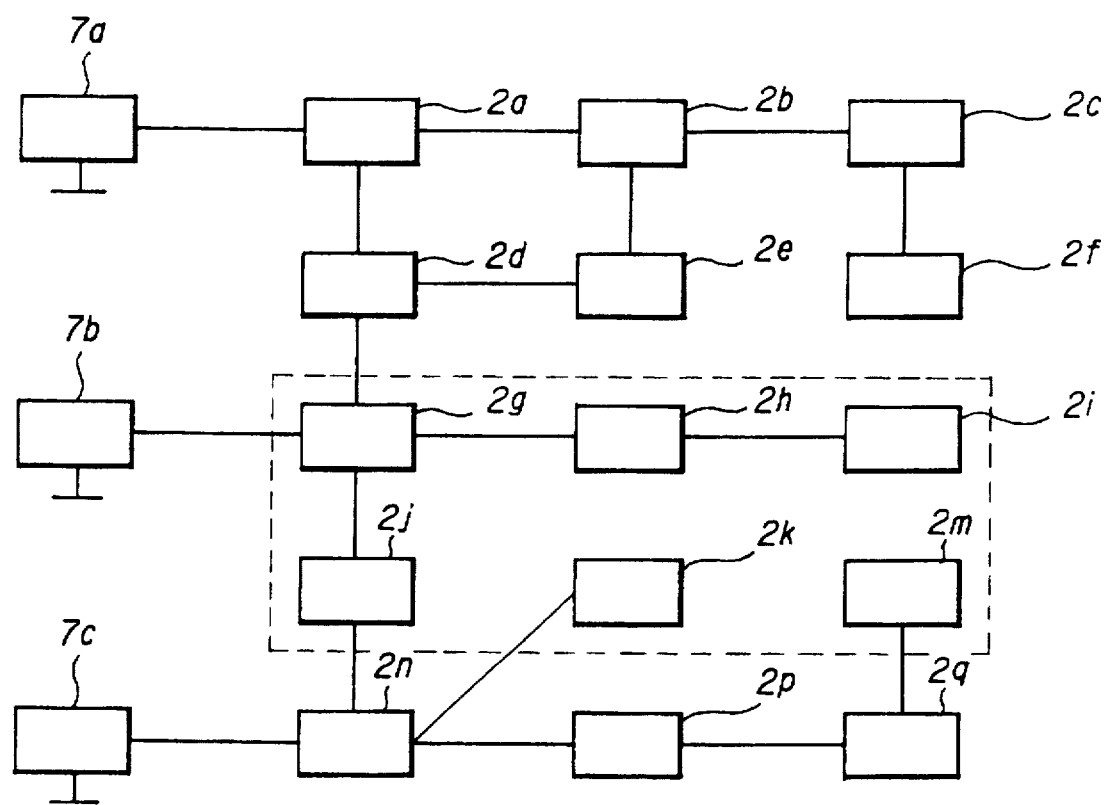
FIG. 22 is an explanatory view of a monitoring zone (fourth pattern)
Figure 23:
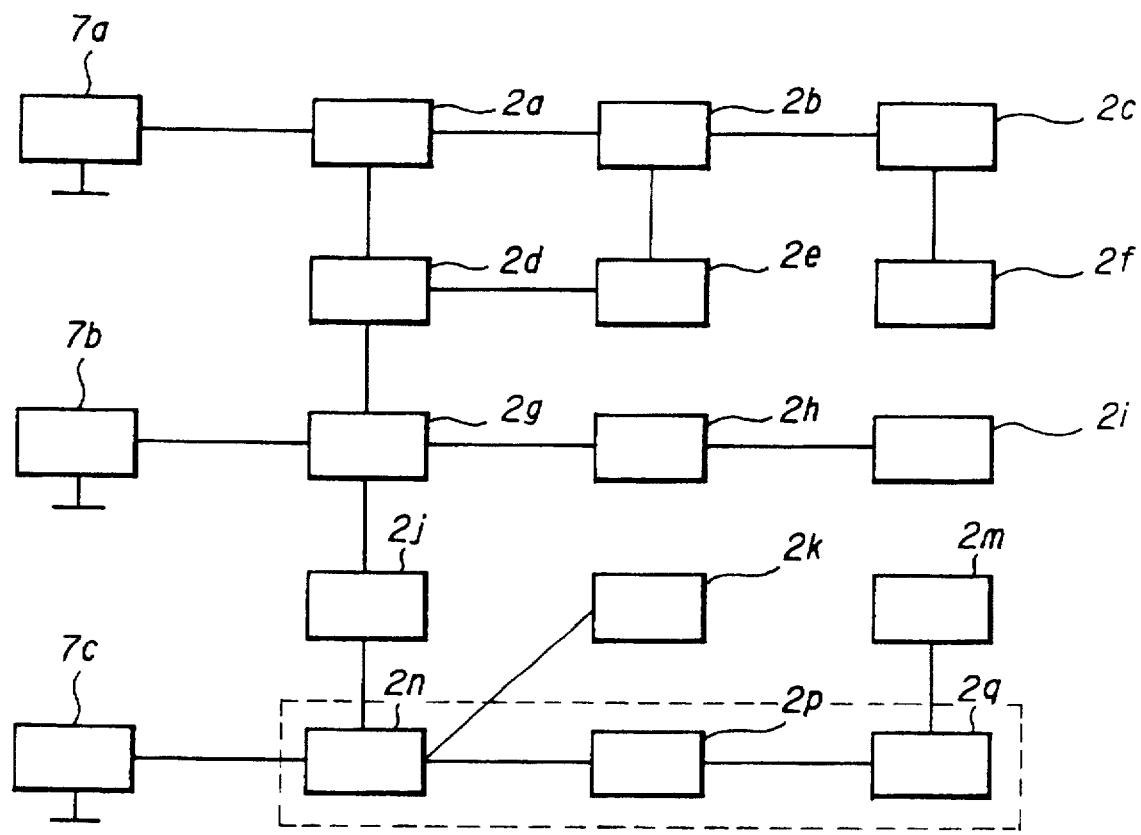
FIG. 23 is an explanatory view of a monitoring zone (fifth pattern)
Figure 24:
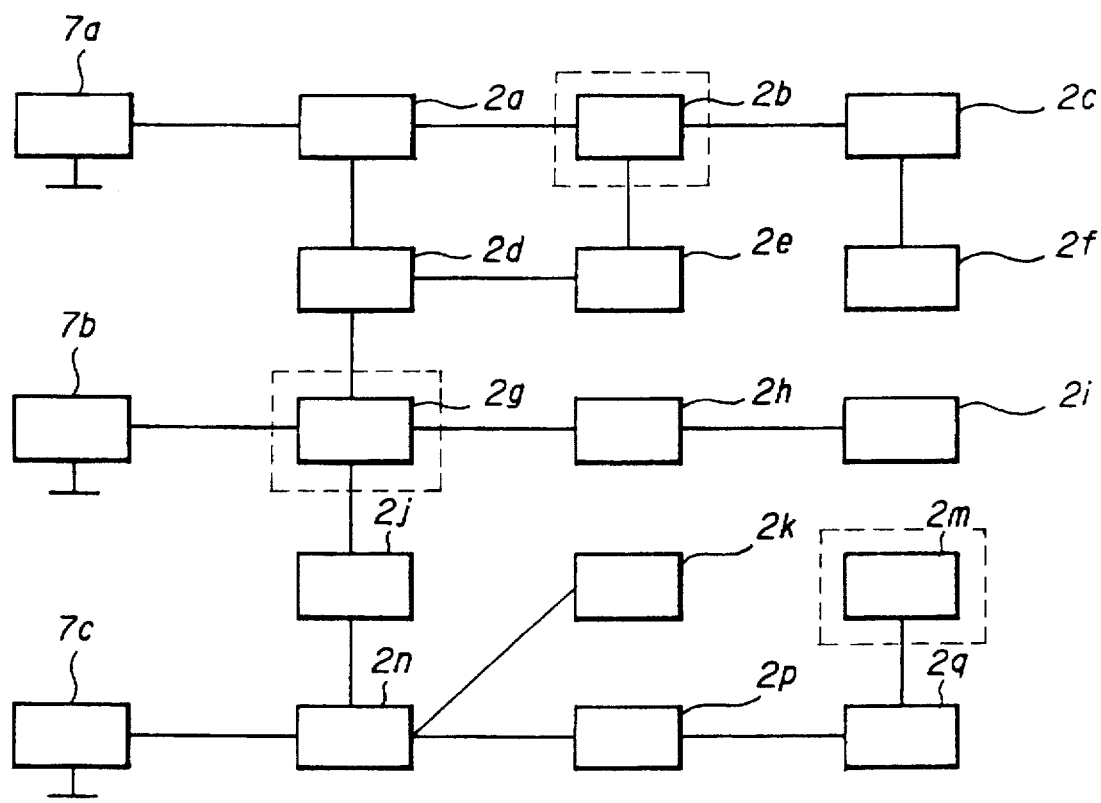
FIG. 24 is an explanatory view of a monitoring zone (sixth pattern)

The supervisory screen image data which correspond to various monitoring zones are registered in the supervisory screen image data base 89 via the supervisory screen image registering portion 88 (step 111). The supervisory screen image to be displayed, i.e., the monitoring zone of the monitoring device is then designated by using an operating portion of the HMI processing portion 81 such as the keyboard and the mouse (step 112). The supervisory screen image controller 83 inputs the supervisory screen image data number designated by the operator to the supervisory screen image displaying portion 82, and also inputs the number of the transmission devices to be monitored to the operating condition controller 35. For example, if the supervisory screen image corresponding to the second patter shown in FIG. 20 is designated, the supervisory screen image controller 83 inputs the supervisory screen image data number of the second pattern to the supervisory screen displaying portion 82, and also inputs the numbers of the transmission devices 2a, 2d, 2g, 2j and 2n to the operating condition controller 35. The correspondence between the supervisory screen image data number and the transmission devices as the object of monitoring is stored in advance in the supervisory screen image controller 83.

The supervisory screen image displaying portion 82 reads the supervisory screen image data which corresponds to the supervisory screen image data number from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 113).

The supervisory screen displaying portion 82 then fetches the operating conditions of the transmission devices in the monitoring zone from the operating condition control table (see FIG. 6) of the operating condition controller 35, and transmits the information about the operating condition to the HMI processing portion 81 so as to request it to display the operating condition (step 114). The supervisory screen image is continued to be displayed thereafter (step 115). In this state, it is judged whether or not a change of the supervisory screen image is instructed by the operation of the operator (step 116), and if the answer is in the affirmative, the process returns to the step 113 and the newly designated supervisory screen image is displayed.

On the other hand, if the answer is in the negative, the operating condition controller 35 judges whether or not it has received supervisory information (response RSP, report RPT) (step 117), and if the answer is in the negative, the supervisory screen image is displayed at the step 114 and thereafter. If the answer is in the affirmative, the operating condition controller 35 judges whether or not the transmission device which has transmitted the supervisory information is in the monitoring zone by reference to the numbers of the allocated transmission devices (transmission devices 2a, 2d, 2g, 2j, 2n) (step 118) which have been reported from the supervisory screen image controller 83. If the transmission device is one outside of the monitoring zone, the operating condition controller 35 discards the supervisory information without executing any processing. The process then returns to the step 114 and the supervisory screen image is displayed at the subsequent steps. If the supervisory information has been transmitted from a transmission device in the monitoring zone, the operating condition controller 35 analyzes the supervisory information so as to judge whether or not there is a change in the operating condition of the transmission device (step 119). If the answer is NO, the process returns to the step 114 and display the supervisory screen image at the subsequent steps.

If there is a change in the operating condition, the operating condition controller 35 updates the contents of the operating condition control table (FIG. 6) provided therein on the basis of the supervisory information and transmits and stores the supervisory information to and in the supervisory information data base 91 (steps 120, 121). Thereafter, the latest operating condition of each transmission device is displayed in the supervisory screen image at the step 114.

In this control, the supervisory information from a transmission device outside of the monitoring zone is discarded. Alternatively, it is possible to transmit the supervisory information to the supervisory information data base 91 at the step 121 (see the broken line) when the answer is NO at the step 118, thereby transmitting and storing the supervisory information from all the transmission devices to and in the supervisory information data base 91.

Figure 33:
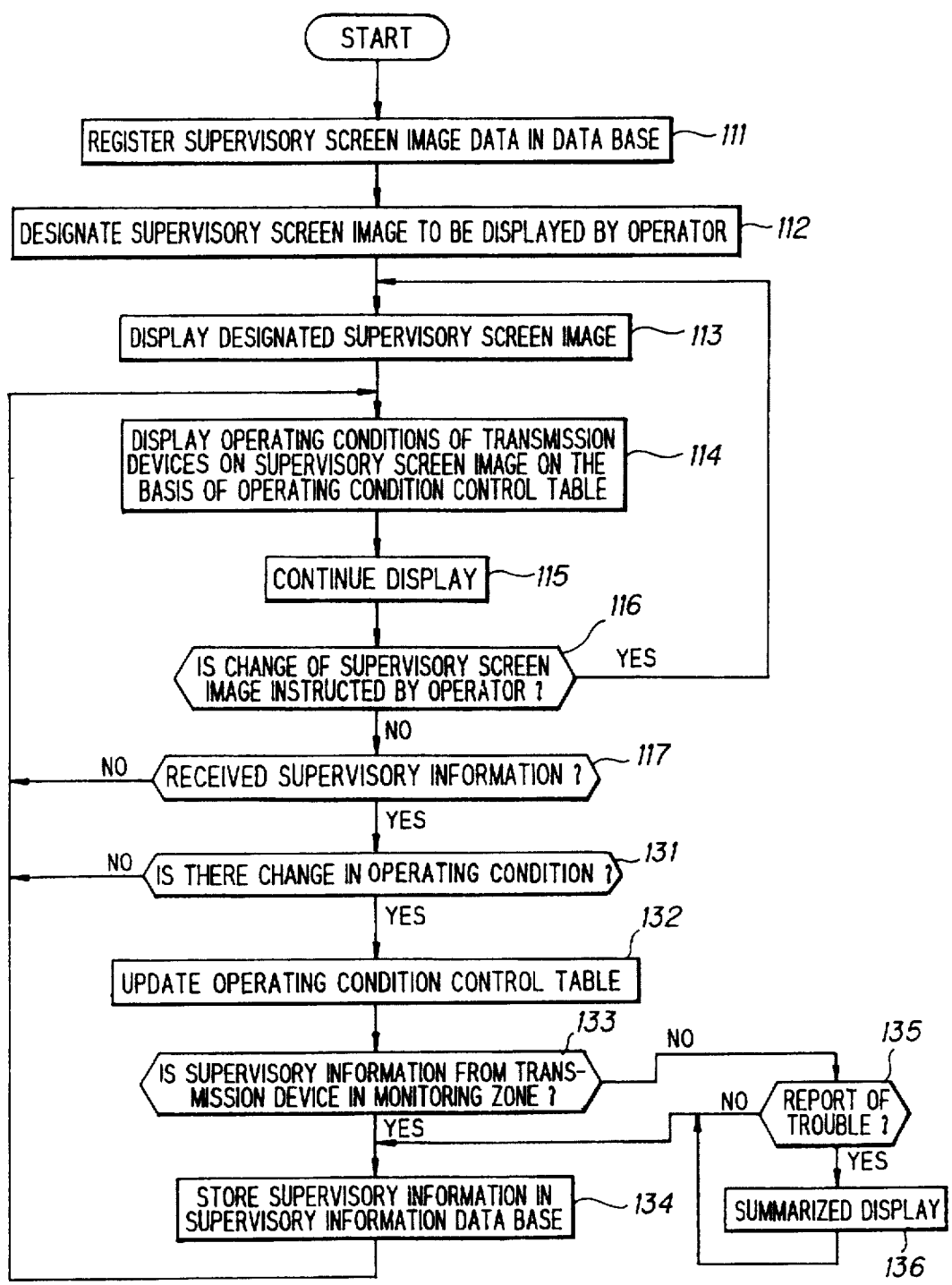
FIG. 33 is a flow chart of a third example of the supervisory screen image selection control by the operation of an operator.

(c-3) Third example of the supervisory screen image selection control by the operation of an operator FIG. 33 is a flow chart of a third example of the supervisory screen image selection control by the operation of an operator. This control is executed so as to display the operating conditions of the transmission devices outside of the monitoring zone, in a predetermined area (see CDA in FIG. 27) of the supervisory screen image in the form of a summarized display when a trouble is reported from one of the transmission devices outside of the monitoring zone.

Steps 111 to 117 are the same as those in the flow chart in FIG. 32. If supervisory information has been received at the step 117, the operating condition controller 35 judges whether or not there is a change in the operating condition of a transmission device (step 131), and if the answer is NO, the display of the supervisory screen image at the step 114 and thereafter is continued.

If there is a change in the operating condition of a transmission device, the supervisory information is analyzed and the contents of the operating condition control table (FIG. 6) provided in the operating condition controller 35 are updated. The operating condition controller 35 then judges whether or not the transmission device which has transmitted the supervisory information is one of the transmission devices (2a, 2d, 2g, 2j, 2n) in the monitoring zone by reference to the numbers of the allocated transmission devices which have been reported from the supervisory screen image controller 83 (step 133). If the transmission device is in the monitoring zone, the supervisory information is transmitted to and stored in the supervisory information data base 91 (step 134). Thereafter, the processing at the step 114 and the subsequent steps is executed, thereby displaying the latest operating condition of each transmission device.

On the other hand, if the transmission device which has transmitted the supervisory information is one of the transmission devices outside of the monitoring zone, whether or not a trouble is reported is judged from the supervisory information (step 135), and if no trouble is reported, the supervisory information is transmitted to and stored in the supervisory information data base 91 (step 134), and the processing at the step 114 and the subsequent steps is executed.

If a trouble is reported in the supervisory information, the operating condition controller 35 requests the supervisory screen displaying portion 82 to display the operating condition of the transmission device having the trouble, in a predetermined area of the supervisory screen image in the form of a summarized display. The supervisory screen displaying portion 82, in turn, requests the HMI processing portion 81 to display the operating conditions of the transmission devices 2a, 2d, 2g, 2j, 2n in the monitoring zone of the supervisory screen image and to display the operating condition of the faulty transmission device outside of the monitoring zone separately from the operating conditions of the former transmission devices. The HMI processing portion 81 displays the operating condition of the transmission device having the trouble, in a summarized display area in the form of a summarized display (step 136). Thereafter, the supervisory information is transmitted to and stored in the supervisory information data base 91 (step 134), and the processing at the step 114 and the subsequent steps is executed.

In this manner, it is possible to display the operating conditions of the transmission devices in the monitoring zone in the supervisory screen image and also to easily grasp the operating condition of a transmission device outside of the monitoring zone in which a trouble has been caused.

Figure 34:
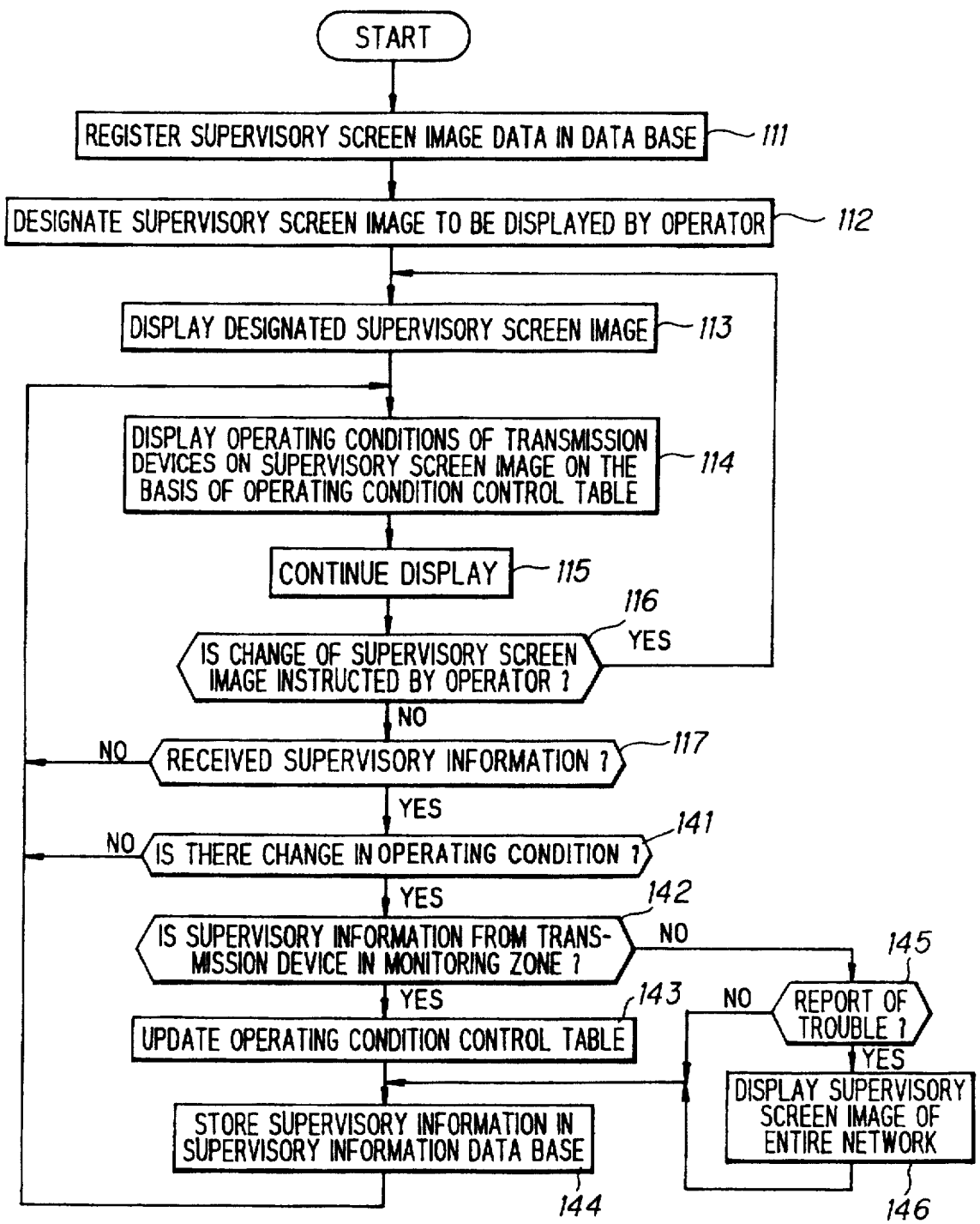
FIG. 34 is a flow chart of a fourth example of the supervisory screen image selection control by the operation of an operator.

(c-4) Fourth example of the supervisory screen image selection control by the operation of an operator FIG. 34 is a flow chart of a fourth example of the supervisory screen image selection control by the operation of an operator. This control is executed so as to display the operating condition of the entire network when a trouble is reported from one of the transmission devices outside of the monitoring zone.

Steps 111 to 117 are the same as those in the flow chart in FIG. 32. If supervisory information has been received at the step 117, the operating condition controller 35 judges whether or not there is a change in the operating condition of a transmission device (step 141), and if the answer is NO, the display of the supervisory screen image at the step 114 and thereafter is continued. If there is a change in the operating condition of a transmission device, the operating condition controller 35 judges whether or not the transmission device which has transmitted the supervisory information is one of the transmission devices (2a, 2d, 2g, 2j, 2n) in the monitoring zone by reference to the numbers of the allocated transmission devices which have been reported from the supervisory screen image controller 83 (step 142). If the transmission device is in the monitoring zone, the operating condition controller 35 updates the contents of the operating condition control table (FIG. 6) provided therein and transmits and stores the supervisory information to and in the supervisory information data base 91 (steps 143, 144). Thereafter, the processing at the step 114 and the subsequent steps is executed, thereby displaying the latest operating condition of each transmission device.

On the other hand, if the transmission device which has transmitted the supervisory information is one of the transmission devices outside of the monitoring zone, the operating condition controller 35 judges whether or not a trouble is reported, from the supervisory information (step 145), and if no trouble is reported, the operating condition controller 35 transmits and stores the supervisory information to and in the supervisory information data base 91 (step 144), and the processing at the step 114 and the subsequent steps is executed.

If a trouble is reported in the supervisory information, the operating condition controller 35 transmits that fact to the supervisory screen image controller 83. The supervisory screen image controller 83 instructs the supervisory screen displaying portion 82 to read and display the supervisory screen image data of the first pattern (FIG. 19) in which the entire network is the object of monitoring, and inputs the numbers of the transmission devices 2a to 2q as the objects of monitoring in the first pattern, to the operating condition controller 35.

The supervisory screen displaying portion 82 reads the supervisory screen image data of the first pattern from the supervisory screen image data base 89, and requests the HMI processing portion 81 to display it. The HMI processing portion 81 displays the supervisory screen image of the entire network (step 146). The operating condition controller 35 then stores the supervisory information in the supervisory information data base 91 (step 144), and the processing at the step 114 and the subsequent steps is executed. That is, the supervisory screen displaying portion 82 fetches the operating conditions of the transmission devices 2a to 2q in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 114, 115).

In this manner, when a trouble is caused in a transmission device outside of the monitoring zone during the display of the transmission devices in the monitoring zone, the displayed supervisory screen image is changed over to the supervisory screen image of the entire network. It is therefore possible to easily grasp the operating condition of the transmission device in which a trouble has been caused.

Figure 35:
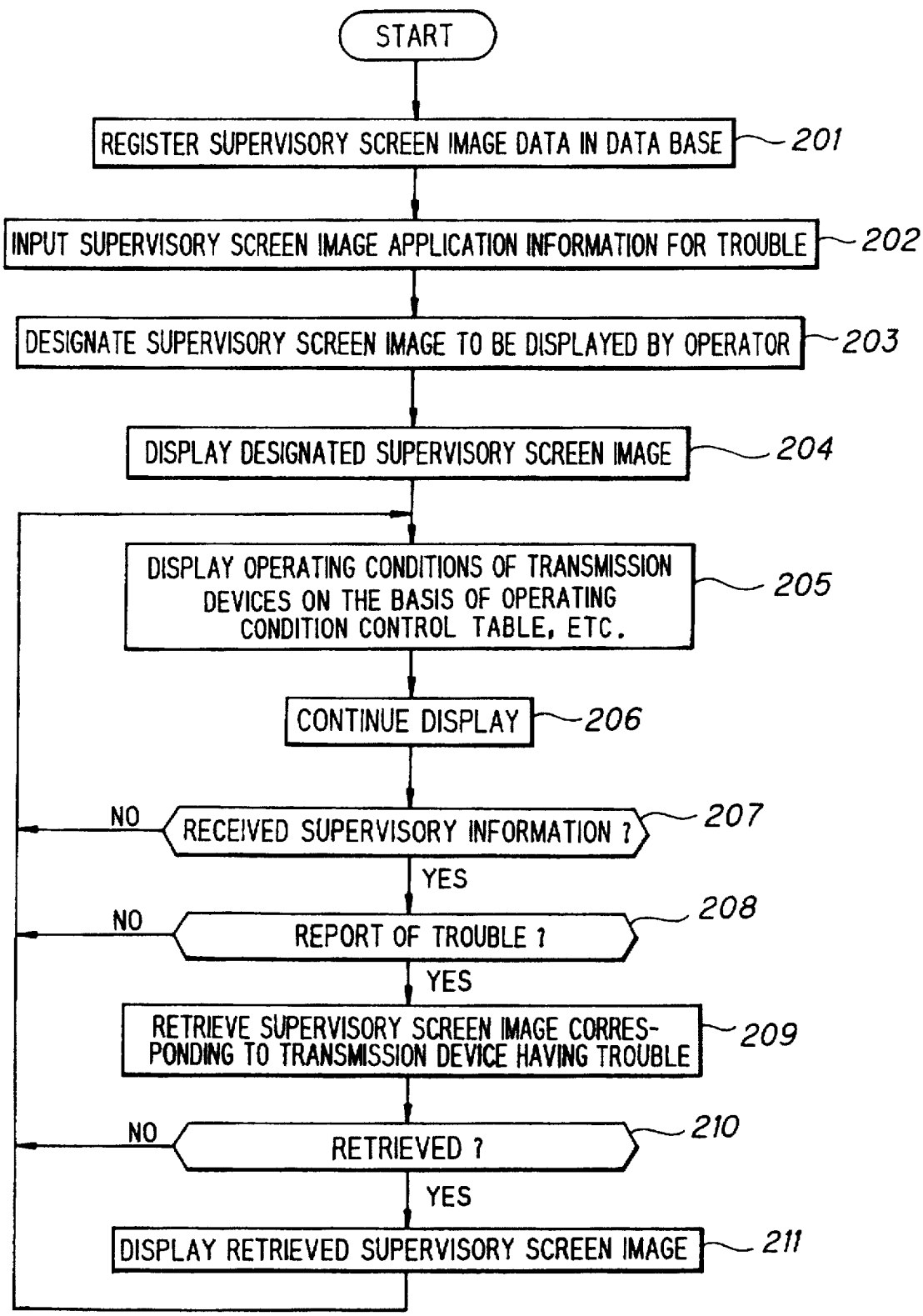
FIG. 35 is a flow chart of a first example of the supervisory screen image selection control when a trouble is caused.

(d) Supervisory image selection control when a trouble is caused (d-1) First example of the supervisory screen image selection control when a trouble is caused FIG. 35 is a flow chart of a first example of the supervisory screen image selection control when a trouble is caused.

The supervisory screen image data which correspond to various monitoring zones are registered in the supervisory screen image data base 89 via the supervisory screen image registering portion 88, and the supervisory screen image application data MIS1 to MISn (see FIG. 29) for a trouble are also registered in the supervisory screen image application data base 90 (steps 201, 202). The supervisory screen image to be displayed, i.e., the monitoring zone of the monitoring device is then designated by using an operating portion of the HMI processing portion 81 such as the keyboard and the mouse (step 203). The supervisory screen image controller 83 inputs the supervisory screen image data number designated by the operator to the supervisory screen image displaying portion 82. For example, when an operator designates the supervisory screen image data number which corresponds to the second pattern shown in FIG. 20, the supervisory screen image controller 83 inputs the supervisory screen image data number of the second pattern to the supervisory screen image displaying portion 82.

The supervisory screen displaying portion 82 reads the supervisory screen image data which corresponds to the supervisory screen image data number from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 204). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image (step 205), and the display of the supervisory screen image is continued thereafter (step 206).

In this state, the operating condition controller 35 judges whether or not it has received supervisory information (response RSP, report RPT) (step 207), and if the answer is in the negative, the supervisory screen image is continued to be displayed at the step 205 and thereafter. If the answer is in the affirmative, the operating condition controller 35 judges whether or not a trouble is reported in the supervisory information (step 208), and if no trouble is reported, the processing at the step 205 and the subsequent steps is executed. If a trouble is reported in the supervisory information, the operating condition controller 35 inputs the number of the transmission device having the trouble, to the supervisory screen image controller 83. The supervisory screen image controller 83 judges whether or not the reported number of the device is included in the supervisory screen image application data MIS1 to MISn of the supervisory screen image application data base 90 (steps 209, 210). If the answer is NO, the supervisory screen image is continued to be displayed at the step 205 and thereafter.

If a supervisory screen image application data MISi includes the number of the device, the supervisory screen image data number MIGN (FIG. 29) included in the retrieved supervisory screen image application data MISi is input to the supervisory screen displaying portion 82. The supervisory screen displaying portion 82 reads the supervisory screen image data designated by the supervisory screen image data number MIGN from the supervisory screen image data base 89 and transmits it to the HMI processing portion 81 so as to request the HMI processing portion 81 to display the supervisory screen image. The HMI processing portion 81 displays the supervisory screen image on the basis of the supervisory screen image data (step 211). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image (step 205), and continues the display of the supervisory screen image thereafter (step 206).

According to this process, it is possible to automatically change the monitoring zone (supervisory screen image) which is set in advance when a trouble is caused.

(d-2) Second example of supervisory screen image selection control when a trouble is caused In the supervisory screen image selection control shown in FIG. 35, the control of the display of a supervisory screen image is mainly explained, but actually the operating conditions of transmission devices are displayed in the supervisory screen image.

Figure 36:
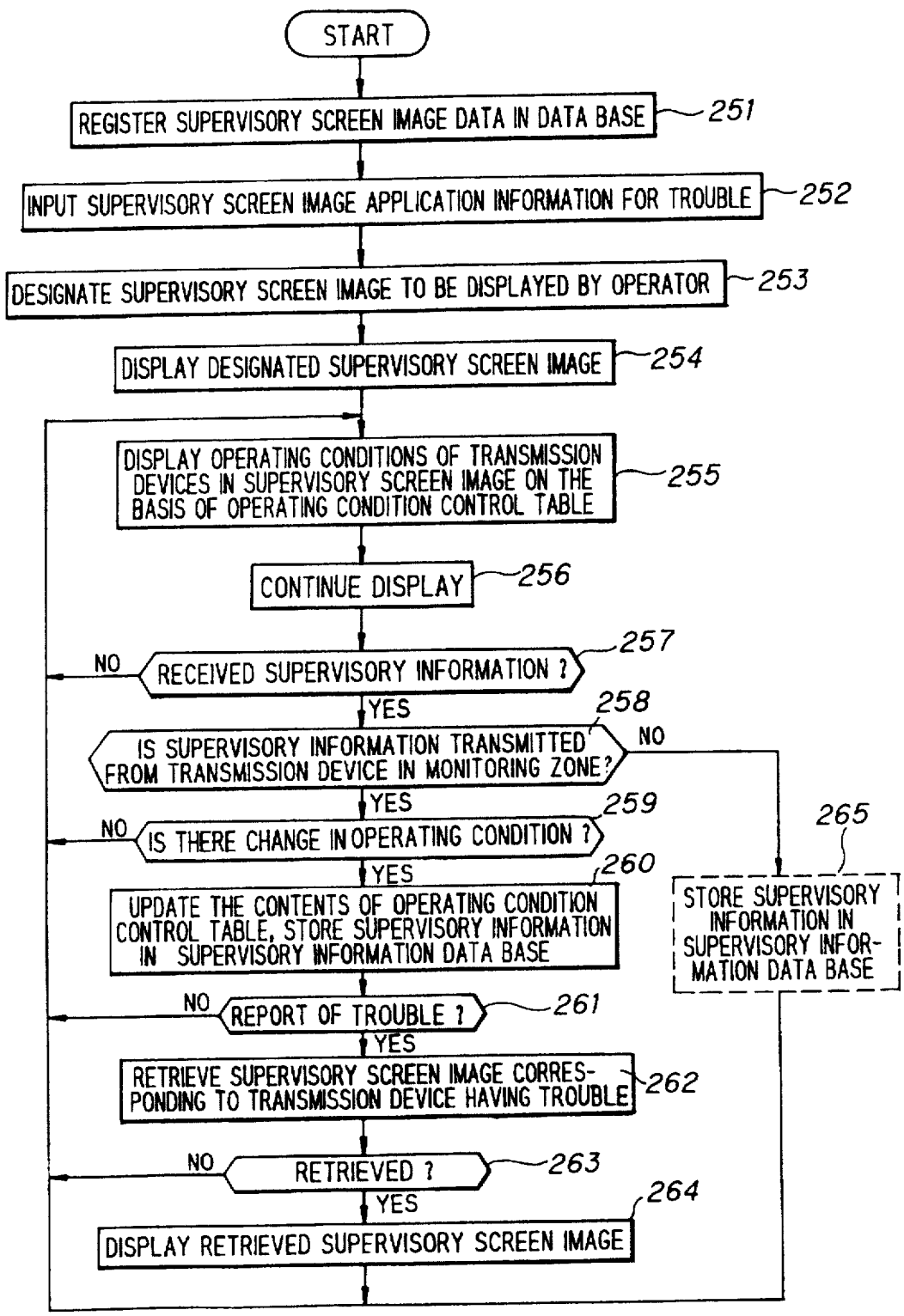
FIG. 36 is a flow chart of a second example of the supervisory screen image selection control when a trouble is caused.

FIG. 36 is a flow chart of a second example of the supervisory screen image selection control for displaying the operating conditions as well as a supervisory screen image when a trouble is caused.

The supervisory screen image data which correspond to various monitoring zones are registered in the supervisory screen image data base 89 via the supervisory screen image registering portion 88, and the supervisory screen image application data MIS1 to MISn (see FIG. 29) for a trouble are also registered in the supervisory screen image application data base 90 (steps 251, 252). The supervisory screen image to be displayed, i.e., the monitoring zone of the monitoring device is then designated by using an operating portion of the HMI processing portion 81 such as the keyboard and the mouse (step 253). The supervisory screen image controller 83 inputs the supervisory screen image data number designated by the operator to the supervisory screen image displaying portion 82, and also inputs the numbers of the transmission devices to be monitored to the operating condition controller 35. For example, if the supervisory screen image corresponding to the second patter shown in FIG. 20 is designated, the supervisory screen image controller 83 inputs the supervisory screen image data number of the second pattern to the supervisory screen displaying portion 82, and also inputs the numbers of the transmission devices 2a, 2d, 2g, 2j and 2n to the operating condition controller 35.

The supervisory screen displaying portion 82 reads the supervisory screen image data which corresponds to the supervisory screen image data number from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 254). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image (step 255), and the display of the supervisory screen image is continued thereafter (step 256).

In this state, the operating condition controller 35 judges whether or not it has received supervisory information (response RSP, report RPT) (step 257), and if the answer is in the negative, the supervisory screen image is continued to be displayed at the step 255 and thereafter. If the answer is in the affirmative, the operating condition controller 35 judges whether or not the transmission device which has transmitted the supervisory information is in the monitoring zone by reference to the numbers of the allocated transmission devices (transmission devices 2a, 2d, 2g, 2j, 2n) which have been reported from the supervisory screen image controller 83 (step 258). If the transmission device is one outside of the monitoring zone, the operating condition controller 35 discards the supervisory information without executing any processing. The process then returns to the step 255 and the supervisory screen image is displayed at the subsequent steps. If the supervisory information has been transmitted from a transmission device in the monitoring zone, the operating condition controller 35 analyzes the supervisory information so as to judge whether or not there is a change in the operating condition of the transmission device (step 259). If the answer is NO, the process returns to the step 255 and display the supervisory screen image at the subsequent steps.

If there is a change in the operating condition, the operating condition controller 35 updates the contents of the operating condition control table (FIG. 6) provided therein on the basis of the supervisory information and transmits and stores the supervisory information to and in the supervisory information data base 91 (step 260). Thereafter, whether or not a trouble is reported in the supervisory information is judged (step 261), and if no trouble is reported, the processing at the step 255 and the subsequent steps is executed. If a trouble is reported in the supervisory information, the operating condition controller 35 inputs the number of the transmission device having the trouble, to the supervisory screen image controller 83. The supervisory screen image controller 83 judges whether or not the reported number of the device is included in the supervisory screen image application data MIS1 to MISn of the supervisory screen image application data base 90 (steps 262, 263). If the answer is NO, the supervisory screen image is continued to be displayed at the step 255 and thereafter.

If a supervisory screen image application data MISi includes the number of the device, the supervisory screen image data number MIGN (FIG. 29) included in the retrieved supervisory screen image application data MISi is input to the supervisory screen displaying portion 82 and also inputs the number of the transmission device (in the monitoring zone) which corresponds to the supervisory screen image data number, to the operating condition controller 35.

The supervisory screen displaying portion 82 reads the supervisory screen image data which is designated by the input supervisory screen image application data MIGN, from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 264). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 255, 256).

In this process, the supervisory information of the transmission devices outside of the monitoring zone is discarded. Alternatively, it is possible to transmit the supervisory information to the supervisory information data base 91 at the step 265 (see the broken line) when the answer is NO at the step 258, thereby storing all the supervisory information in the supervisory information data base 91. If the supervisory information about all the transmission devices is stored in the data base 91 in this manner, when the monitoring zone is changed, the operating condition controller 35 can immediately read the operating conditions of the transmission devices in the new monitoring zone and set it in the operating condition control table provided therein, thereby swiftly displaying the latest operating condition.

(d-3) Third supervisory screen image selection control when a trouble is caused

Figure 37:
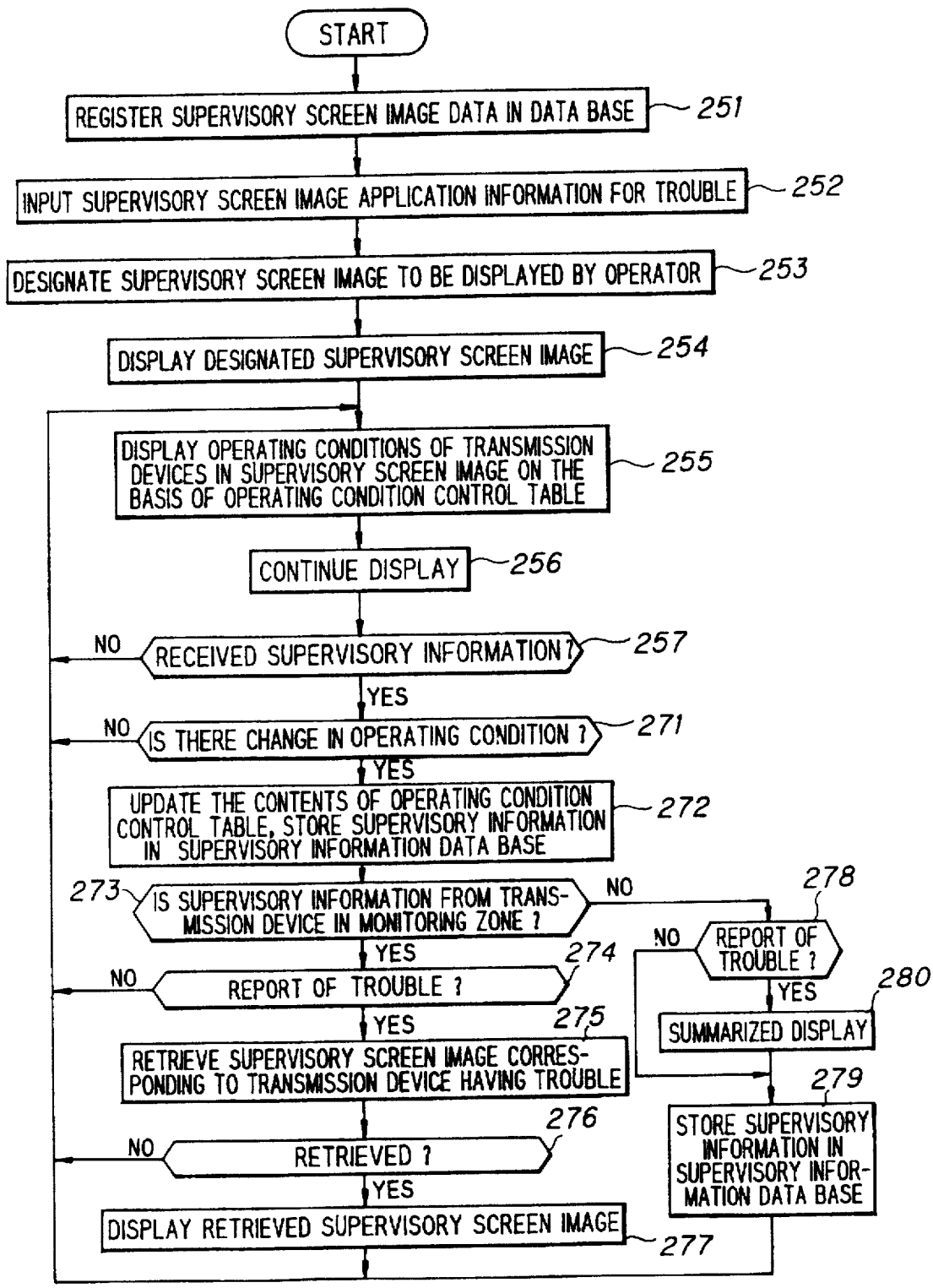
FIG. 37 is a flow chart of a third example of the supervisory screen image selection control when a trouble is caused.

FIG. 37 is a flow chart of a fourth example of the supervisory screen image selection control when a trouble is caused. This control is executed so as to display the operating conditions of the transmission devices outside of the monitoring zone, in a predetermined area (see CDA in FIG. 27) of the supervisory screen image in the form of a summarized display when a trouble is reported from one of the transmission devices outside of the monitoring zone.

Steps 251 to 257 are the same as those in the flow chart in FIG. 36. If supervisory information has been received at the step 257, the operating condition controller 35 judges whether or not there is a change in the operating condition of a transmission device (step 271), and if the answer is NO, the display of the supervisory screen image at the step 255 and thereafter is continued. If there is a change in the operating condition of a transmission device, the supervisory information is analyzed and the contents of the operating condition control table (FIG. 6) provided in the operating condition controller 35 are updated, and the supervisory information is stored in the supervisory information data base 91 (step 272). The operating condition controller 35 then judges whether or not the transmission device which has transmitted the supervisory information is one of the transmission devices (2a, 2d, 2g, 2j, 2n) in the monitoring zone by reference to the numbers of the allocated transmission devices which have been reported from the supervisory screen image controller 83 (step 273).

If the transmission device is in the monitoring zone, whether or not a trouble is reported is judged from the supervisory information (step 274), and if no trouble is reported, the supervisory screen image is displayed at the step 255 and the subsequent steps. If a trouble is reported in the supervisory information, the operating condition controller 35 inputs the number of the transmission device having the trouble, to the supervisory screen image controller 83. The supervisory screen image controller 83 judges whether or not the reported number of the device is included in the supervisory screen image application data MIS1 to MISn of the supervisory screen image application data base 90 (steps 275, 276). If the answer is NO, the supervisory screen image is continued to be displayed at the step 255 and thereafter.

If supervisory screen image application data MISi includes the number of the device, the supervisory screen image data number MIGN (FIG. 29) included in the retrieved supervisory screen image application data MISi is input to the supervisory screen displaying portion 82, and the number of the transmission device (in the monitoring zone) which corresponds to the supervisory screen image data number is also input to the operating condition controller 35.

The supervisory screen displaying portion 82 reads the supervisory screen image data designated by the supervisory screen image data number MIGN from the supervisory screen image data base 89 and transmits it to the HMI processing portion 81 so as to request the HMI processing portion 81 to display the supervisory screen image. The HMI processing portion 81 displays the supervisory screen image on the basis of the supervisory screen image data (step 277). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 255, 256).

On the other hand, if the transmission device which has transmitted the supervisory information is one of the transmission devices outside of the monitoring zone at the step 273, whether or not a trouble is reported is judged from the supervisory information (step 278), and if no trouble is reported, the supervisory information is transmitted to and stored in the supervisory information data base 91 (step 279), and the processing at the step 255 and the subsequent steps is executed.

If a trouble in the transmission device outside of the monitoring zone is reported in the supervisory information, the operating condition controller 35 requests the supervisory screen displaying portion 82 to display the operating condition of the faulty transmission device in a predetermined area of the supervisory screen image in the form of a summarized display. The supervisory screen displaying portion 82 requests the HMI processing portion 81 to display the operating conditions of the transmission devices 2a, 2d, 2g, 2j, 2n in the monitoring zone, in the supervisory screen image and to display the operating condition of the faulty transmission device outside of the monitoring zone separately from the operating condition of the former transmission devices. The HMI processing portion 81 displays the operating condition of the transmission device having the trouble, in a summarized display area in the form of a summarized display (step 280). Thereafter, the supervisory information is transmitted to and stored in the supervisory information data base 91 (step 279), and the processing at the step 255 and the subsequent steps is executed.

In this manner, it is possible to display the operating conditions of the transmission devices in the monitoring zone in the supervisory screen image and also to easily grasp the operating condition of a transmission device outside of the monitoring zone in which a trouble has been caused.

Figure 38:
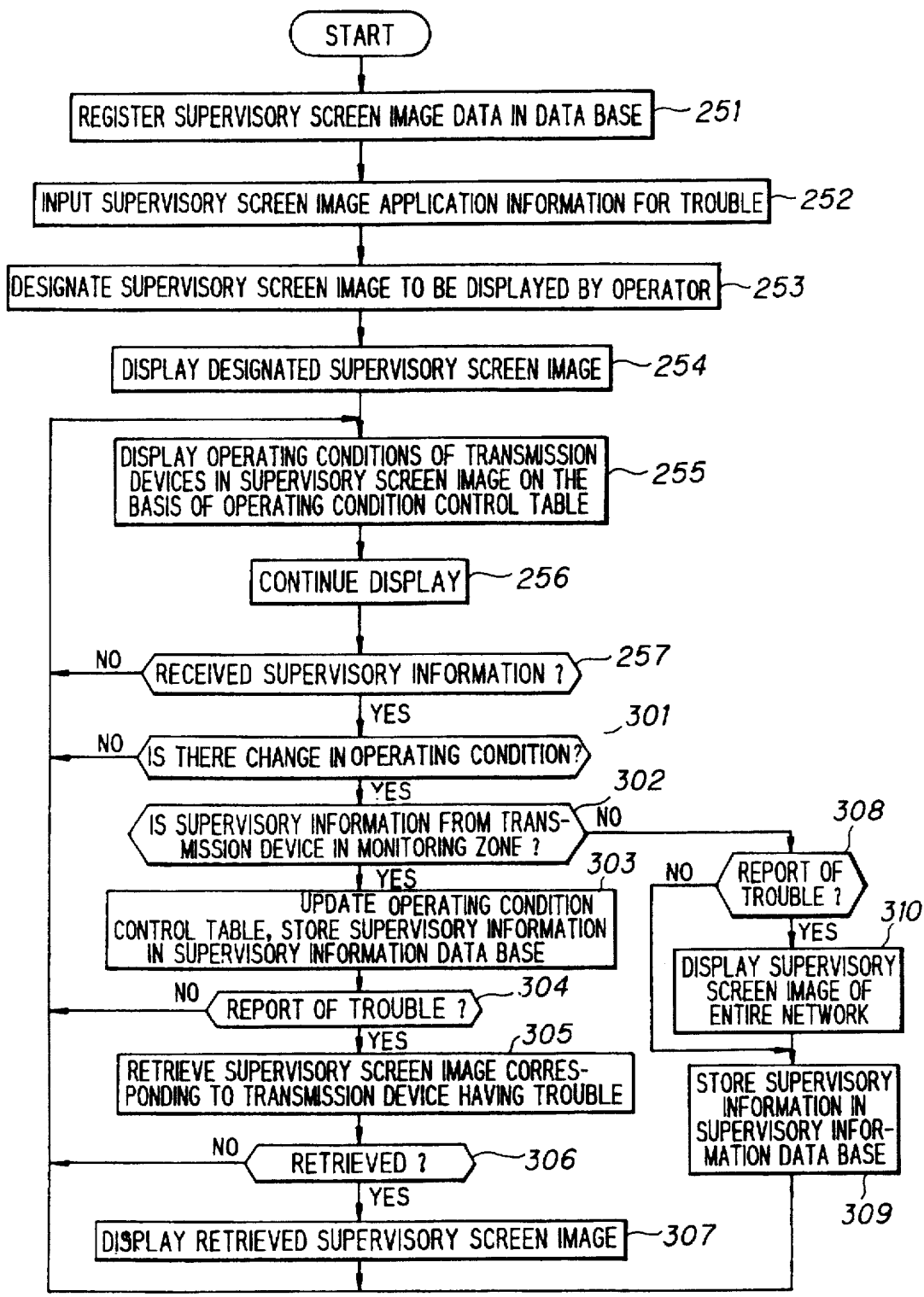
FIG. 38 is a flow chart of a fourth example of the supervisory screen image selection control when a trouble is caused.

(d-4) Fourth example of the supervisory screen image selection control when a trouble is caused FIG. 38 is a flow chart of a fourth example of the supervisory screen image selection control by the operation of an operator. This control is executed so as to display the operating condition of the entire network when a trouble is reported from one of the transmission devices outside of the monitoring zone.

Steps 251 to 257 are the same as those in the flow chart in FIG. 36. If supervisory information has been received at the step 257, the operating condition controller 35 judges whether or not there is a change in the operating condition of a transmission device (step 301), and if the answer is NO, the display of the supervisory screen image at the step 255 and thereafter is continued. If there is a change in the operating condition of a transmission device, the operating condition controller 35 judges whether or not the transmission device which has transmitted the supervisory information is one of the transmission devices (2a, 2d, 2g, 2j, 2n) in the monitoring zone by reference to the numbers of the allocated transmission devices which have been reported from the supervisory screen image controller 83 (step 302). If the transmission device is in the monitoring zone, the operating condition controller 35 updates the contents of the operating condition control table (FIG. 6) provided therein and transmits and stores the supervisory information to and in the supervisory information data base 91 (step 303).

The operating condition controller 35 then judges whether or not a trouble is reported in the supervisory information (step 304), and if no trouble is reported, the supervisory screen image is displayed at the step 255 and the subsequent steps. If a trouble is reported in the supervisory information, the operating condition controller 35 inputs the number of the transmission device having the trouble to the supervisory screen image controller 83. The supervisory screen image controller 83 judges whether or not the reported number of the device is included in the supervisory screen image application data MIS1 to MISn of the supervisory screen image application data base 90 (steps 305, 306). If the answer is NO, the supervisory screen image is continued to be displayed at the step 255 and thereafter.

If a supervisory screen image application data MISi includes the number of the device, the supervisory screen image controller 83 inputs the supervisory screen image data number MIGN (FIG. 29) included in the retrieved supervisory screen image application data MISi to the supervisory screen displaying portion 82 and also inputs the number of the transmission device (in the monitoring zone) which corresponds to the supervisory screen image data number to the operating condition controller 35. For example, if the supervisory screen image data number MIGN designates the supervisory screen image corresponding to the third patter shown in FIG. 21, the supervisory screen image controller 83 inputs the supervisory screen image data number of the third pattern to the supervisory screen displaying portion 82, and also inputs the numbers of the transmission devices 2a to 2f to the operating condition controller 35.

The supervisory screen displaying portion 82 reads the supervisory screen image data which is designated by the input supervisory screen image application data MIGN, from the supervisory screen image data base 89; and transmits the data to the HMI processing portion 81 so as to request the HMI processing portion 81 to display the supervisory screen image. The HMI processing portion 81 displays the supervisory screen image on the basis of the supervisory screen image data (step 307). The supervisory screen displaying portion 82 then fetches the operating conditions of the transmission devices 2a to 2f in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 255, 256).

On the other hand, if the transmission device which has transmitted the supervisory information is one of the transmission devices outside of the monitoring zone at the step 302, the operating condition controller 36 judges whether or not a trouble is reported in the supervisory information (step 308), and if no trouble is reported, the supervisory information is transmitted to and stored in the supervisory information data base 91 (step 309), and the processing at the step 255 and the subsequent steps is executed.

If a trouble is reported in the supervisory information, the operating condition controller 35 transmits that fact to the supervisory screen image controller 83. The supervisory screen image controller 83 instructs the supervisory screen displaying portion 82 to read and display the supervisory screen image data of the first pattern (FIG. 19) in which the entire network is the object of monitoring, and inputs the numbers of the transmission devices 2a to 2q as the objects of monitoring in the first pattern, to the operating condition controller 35.

The supervisory screen displaying portion 82 reads the supervisory screen image data of the first pattern from the supervisory screen image data base 89, and requests the HMI processing portion 81 to display it. The HMI processing portion 81 displays the supervisory screen image of the entire network (step 310).

The operating condition controller 35 then stores the supervisory information in the supervisory information data base 91 (step 309), and displays the supervisory screen image by the processing at the step 255 and the subsequent steps. That is, the supervisory screen displaying portion 82 fetches the operating conditions of the transmission devices 2a to 2q in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 255, 256).

In this manner, it is possible to display the operating conditions of the transmission devices in the monitoring zone in the supervisory screen image. In addition, since the displayed supervisory screen image is changed over to the supervisory screen image of the entire network when a trouble is caused, it is possible to easily grasp the operating condition of the transmission device in which a trouble has been caused.

Figure 39:
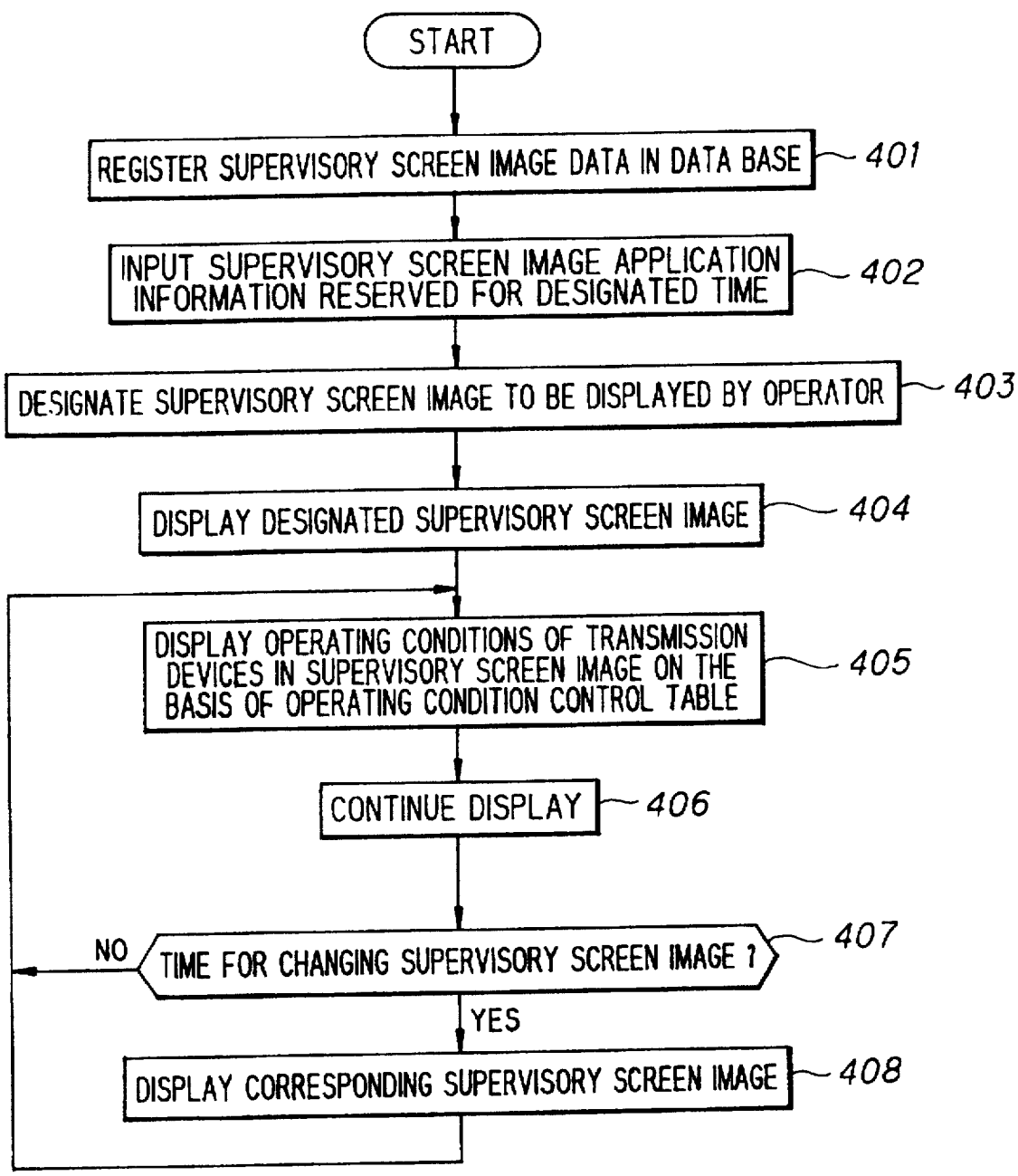
FIG. 39 is a flow chart of a first example of the supervisory screen image selection control at a designated time.

(e) Supervisory image selection control by time reservation (e-1) First example of the supervisory screen image selection control at a designated time FIG. 39 is a flow chart of a first example of the supervisory screen image selection control at a designated time.

The supervisory screen image data which correspond to various monitoring zones are registered in the supervisory screen image data base 89 via the supervisory screen image registering portion 88, and the supervisory screen image application data MIS1 to MISn (see FIG. 29) reserved for a designated time are also registered in the supervisory screen image application data base 90 (steps 401, 402). Each of the supervisory screen image application data MIS1 to MISn reserved for a designated time includes a supervisory screen image data number MIGN and supervisory screen image display time information TRSI (display starting date and display ending date).

The supervisory screen image to be displayed, i.e., the monitoring zone of the monitoring device is then designated by using an operating portion of the HMI processing portion 81 such as the keyboard and the mouse (step 403). The supervisory screen image controller 83 inputs the supervisory screen image data number designated by the operator to the supervisory screen image displaying portion 82. For example, if the supervisory screen image corresponding to the second patter shown in FIG. 20 is designated, the supervisory screen image controller 83 inputs the supervisory screen image data number of the second pattern to the supervisory screen displaying portion 82.

The supervisory screen displaying portion 82 reads the supervisory screen image data which corresponds to the supervisory screen image data number from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 404). The HMI processing portion 81 displays the operating condition of each transmission device and transmission line in the supervisory screen image (step 405), and the display of the supervisory screen image is continued thereafter (step 406).

In this state, the supervisory screen image controller 83 executes time control and judges whether or not the time for displaying a supervisory screen image other than the current supervisory screen image has come by referring to the supervisory screen image application data MIS1 to MISn reserved for a designated time (step 407). If the answer is NO, in other words, if it is not the time for changing the current supervisory screen image, the display of the supervisory screen image is continued at the step 405 and the subsequent steps. If the time for displaying another supervisory screen image has come, the supervisory screen image data number MIGN (FIG. 29) for the corresponding supervisory screen image is input to the supervisory screen displaying portion 82. The supervisory screen displaying portion 82 reads the supervisory screen image data designated by the supervisory screen image data number MIGN from the supervisory screen image data base 89 and transmits it to the HMI processing portion 81 so as to request the HMI processing portion 81 to display the supervisory screen image. The HMI processing portion 81 displays the supervisory screen image on the basis of the supervisory screen image data (step 408). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image (step 405), and the display of the supervisory screen image is continued thereafter (step 406).

According to this structure, since the monitoring zone (supervisory screen image) is automatically switched when a preset time comes, the operator can serially grasp the operating conditions of the transmission devices in a predetermined monitoring zone.

(e-2) Second example of the supervisory screen image selection control at a designated time In the supervisory screen image selection control shown in FIG. 39, the control of the display of a supervisory screen image is mainly explained, but actually the operating conditions of transmission devices are displayed in the supervisory screen image.

Figure 40:
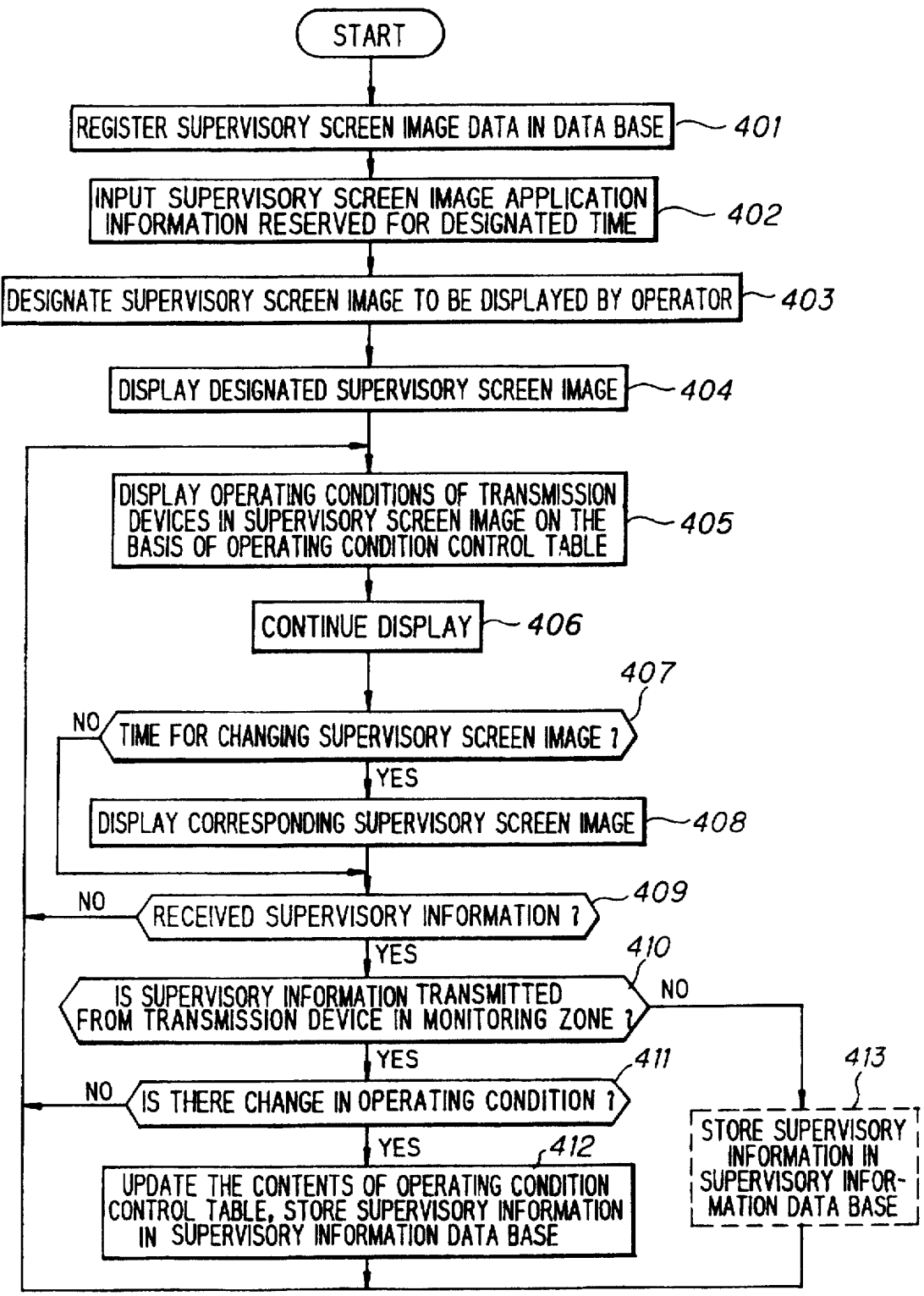
FIG. 40 is a flow chart of a second example of the supervisory screen image selection control at a designated time.

FIG. 40 is a flow chart of a second example of the supervisory screen image selection control for displaying the operating conditions as well as a supervisory screen image by the operation of an operator.

The supervisory screen image data which correspond to various monitoring zones are registered in the supervisory screen image data base 89 via the supervisory screen image registering portion 88, and the supervisory screen image application data MIS1 to MISn (see FIG. 29) reserved for a designated time are also registered in the supervisory screen image application data base 90 (steps 401, 402).

The supervisory screen image to be displayed, i.e., the monitoring zone of the monitoring device is then designated by using an operating portion of the HMI processing portion 81 such as the keyboard and the mouse (step 403). The supervisory screen image controller 83 inputs the supervisory screen image data number designated by the operator to the supervisory screen image displaying portion 82, and also inputs the numbers of the transmission devices to be monitored to the operating condition controller 35. For example, if the supervisory screen image corresponding to the second patter shown in FIG. 20 is designated, the supervisory screen image controller 83 inputs the supervisory screen image data number of the second pattern to the supervisory screen displaying portion 82, and also inputs the numbers of the transmission devices 2a, 2d, 2g, 2j and 2n to the operating condition controller 35.

The supervisory screen displaying portion 82 reads the supervisory screen image data which corresponds to the supervisory screen image data number from the supervisory screen image data base 89, and transmits the data to the HMI processing portion 81 so as to request the HMI processing portion 81 to display the supervisory screen image. The HMI processing portion 81 displays the supervisory screen image on the basis of the supervisory screen image data (step 404). The supervisory screen displaying portion 82 then fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image (step 405), and the display of the supervisory screen image is continued thereafter (step 406).

In this state, the supervisory screen image controller 83 executes time control and judges whether or not the time for displaying a supervisory screen image other than the current supervisory screen image has come by referring to the supervisory screen image application data MIS1 to MISn reserved for a designated time (step 407). If the answer is NO, in other words, if it is not the time for changing the current supervisory screen image, processing at the step 405 and the subsequent steps is executed. If the time for displaying another supervisory screen image has come, the supervisory screen image controller 83 inputs the supervisory screen image data number MIGN (FIG. 29) for the corresponding supervisory screen image to the supervisory screen displaying portion 82 and also inputs the number of the transmission devices to be monitored to the operating condition controller 35. For example, if the supervisory screen image data number MIGN designates the supervisory screen image corresponding to the third patter shown in FIG. 21, the supervisory screen image controller 83 inputs the supervisory screen image data number of the third pattern to the supervisory screen displaying portion 82, and also inputs the numbers of the transmission devices 2a to 2f to the operating condition controller 35.

The supervisory screen displaying portion 82 reads the supervisory screen image data designated by the supervisory screen image data number MIGN from the supervisory screen image data base 89 and transmits it to the HMI processing portion 81 so as to request the HMI processing portion 81 to display the supervisory screen image. The HMI processing portion 81 displays the supervisory screen image on the basis of the supervisory screen image data (step 408).

The operating condition controller 35 then judges whether or not it has received supervisory information (response RSP, report RPT) (step 409), and if the answer is in the negative, the supervisory screen image is continued to be displayed at the step 405 and thereafter. If the answer is in the affirmative, the operating condition controller 35 judges whether or not the transmission device which has transmitted the supervisory information is in the monitoring zone by reference to the numbers of the allocated transmission devices (transmission devices 2a, 2d, 2g, 2j, 2n before the displayed supervisory screen image is changed, and transmission devices 2a to 2f after the new supervisory screen image is displayed) which have been reported from the supervisory screen image controller 83 (step 410). If the transmission device is one outside of the monitoring zone, the operating condition controller 35 discards the supervisory information without executing any processing. The process then returns to the step 405 and the supervisory screen image is displayed at the subsequent steps. If the supervisory information has been transmitted from a transmission device in the monitoring zone, the operating condition controller 35 analyzes the supervisory information so as to judge whether or not there is a change in the operating condition of the transmission device (step 411). If the answer is NO, the process returns to the step 405 and display the supervisory screen image at the subsequent steps.

If there is a change in the operating condition, the operating condition controller 35 updates the contents of the operating condition control table (FIG. 6) provided therein on the basis of the supervisory information and transmits and stores the supervisory information to and in the supervisory information data base 91 (step 412).

Thereafter, the supervisory screen image is displayed by the processing at the step 405 and the subsequent steps. That is, the supervisory screen displaying portion 82 fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image (step 405) and continues the display of the supervisory screen image thereafter (step 406).

In this process, the supervisory information of the transmission devices outside of the monitoring zone is discarded. Alternatively, it is possible to transmit the supervisory information to the supervisory information data base 91 at the step 413 (see the broken line) when the answer is NO at the step 410, thereby storing all the supervisory information in the supervisory information data base 91. If the supervisory information about all the transmission devices is stored in the data base 91 in this manner, when the monitoring zone is changed, the operating condition controller 35 can immediately read the operating conditions of the transmission devices in the new monitoring zone and set it in the operating condition control table provided therein, thereby swiftly displaying the latest operating condition.

Figure 41:
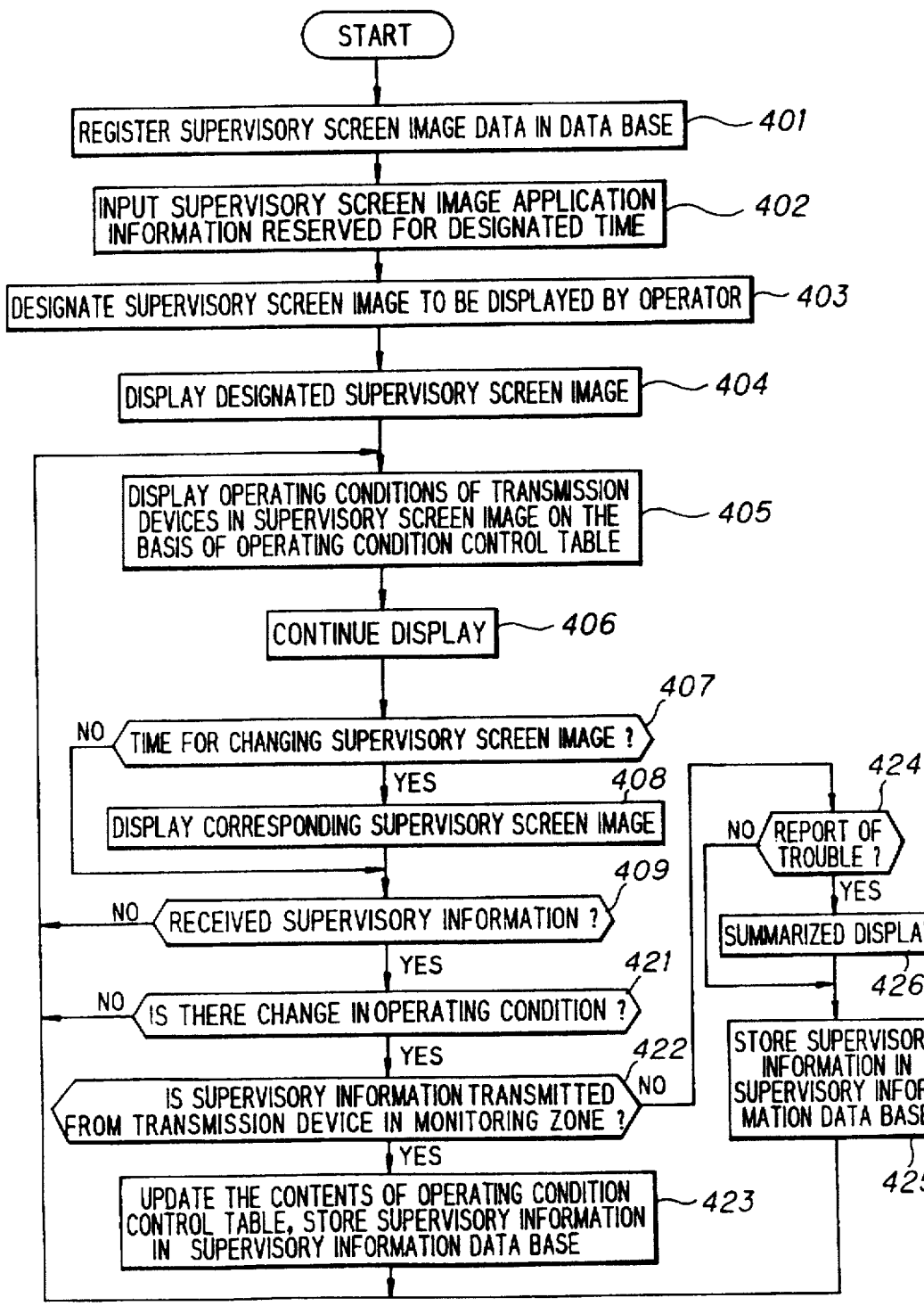
FIG. 41 is a flow chart of a third example of the supervisory screen image selection control at a designated time.

(e-3) Third example of the supervisory screen image selection control at a designated time FIG. 41 is a flow chart of a third example of the supervisory screen image selection control at a designated time. This control is executed so as to display the operating conditions of the transmission devices outside of the monitoring zone, in a predetermined area (see CDA in FIG. 27) of the supervisory screen image in the form of a summarized display when a trouble is reported from one of the transmission devices outside of the monitoring zone.

Steps 401 to 409 are the same as those in the flow chart in FIG. 40. If supervisory information has been received at the step 409, the operating condition controller 35 judges whether or not there is a change in the operating condition of a transmission device (step 421), and if the answer is NO, the display of the supervisory screen image at the step 405 and thereafter is continued. If there is a change in the operating condition of a transmission device, the operating condition controller 35 judges whether or not the transmission device which has transmitted the supervisory information is in the monitoring zone by reference to the numbers of the allocated transmission devices which have been reported from the supervisory screen image controller 83 (step 422). If the supervisory information has been transmitted from a transmission device in the monitoring zone, the operating condition controller 35 analyzes the supervisory information and updates the contents of the operating condition control table (FIG. 6) and stores the supervisory information in the supervisory information data base 91 (step 423).

The supervisory screen image is thereafter displayed by the processing at the step 405 and the subsequent steps. That is, the supervisory screen displaying portion 82 fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 405, 406).

On the other hand, if the transmission device is one outside of the monitoring zone at the step 422, the operating condition controller 35 judges whether or not a trouble is reported in the supervisory information (step 424), and if no trouble is reported, the supervisory information is transmitted to and stored in the supervisory information data base 91 (step 425). Thereafter, the supervisory screen image is displayed by the processing at the step 405 and the subsequent steps.

If a trouble is reported in the supervisory information, the operating condition controller 35 requests the supervisory screen displaying portion 82 to display the operating condition of the faulty transmission device, in a predetermined area of the supervisory screen image in the form of a summarized display. The supervisory screen displaying portion 82 requests the HMI processing portion 81 to display the operating conditions of the transmission devices in the monitoring zone of the supervisory screen image, in the supervisory screen image and to display the operating conditions of the transmission devices outside of the monitoring zone separately from the operating condition of the former transmission devices. The HMI processing portion 81 displays the operating condition of the transmission device having the trouble, in a summarized display area in the form of a summarized display (step 426). Thereafter, the supervisory information is transmitted to and stored in the supervisory information data base 91 (step 425), and the processing at the step 405 and the subsequent steps is executed.

In this manner, it is possible to display the operating conditions of the transmission devices in a predetermined monitoring zone of the supervisory screen image at a reserved time and also to easily grasp the operating condition of a transmission device outside of the monitoring zone in which a trouble has been caused.

Figure 42:
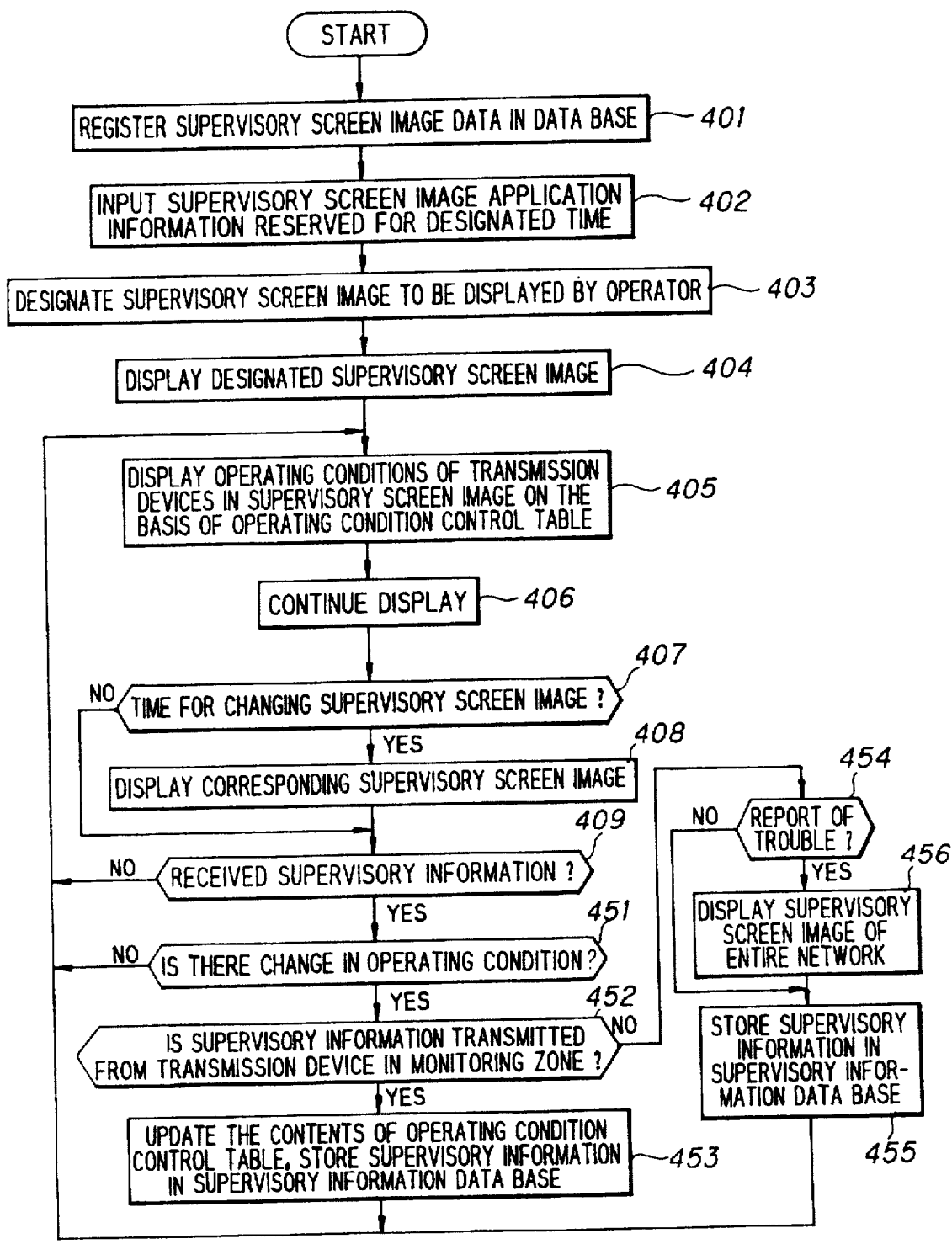
FIG. 42 is a flow chart of a fourth example of the supervisory screen image selection control at a designated time.
Figure 43:
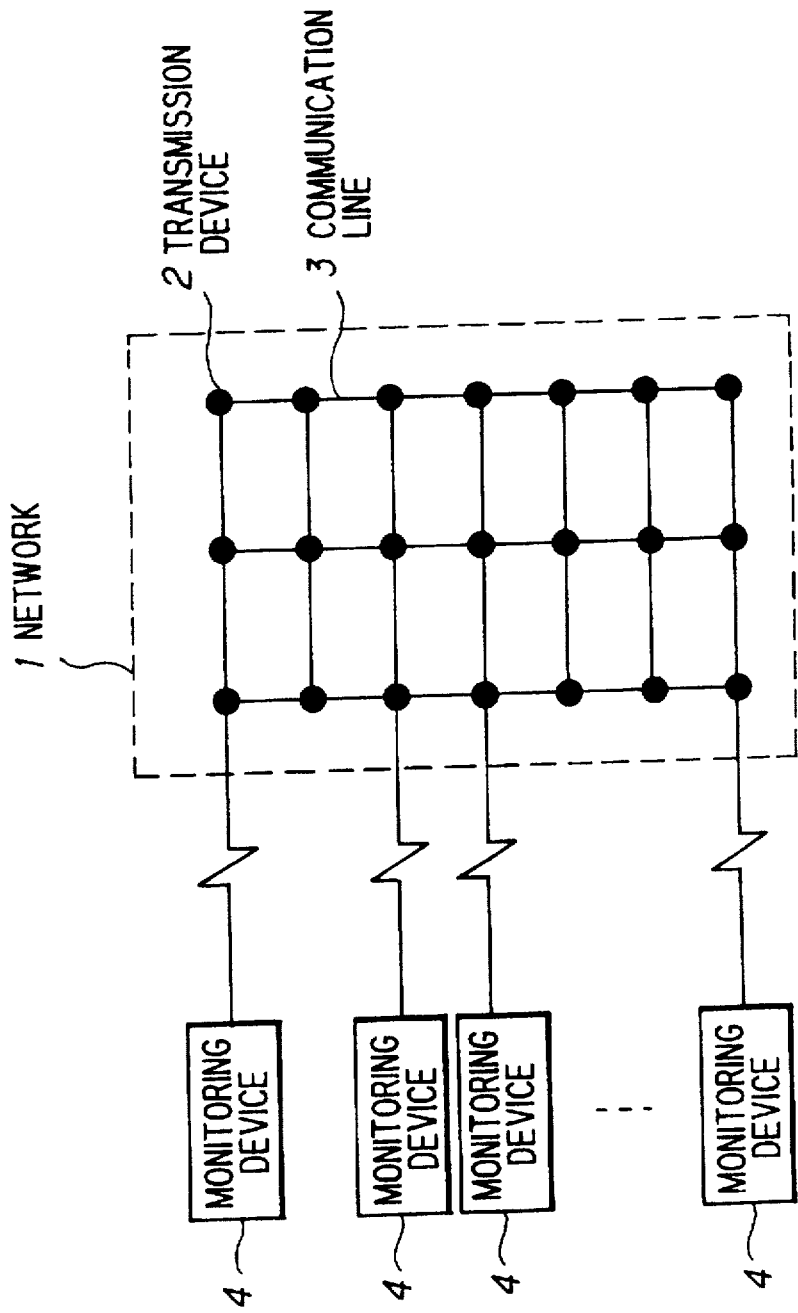
FIG. 43 is an explanatory view of a conventional system.
Figure 44:
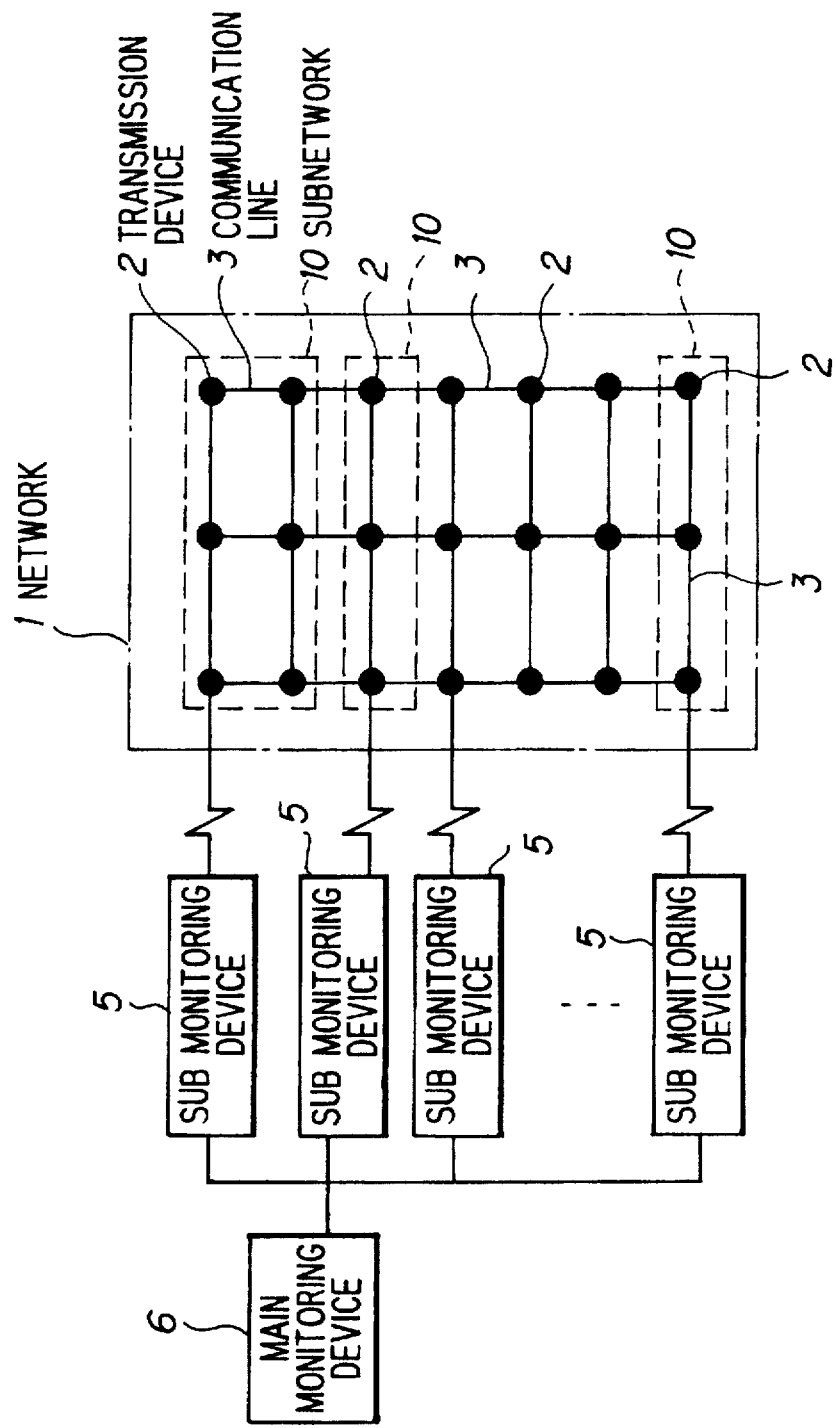
FIG. 44 shows the structure of another conventional system.

(e-4) Fourth example of the supervisory screen image selection control at a designated time FIG. 42 is a flow chart of a fourth example of the supervisory screen image selection control at a designated time. This control is executed so as to display the operating condition of the entire network when a trouble is reported from one of the transmission devices outside of the monitoring zone.

Steps 401 to 409 are the same as those in the flow chart in FIG. 40. If supervisory information has-been received at the step 409, the operating condition controller 35 judges whether or not there is a change in the operating condition of a transmission device (step 451), and if the answer is NO, the display of the supervisory screen image at the step 405 and thereafter is continued.

If there is a change in the operating condition of a transmission device, the operating condition controller 35 judges whether or not the transmission device which has transmitted the supervisory information is in the monitoring zone by reference to the numbers of the allocated transmission devices which have been reported from the supervisory screen image controller 83 (step 452). If the supervisory information has been transmitted from a transmission device in the monitoring zone, the operating condition controller 35 analyzes the supervisory information and updates the contents of the operating condition control table (FIG. 6) and stores the supervisory information in the supervisory information data base 91 (step 453). The supervisory screen image is thereafter displayed by the processing at the step 405 and the subsequent steps. That is, the supervisory screen displaying portion 82 fetches the operating conditions of the transmission devices in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 405, 406).

On the other hand, if the transmission device is one outside of the monitoring zone at the step 452, the operating condition controller 35 judges whether or not a trouble is reported in the supervisory information (step 454), and if no trouble is reported, the supervisory information is transmitted to and stored in the supervisory information data base 91 (step 455). Thereafter, the supervisory screen image is displayed by the processing at the step 405 and the subsequent steps.

If a trouble is reported in the supervisory information at the step 454, the operating condition controller 35 transmits that fact to the supervisory screen image controller 83. The supervisory screen image controller 83 instructs the supervisory screen displaying portion 82 to read and display the supervisory screen image data of the first pattern (FIG. 19) in which the entire network is the object of monitoring, and inputs the numbers of the transmission devices 2a to 2q as the objects of monitoring in the first pattern, to the operating condition controller 35.

The supervisory screen displaying portion 82 reads the supervisory screen image data of the first pattern from the supervisory screen image data base 89, and requests the HMI processing portion 81 to display it. The HMI processing portion 81 displays the supervisory screen image of the entire network (step 456).

The operating condition controller 35 then stores the supervisory information in the supervisory information data base 91 (step 455), and displays the supervisory screen image by the processing at the step 405 and the subsequent steps. That is, the supervisory screen displaying portion 82 fetches the operating conditions of the transmission devices 2a to 2q in the monitoring zone from the operating condition control table (see FIG. 6) of the operating condition controller 35, and transmits the information about the operating conditions to the HMI processing portion 81 so as to request it to display the operating conditions. The HMI processing portion 81 displays the operating condition of each transmission device and transmission line in the supervisory screen image, and continues the display of the supervisory screen image thereafter (steps 405, 406).

In this manner, it is possible to display the operating conditions of the transmission devices in the monitoring zone in the supervisory screen image at a designated time. In addition, since the displayed supervisory screen image is changed over to the supervisory screen image of the entire network when a trouble is caused, it is possible to easily grasp the operating condition of the transmission device in which a trouble has been caused.

As described above, according to the present invention, since each monitoring device monitors the operating conditions of the transmission devices in the allocated subnetwork and periodically reports the operating condition of the allocated subnetwork to the other monitoring devices, each monitoring device is capable of recognizing the operating condition of the network as a whole by monitoring only the subnetwork allocated thereto, which lightens the processing load of each monitoring device.

According to the present invention, since each monitoring device monitors the operating conditions of the transmission devices in the allocated subnetwork, and reports the operating condition of the allocated subnetwork to the other monitoring devices if there is any change in the operating condition of a transmission device which is an object of monitoring, each monitoring device is capable of recognizing the operating condition of the network as a whole at the point of time when there is a change in the operating condition by monitoring only the subnetwork allocated thereto, which lightens the processing load of each monitoring device. In addition, since the operating condition is reported only when there is a change in the operating condition, it is possible to lighten the communication traffic.

In the present invention, since each monitoring device periodically inquires of the other monitoring devices about the operating conditions of the transmission devices in the subnetworks which are monitored by the respective monitoring devices and collects the information about the operating condition of the network, each monitoring device is capable of recognizing the operating condition of the network as a whole by monitoring only the subnetwork allocated thereto, which lightens the processing load of each monitoring device.

Furthermore, in the present invention, since each monitoring device monitors the operating conditions of the transmission devices in the allocated subnetwork, and if there is any change in the operating condition of a transmission device in the allocated subnetwork, the corresponding monitoring device inquires of the other monitoring devices about the operating conditions of the transmission devices in the subnetworks which are monitored by the respective monitoring devices so as to collect the information, each monitoring device is capable of recognizing the operating condition of the network as a whole at the point of time when there is a change in the operating condition by monitoring only the subnetwork allocated thereto, which lightens the processing load of each monitoring device. In addition, since the operating condition is reported only when there is an inquiry from another monitoring device, it is possible to lighten the communication traffic.

According to the present invention, when one monitoring device stops operation, an adjacent monitoring device monitors the operating conditions of the transmission devices in the subnetwork which have been monitored by the monitoring device which has stopped as well as the operating conditions of the allocated transmission devices, and periodically reports the collected information about the operating condition of the two subnetworks to the other monitoring devices. Therefore, even if one monitoring device stops due to a trouble or the like, each monitoring device is capable of recognizing the operating condition of the network as a whole without stopping the operation of the network. In this case, the load of a part of the monitoring devices increases temporarily, but it is possible to lighten the processing load in each monitoring device as a whole as compared with a conventional system.

In addition, according to the present invention, when one monitoring device stops, an adjacent monitoring device monitors the operating conditions of the transmission devices in the subnetwork which have been monitored by the monitoring device which has stopped as well as the operating condition of the allocated transmission devices. If there is any change in the operating condition of a transmission device which is an object of monitoring, the adjacent monitoring device inquires of the other monitoring devices about the operating conditions of the subnetworks which are monitored by the respective monitoring devices and collects the information. Therefore, even if one monitoring device stops due to a trouble or the like, each monitoring device is capable of recognizing the operating condition of the network as a whole at the point of time when there is a change in the operating condition without stopping the operation of the network. In addition, since the operating condition is reported only when there is an inquiry from another monitoring device, it is possible to lighten the communication traffic.

According to the present invention, it is possible to lighten the processing load on each monitoring device and, in addition, in a large-scale network including a multiplicity of monitoring devices, each of the monitoring devices disposed in a plurality of stations can monitor the operation of the entire network. In other words, the present invention contributes to an improvement of the monitoring of the operation of a network.

In the present invention, since supervisory screen image data which correspond to a plurality of monitoring zone are registered in each monitoring device, it is possible to easily change the monitoring zone by the operation of an operator and, in addition, it is possible to display and monitor the operating conditions of the transmission devices in the monitoring zone, thereby enhancing the operation efficiency of the monitoring system. In this case, when a trouble is caused in a transmission device outside of the monitoring zone, since the operating condition of the transmission device having the trouble is displayed ion a predetermined area of the supervisory screen image in the form of a summarized display, it is easy to grasp the operating condition of the transmission device having the trouble outside of the monitoring zone while monitoring the transmission devices in the monitoring zone. In addition, when a trouble is caused in a transmission device outside of the monitoring zone, the supervisory screen image is automatically changed over to the supervisory screen image of the entire network, it is easy to grasp the operating condition of the transmission device having the trouble outside of the monitoring zone of the entire network.

According to the present invention, since supervisory screen image data which correspond to a plurality of monitoring zone and supervisory screen image application information for a trouble are registered in advance in each monitoring device so that when a trouble is caused in a predetermined transmission device, the supervisory screen image (monitoring zone) is changed in accordance with the transmission device having the trouble, it is possible to deal with the trouble and enhance the operation efficiency of the monitoring system. In this case, when a trouble is caused in a transmission device outside of the monitoring zone, since the operating condition of the transmission device having the trouble is displayed in a predetermined area of the supervisory screen image in the form of a summarized display, it is easy to grasp the operating condition of the transmission device having the trouble outside of the monitoring zone while monitoring the transmission devices in the monitoring zone. In addition, when a trouble is caused in a transmission device outside of the monitoring zone, the supervisory screen image is automatically changed over to the supervisory screen image of the entire network, it is easy to grasp the operating condition of the transmission device having the trouble outside of the monitoring zone of the entire network.

Furthermore, according to the present invention, since supervisory screen image data which correspond to a plurality of monitoring zone and supervisory screen image application information for a designated time are registered in advance in each monitoring device, and when a predetermined time comes, the supervisory screen image is changed over to the supervisory screen image (monitoring zone) which is registered in advance, it is possible to automatically switch and display the monitoring zone in accordance with the time zone (date). In other words, when a predetermined time comes, it is possible to monitor the operating conditions of the transmission devices in a desired monitoring zone without the need for any operation. In this case, when a trouble is caused in a transmission device outside of the monitoring zone, since the operating condition of the transmission device having the trouble is displayed in a predetermined area of the supervisory screen image in the form of a summarized display, it is easy to grasp the operating condition of the transmission device having the trouble outside of the monitoring zone while monitoring the transmission devices in the monitoring zone. In addition, when a trouble is caused in a transmission device outside of the monitoring zone, the supervisory screen image is automatically changed over to the supervisory screen image of the entire network, it is easy to grasp the operating condition of the transmission device having the trouble outside of the monitoring zone of the entire network.

As many apparently widely different embodiments of the present invention can be made without departing from the spirit and scope thereof, it is to be understood that the invention is not limited to the specific embodiment thereof except as defined in the appended claims.

What is claimed is:

1. A load distribution system for monitoring devices for monitoring operating condition of a network having a plurality of transmission devices for transmitting data, said load distribution system comprising:

a plurality of subnetworks into which said network is divided;

a plurality of monitoring devices each of which is provided in one-to-one correspondence with each of said subnetworks;

communication lines for connecting each of said monitoring devices with the transmission devices in the subnetwork which corresponds to said monitoring device; and a communication means for communicating operating conditions of the respective subnetworks between said monitoring devices, wherein each of said monitoring devices monitors the operating conditions of the transmission devices in the subnetwork allocated thereto and periodically reports the operating condition of the allocated subnetwork to all other monitoring devices through said corresponding communication means.

2. A load distribution system for a monitoring device according to claim 1, wherein said communication means is a communication line in said network or a public line.

3. A load distribution system for monitoring devices for monitoring operating condition of a network having a plurality of transmission devices for transmitting data, said load distribution system comprising:

a plurality of subnetworks into which said network is divided;

a plurality of monitoring devices each of which is provided in one-to-one correspondence with each of said subnetworks;

communication lines for connecting each of said monitoring devices with the transmission devices in the subnetwork which corresponds to said monitoring device, and a communication means for communicating operating conditions of the respective subnetworks between said monitoring devices, wherein each of said monitoring devices monitors the operating conditions of the transmission devices in the subnetwork allocated thereto and reports the operating condition of the allocated subnetwork to all other monitoring devices through the corresponding communication means when there is a change in the operating condition of a transmission device in said allocated network as an object of monitoring.

4. A load distribution system for a monitoring device according to claim 3, wherein said communication means is communication line in said network or a public line.

5. A load distribution system for monitoring devices for monitoring operating condition of a network having a plurality of transmission devices for transmitting data, said load distribution system comprising:

a plurality of subnetworks into which said network is divided;

a plurality of monitoring devices each of which is provided in one-to-one correspondence with each of said subnetworks;

communication lines for connecting each of said monitoring devices with the transmission devices in the subnetwork which corresponds to said monitoring device; and a communication means for transmitting and receiving operating condition of the subnetwork allocated thereto and an inquiry about said operating condition between said monitoring devices;

wherein each of said monitoring devices periodically inquires of all other monitoring devices about the operating conditions of the transmission devices in said allocated subnetworks through said communication means so as to collect the operating condition of said network.

6. A load distribution system for a monitoring device according to claim 5, wherein said communication means is communication line in said network or a public line.

7. A load distribution system for monitoring devices for monitoring operating condition of a network having a plurality of transmission devices for transmitting data, said load distribution system comprising:

a plurality of subnetworks into which said network is divided;

a plurality of monitoring devices each of which is provided in one-to-one correspondence with each of said subnetworks;

communication lines for connecting each of said monitoring devices with the transmission devices in the subnetwork which corresponds to said monitoring device; and a communication means for transmitting and receiving operating condition of the subnetwork allocated thereto and an inquiry about said operating condition between said monitoring devices;

wherein each of said monitoring devices monitors the operating conditions of the transmission devices in the allocated subnetwork and inquires of all other monitoring devices about the operating conditions of the transmission devices in said allocated subnetworks through said communication means so as to collect the operating condition of said network when there is a change in the operating condition of a transmission device in said allocated network as an object of monitoring.

8. A load distribution system for a monitoring device according to claim 7, wherein said communication means is communication line in said network or a public line.

9. A load distribution system for monitoring devices for monitoring operating condition of a network having a plurality of transmission devices for transmitting data, said load distribution system comprising:

a plurality of subnetworks into which said network is divided;

a plurality of monitoring devices each of which is provided in one-to-one correspondence with each of said subnetworks;

communication lines for connecting each of said monitoring devices with the transmission devices in the subnetwork which corresponds to said monitoring device; and a communication means for communicating the operating conditions of the respective subnetworks between said monitoring devices, wherein when one of said monitoring devices stops operation, an adjacent monitoring device monitors the operating conditions of the transmission devices in the subnetwork which have been monitored by said operation-stopped monitoring device as well as the operating conditions of the transmission devices allocated to said adjacent monitoring device, and periodically reports the collected information about the operating conditions of the two subnetworks to all other monitoring devices through said communication means.

10. A load distribution system for a monitoring device according to claim 9, wherein said communication means is communication line in said network or a public line.

11. A load distribution system for monitoring device for monitoring the operating condition of a network having a plurality of transmission devices for transmitting data, said load distribution system comprising:

a plurality of subnetworks into which said network is divided;

a plurality of monitoring devices each of which is provided in one-to-one correspondence with each of said subnetworks;

communication lines for connecting each of said monitoring devices with the transmission devices in the subnetwork which corresponds to said monitoring device; and a communication means for communicating operating conditions of the respective subnetworks between said monitoring devices, wherein when one of said monitoring devices stops operation, an adjacent monitoring device monitors the operating conditions of the transmission devices in the subnetwork which have been monitored by said operation-stopped monitoring device as well as the operating conditions of the transmission devices allocated to said adjacent monitoring device, and inquires of all other monitoring devices about the operating conditions of the transmission devices in the subnetworks allocated to said other monitoring devices through said communication means when there is a change in the operating condition of a transmission device in the two subnetworks as an object of monitoring.

12. A load distribution system for a monitoring device according to claim 11, wherein said communication means is communication line in said network or a public line.

13. In a network monitoring system including a plurality of monitoring devices provided in a network which have a plurality of transmission devices for transmitting data so that each of said monitoring devices monitors operating conditions of the transmission devices in a monitoring zone allocated thereto, a monitoring device comprising:

a supervisory screen image data holding means for holding supervisory screen image data which correspond to various monitoring zones;

a means for designating a predetermined monitoring zone as the object of monitoring; and a displaying means for displaying a supervisory screen image on the basis of supervisory screen image data which corresponds to the designated monitoring zone.

14. A monitoring device according to claim 13, further comprising:

an operating condition controller for controlling operating conditions of the transmission devices in said monitoring zone as the object of monitoring;

wherein said displaying means displays, in said supervisory screen image, the operating conditions of said transmission devices in said monitoring zone as the object of monitoring which are controlled by said operating condition controller.

15. A monitoring device according to claim 14, wherein said operating condition controller discards supervisory information for indicating the operating condition transmitted from a transmission device outside of said monitoring zone as the object of monitoring.

16. A monitoring device according to claim 14, further comprising:

a supervisory information storing means for storing supervisory information for indicating the operating conditions transmitted from said transmission devices in said network;

wherein said operating condition controller controls the operating conditions of said transmission devices in said monitoring zone as the object of monitoring and stores, in said supervisory information storing means, said supervisory information transmitted from all the transmission devices in said network.

17. A monitoring device according to claim 13, further comprising:

an operating condition controller for controlling the operating conditions of all the transmission devices in said network without limiting the transmission devices to the transmission devices in said monitoring zone as the object of monitoring;

wherein said displaying means displays, in said supervisory screen image, the operating conditions of said transmission devices in said monitoring zone as the object of monitoring which are controlled by said operating condition controller and also displays the operating conditions of the transmission devices outside of said monitoring zone in a predetermined area of said supervisory screen image in the form of a summarized display.

18. A monitoring device according to claim 13, further comprising:

a supervisory information storing means for storing supervisory information for indicating the operating conditions transmitted from said transmission devices in said network;

an operating condition controller for controlling the operating conditions of the transmission devices in said monitoring zone as the object of monitoring and storing said supervisory information transmitted form all the transmission devices in said network in said supervisory information storing means;

wherein said displaying means displays, in said supervisory screen image, the operating conditions of said transmission devices in said monitoring zone as the object of monitoring which are controlled by said operating condition controller;

said operating condition controller instructs said displaying means to display a supervisory screen image covering the entire network as monitoring zone when said operating condition controller detects a trouble caused in a transmission device outside of said monitoring zone as the object of monitoring; and said displaying means displays the supervisory screen image covering the entire network as said monitoring zone and also displays the operating condition of each of said transmission devices in said supervisory screen image.

19. In a network monitoring system including a plurality of monitoring devices provided in a network which have a plurality of transmission devices for transmitting data so that each of said monitoring devices monitors operating conditions of the transmission devices in a monitoring zone allocated thereto, a monitoring device comprising:

a supervisory screen image data holding means for holding supervisory screen image data which correspond to various monitoring zones;

a means for holding information which designates a monitoring zone to be displayed in the form of a supervisory screen image when a trouble is caused in a transmission device; and a displaying means for displaying a supervisory screen image which corresponds to said designated monitoring zone when said trouble is detected.

20. A monitoring device according to claim 19, further comprising:

an operating condition controller for controlling the operating conditions of said transmission devices on the basis of supervisory information transmitted from said transmission devices and detecting a trouble caused in a transmission device;

wherein said displaying means displays, in said supervisory screen image, the operating conditions of the transmission devices in said monitoring zone which are controlled by said operating condition controller and also displays a supervisory screen image which corresponds to said designated monitoring zone when said trouble is detected.

21. A monitoring device according to claim 20, wherein said operating condition controller controls the operating conditions of said transmission devices in said monitoring zone as the object of monitoring and discards the supervisory information transmitted from a transmission device outside of said monitoring zone as the object of monitoring.

22. A monitoring device according to claim 20, further comprising:

a supervisory information storing means for storing supervisory information transmitted from said transmission devices in said network;

wherein said operating condition controller controls the operating conditions of said transmission devices in said monitoring zone as the object of monitoring and stores, in said supervisory information storing means, said supervisory information transmitted from all the transmission devices in said network.

23. A monitoring device according to claim 20, wherein said operating condition controller controls the operating conditions of all the transmission devices in said network without limiting the transmission devices to the transmission devices in said monitoring zone as the object of monitoring; and said displaying means displays, in said supervisory screen image, the operating conditions of said transmission devices in said monitoring zone as the object of monitoring which are controlled by said operating condition controller and also displays the operating conditions of the transmission devices outside of said monitoring zone in a predetermined area of said supervisory screen image in the form of a summarized display.

24. A monitoring device according to claim 20, further comprising:

a supervisory information storing means for storing supervisory information transmitted from said transmission devices in said network;

wherein said operating condition controller controls the operating conditions of said transmission devices in said monitoring zone as the object of monitoring and stores, in said supervisory information storing means, said supervisory information transmitted from all the transmission devices in said network;

said displaying means displays, in said supervisory screen image, the operating conditions of said transmission devices in said monitoring zone as the object of monitoring which are controlled by said operating condition controller;

said operating condition controller instructs said displaying means to display the supervisory screen image covering the entire network as a monitoring zone when said operating condition controller detects a trouble caused in a transmission device outside of said monitoring zone as the object of monitoring; and said displaying means displays the supervisory screen image covering the entire network as said monitoring zone and also displays the operating condition of each of said transmission devices in said supervisory screen image.

25. In a network monitoring system including a plurality of monitoring devices provided in a network which have a plurality of transmission devices for transmitting data so that each of said monitoring devices monitors operating conditions of the transmission devices in a monitoring zone allocated thereto, a monitoring device comprising:

a supervisory screen image data holding means for holding supervisory screen image data which correspond to various monitoring zones;

a means for holding information which designates a supervisory screen image covering a predetermined monitoring zone as the object of monitoring at a designated time; and a displaying means for displaying said designated supervisory screen image covering said monitoring zone as the object of monitoring at said designated time.

26. A monitoring device according to claim 25, further comprising:

an operating condition controller for controlling the operating conditions of said transmission devices on the basis of the supervisory information transmitted from said transmission devices;

wherein said displaying means displays said designated supervisory screen image covering said monitoring zone as the object of monitoring at said designated time and also displays, in said supervisory screen image, the operating conditions of the transmission devices in said monitoring zone which are controlled by said operating condition controller.

27. A monitoring device according to claim 26, wherein said operating condition controller controls the operating conditions of said transmission devices in said monitoring zone as the object of monitoring and discards the supervisory information transmitted from a transmission device outside of said monitoring zone as the object of monitoring.

28. A monitoring device according to claim 26, further comprising:

a supervisory information storing means for storing supervisory information transmitted from said transmission devices in said network;

wherein said operating condition controller controls the operating conditions of said transmission devices in said monitoring zone as the object of monitoring and stores, in said supervisory information storing means, said supervisory information transmitted from all the transmission devices in said network.

29. A monitoring device according to claim 26, wherein said operating condition controller controls the operating conditions of all the transmission devices in said network without limiting the transmission devices to the transmission devices in said monitoring zone as the object of monitoring; and said displaying means displays, in said supervisory screen image, the operating conditions of said transmission devices in said monitoring zone as the object of monitoring which are controlled by said operating condition controller and also displays the operating conditions of the transmission devices outside of said monitoring zone in a predetermined area of said supervisory screen image in the form of a summarized display.

30. A monitoring device according to claim 26, further comprising:

a supervisory information storing means for storing supervisory information transmitted from said transmission devices in said network;

wherein said operating condition controller controls the operating conditions of said transmission devices in said monitoring zone as the object of monitoring and stores, in said supervisory information storing means, said supervisory information transmitted from all the transmission devices in said network;

said displaying means displays, in said supervisory screen image, the operating conditions of said transmission devices in said monitoring zone as the object of monitoring which are controlled by said operating condition controller;

said operating condition controller instructs said displaying means to display the supervisory screen image covering the entire network as a monitoring zone when said operating condition controller detects a trouble caused in a transmission device outside of said monitoring zone as the object of monitoring; and said displaying means displays the supervisory screen image covering the entire network as said monitoring zone and also displays the operating condition of each of said transmission devices in said supervisory screen image.

31. A monitoring system for monitoring the operating conditions of a plurality of transmission devices which are provided in a network so as to transmit data, said system comprising:

a plurality of monitoring devices disposed in said network;

each of said monitoring devices including:

a supervisory screen image data holding means for holding supervisory screen image data which correspond to various monitoring zones;

a means for designating a predetermined monitoring zone as the object of monitoring at a designated time;

a displaying means for displaying a supervisory screen image on the basis of supervisory screen image data which corresponds to the designated monitoring zone and also displaying, in said supervisory screen image, the operating conditions of said transmission devices in said monitoring zone as the object of monitoring;

an operation controller for causing said display means to automatically switch and display said monitoring zone in accordance with a time basis.

* * * * *